(12) United States Patent
Reagan et al.

(10) Patent No.: US 7,489,849 B2
(45) Date of Patent: Feb. 10, 2009

(54) FIBER DROP TERMINAL

(75) Inventors: Randy Reagan, Clinton, MA (US); Jeffrey Gniadek, Northbridge, MA (US); Michael Noonan, Shrewsbury, MA (US); Michael Baren-Boym, Framingham, MA (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 11/198,848

(22) Filed: Aug. 8, 2005

(65) Prior Publication Data

US 2006/0093303 A1  May 4, 2006

Related U.S. Application Data

(60) Provisional application No. 60/624,582, filed on Nov. 3, 2004.

(51) Int. Cl.
*G02B 6/00* (2006.01)

(52) U.S. Cl. ........................ 385/135; 385/134
(58) Field of Classification Search ................ 385/135
See application file for complete search history.

(56) References Cited

U.S. PATENT DOCUMENTS

| | | | |
|---|---|---|---|
| 2,047,152 A | 7/1936 | Mitchell | |
| 3,691,505 A | 9/1972 | Graves | |
| 3,845,552 A | 11/1974 | Waltz | |
| 3,879,575 A | 4/1975 | Dobbin et al. | |
| 3,912,854 A | 10/1975 | Thompson et al. | |
| 3,912,855 A | 10/1975 | Thompson et al. | |
| 4,085,286 A | 4/1978 | Horsma et al. | |
| 4,107,451 A | 8/1978 | Smith, Jr. et al. | |
| 4,152,539 A | 5/1979 | Charlebois et al. | |
| 4,322,573 A | 3/1982 | Charlebois | |
| 4,343,844 A | 8/1982 | Thayer et al. | |
| 4,405,083 A | 9/1983 | Charlebois et al. | |
| 4,413,881 A | 11/1983 | Kovats | |
| 4,467,137 A | 8/1984 | Jonathan et al. | |
| 4,475,935 A | 10/1984 | Tanaka et al. | |
| 4,481,380 A | 11/1984 | Wood et al. | |
| 4,490,315 A | 12/1984 | Charlebois et al. | |
| 4,512,628 A | 4/1985 | Anderton | |
| 4,528,150 A | 7/1985 | Charlebois et al. | |

(Continued)

FOREIGN PATENT DOCUMENTS

DE     35 37 684 A1    4/1987

(Continued)

OTHER PUBLICATIONS

ADC Telecommunications; Fiber Cable Management Products Third Edition; 22 pages; Jun. 1998.

(Continued)

*Primary Examiner*—Frank G Font
*Assistant Examiner*—Ryan Lepisto
(74) *Attorney, Agent, or Firm*—Merchant & Gould P.C.

(57) ABSTRACT

A fiber drop terminal may include a housing having an outer surface containing a plurality of receptacles. The housing may include a lower surface and an inner cavity. The fiber drop terminal may include a fiber storage cavity occupying a portion of the inner cavity. The storage cavity may store a plurality of fiber coils at an angle.

4 Claims, 31 Drawing Sheets

U.S. PATENT DOCUMENTS

| | | |
|---|---|---|
| 4,528,419 A | 7/1985 | Charlebois et al. |
| 4,549,039 A | 10/1985 | Charlebois et al. |
| 4,550,220 A | 10/1985 | Kitchens |
| 4,556,281 A | 12/1985 | Anderton |
| 4,570,032 A | 2/1986 | Charlebois et al. |
| 4,581,480 A | 4/1986 | Charlebois |
| 4,589,939 A | 5/1986 | Mohebban et al. |
| 4,591,330 A | 5/1986 | Charlebois et al. |
| 4,592,721 A | 6/1986 | Charlebois et al. |
| 4,595,256 A | 6/1986 | Guazzo |
| 4,609,773 A | 9/1986 | Brown et al. |
| 4,625,073 A | 11/1986 | Breesch et al. |
| 4,629,597 A | 12/1986 | Charlebois et al. |
| 4,648,606 A | 3/1987 | Brown et al. |
| 4,648,919 A | 3/1987 | Diaz et al. |
| 4,654,474 A | 3/1987 | Charlebois et al. |
| 4,666,537 A | 5/1987 | Dienes |
| 4,670,069 A | 6/1987 | Debbaut et al. |
| 4,670,980 A | 6/1987 | Charlebois et al. |
| 4,678,866 A | 7/1987 | Charlebois |
| 4,684,764 A | 8/1987 | Luzzi et al. |
| 4,701,574 A | 10/1987 | Shimirak et al. |
| 4,717,231 A | 1/1988 | Dewez et al. |
| 4,725,035 A | 2/1988 | Charlebois et al. |
| 4,732,628 A | 3/1988 | Dienes |
| 4,747,020 A | 5/1988 | Brickley et al. |
| 4,761,052 A | 8/1988 | Buekers et al. |
| 4,764,232 A | 8/1988 | Hunter |
| 4,805,979 A | 2/1989 | Bossard et al. |
| 4,818,824 A | 4/1989 | Dixit et al. |
| 4,822,434 A | 4/1989 | Sawaki et al. |
| 4,875,952 A | 10/1989 | Mullin et al. |
| 4,884,863 A | 12/1989 | Throckmorton |
| 4,913,512 A | 4/1990 | Anderton |
| 4,952,798 A | 8/1990 | Graham et al. |
| 4,961,623 A | 10/1990 | Midkiff et al. |
| 4,963,698 A | 10/1990 | Chang et al. |
| 4,982,083 A | 1/1991 | Graham et al. |
| 4,986,762 A | 1/1991 | Keith |
| 5,004,315 A | 4/1991 | Miyazaki |
| 5,029,958 A | 7/1991 | Hodge et al. |
| 5,042,901 A | 8/1991 | Merriken et al. |
| 5,046,811 A | 9/1991 | Jung et al. |
| 5,054,868 A | 10/1991 | Hoban et al. |
| 5,066,095 A | 11/1991 | Dekeyser et al. |
| 5,074,808 A | 12/1991 | Beamenderfer et al. |
| 5,076,688 A | 12/1991 | Bowen et al. |
| 5,097,529 A | 3/1992 | Cobb et al. |
| 5,099,088 A | 3/1992 | Usami et al. |
| 5,115,105 A | 5/1992 | Gallusser et al. |
| 5,121,458 A | 6/1992 | Nilsson et al. |
| 5,122,069 A | 6/1992 | Brownlie et al. |
| 5,125,060 A | 6/1992 | Edmundson |
| 5,133,038 A | 7/1992 | Zipper |
| 5,185,844 A | 2/1993 | Bensel, III et al. |
| 5,194,692 A | 3/1993 | Gallusser et al. |
| 5,210,812 A | 5/1993 | Nilsson et al. |
| 5,217,808 A | 6/1993 | Cobb |
| 5,231,687 A | 7/1993 | Handley |
| 5,235,665 A | 8/1993 | Marchesi et al. |
| 5,241,611 A | 8/1993 | Gould |
| 5,245,151 A | 9/1993 | Chamberlain et al. |
| 5,267,122 A | 11/1993 | Glover et al. |
| 5,335,408 A | 8/1994 | Cobb |
| 5,347,089 A | 9/1994 | Barrat et al. |
| 5,353,367 A | 10/1994 | Czosnowski et al. |
| 5,376,196 A | 12/1994 | Grajewski et al. |
| 5,378,853 A | 1/1995 | Clouet et al. |
| 5,394,502 A | 2/1995 | Caron |
| 5,402,515 A | 3/1995 | Vidacovich et al. |
| 5,410,105 A | 4/1995 | Tahara et al. |
| RE34,955 E | 5/1995 | Anton et al. |
| 5,420,958 A | 5/1995 | Henson et al. |
| 5,440,655 A | 8/1995 | Kaplow et al. |
| 5,440,665 A | 8/1995 | Ray et al. |
| 5,442,726 A | 8/1995 | Howard et al. |
| 5,446,823 A | 8/1995 | Bingham et al. |
| 5,450,517 A | 9/1995 | Essert |
| 5,475,781 A | 12/1995 | Chang et al. |
| 5,491,766 A | 2/1996 | Huynh et al. |
| 5,509,099 A | 4/1996 | Hermsen et al. |
| 5,509,202 A | 4/1996 | Abdow |
| 5,517,592 A | 5/1996 | Grajewski et al. |
| 5,528,718 A | 6/1996 | Ray et al. |
| 5,633,973 A | 5/1997 | Vincent et al. |
| 5,657,413 A | 8/1997 | Ray et al. |
| 5,659,650 A | 8/1997 | Arnett |
| 5,666,453 A | 9/1997 | Dannenmann |
| 5,684,911 A | 11/1997 | Burgett |
| 5,689,607 A | 11/1997 | Vincent et al. |
| 5,696,864 A | 12/1997 | Smith et al. |
| 5,708,753 A | 1/1998 | Frigo et al. |
| 5,732,180 A | 3/1998 | Kaplan |
| 5,734,776 A | 3/1998 | Puetz |
| 5,745,633 A | 4/1998 | Giebel et al. |
| 5,757,997 A | 5/1998 | Birrell et al. |
| 5,767,448 A | 6/1998 | Dong |
| 5,778,122 A | 7/1998 | Giebel et al. |
| 5,781,678 A * | 7/1998 | Sano et al. ............... 385/45 |
| 5,823,646 A | 10/1998 | Arizpe et al. |
| 5,825,963 A | 10/1998 | Burgett |
| 5,828,807 A | 10/1998 | Tucker et al. |
| 5,861,575 A | 1/1999 | Broussard |
| 5,892,870 A | 4/1999 | Fingler et al. |
| 5,898,813 A | 4/1999 | Beier |
| 5,903,698 A * | 5/1999 | Poremba et al. ............. 385/135 |
| 5,907,653 A | 5/1999 | Burek et al. |
| 5,917,648 A | 6/1999 | Harker |
| 5,945,633 A | 8/1999 | Ott et al. |
| 5,969,294 A | 10/1999 | Eberle et al. |
| 5,997,186 A | 12/1999 | Huynh et al. |
| RE36,592 E | 2/2000 | Giebel et al. |
| 6,086,263 A | 7/2000 | Selli et al. |
| 6,104,846 A | 8/2000 | Hodgson et al. |
| 6,122,420 A | 9/2000 | Satoh |
| 6,167,183 A | 12/2000 | Swain |
| RE37,028 E | 1/2001 | Cooke et al. |
| 6,181,861 B1 | 1/2001 | Wenski et al. |
| 6,208,796 B1 | 3/2001 | Williams Vigliaturo |
| 6,215,930 B1 | 4/2001 | Estes et al. |
| 6,215,939 B1 | 4/2001 | Cloud |
| 6,255,584 B1 | 7/2001 | Renaud |
| 6,259,024 B1 | 7/2001 | Daoud |
| 6,292,614 B1 | 9/2001 | Smith et al. |
| 6,300,562 B1 | 10/2001 | Daoud |
| 6,343,950 B1 | 2/2002 | Eginton et al. |
| 6,376,774 B1 | 4/2002 | Oh et al. |
| 6,407,338 B1 | 6/2002 | Smith |
| 6,439,777 B1 | 8/2002 | Harrison et al. |
| 6,439,779 B1 | 8/2002 | Hafer |
| 6,453,106 B1 | 9/2002 | Glaser et al. |
| 6,454,464 B1 | 9/2002 | Nolan |
| 6,466,725 B2 | 10/2002 | Battey et al. |
| 6,493,500 B1 | 12/2002 | Oh et al. |
| 6,535,682 B1 | 3/2003 | Puetz et al. |
| 6,539,160 B2 | 3/2003 | Battey et al. |
| 6,579,014 B2 | 6/2003 | Melton et al. |
| 6,583,867 B1 | 6/2003 | Jennings et al. |
| 6,619,697 B2 | 9/2003 | Griffioen et al. |
| 6,621,975 B2 | 9/2003 | Laporte et al. |
| 6,648,520 B2 | 11/2003 | McDonald et al. |
| 6,655,016 B2 | 12/2003 | Renaud |
| 6,668,127 B1 | 12/2003 | Mahony |
| 6,706,968 B2 | 3/2004 | Yaworski et al. |

| | | |
|---|---|---|
| 6,760,531 B1 | 7/2004 | Solheid et al. |
| 6,764,220 B2 | 7/2004 | Griffiths et al. |
| 6,766,094 B2 | 7/2004 | Smith et al. |
| 6,810,194 B2 | 10/2004 | Griffiths et al. |
| 6,819,842 B1 | 11/2004 | Vogel et al. |
| 6,856,748 B1 | 2/2005 | Elkins, II et al. |
| 6,880,219 B2 | 4/2005 | Griffioen et al. |
| 6,880,986 B2 | 4/2005 | Mynatt et al. |
| 6,926,449 B1 | 8/2005 | Keenum et al. |
| 7,006,739 B2 | 2/2006 | Elkins, II et al. |
| 7,016,592 B2 | 3/2006 | Elkins, II et al. |
| 7,120,347 B2 | 10/2006 | Blackwell, Jr. et al. |
| 2003/0077041 A1 | 4/2003 | Belaidi et al. |
| 2003/0103750 A1 | 6/2003 | Laporte et al. |
| 2003/0123838 A1 | 7/2003 | Wang et al. |
| 2004/0062508 A1 | 4/2004 | Blankenship et al. |
| 2004/0074852 A1 | 4/2004 | Knudsen et al. |
| 2004/0123998 A1 | 7/2004 | Berglund et al. |
| 2004/0126069 A1 | 7/2004 | Jong et al. |
| 2004/0211774 A1 | 10/2004 | Daoud et al. |
| 2004/0228589 A1 | 11/2004 | Melton et al. |
| 2004/0247265 A1 | 12/2004 | Takano et al. |
| 2005/0053342 A1 | 3/2005 | Melton et al. |
| 2005/0069275 A1 | 3/2005 | Brants et al. |
| 2005/0094959 A1 | 5/2005 | Sibley et al. |
| 2005/0111799 A1 | 5/2005 | Cooke et al. |
| 2005/0111800 A1 | 5/2005 | Cooke et al. |
| 2005/0129375 A1 | 6/2005 | Elkins, II et al. |
| 2005/0145522 A1 | 7/2005 | Bloodworth et al. |
| 2005/0163448 A1* | 7/2005 | Blackwell et al. ........... 385/135 |
| 2005/0175307 A1* | 8/2005 | Battey et al. ................ 385/135 |
| 2005/0175308 A1 | 8/2005 | Elkins, II et al. |
| 2005/0185895 A1 | 8/2005 | Keenum et al. |
| 2005/0213921 A1 | 9/2005 | Mertesdorf et al. |
| 2005/0220421 A1 | 10/2005 | Keenum et al. |
| 2005/0259928 A1 | 11/2005 | Elkins, II et al. |
| 2005/0259929 A1 | 11/2005 | Elkins, II et al. |
| 2005/0259930 A1 | 11/2005 | Elkins, II et al. |
| 2005/0276552 A1 | 12/2005 | Cooke et al. |
| 2006/0056782 A1 | 3/2006 | Elkins, II et al. |
| 2006/0153517 A1 | 7/2006 | Reagan et al. |

FOREIGN PATENT DOCUMENTS

| | | |
|---|---|---|
| EP | 0 115 725 A1 | 8/1984 |
| EP | 0 511 147 A1 | 10/1992 |
| EP | 0 512 811 A1 | 11/1992 |
| EP | 0 805 536 A1 | 11/1997 |
| EP | 0 844 504 A2 | 5/1998 |
| EP | 0 903 604 A2 | 3/1999 |
| EP | 1 361 465 A1 | 11/2003 |
| EP | 1 380 828 A1 | 1/2004 |
| FR | 2 853 775 A1 | 10/2004 |
| JP | 58-105114 | 6/1983 |
| JP | 60-169813 | 9/1985 |
| JP | 60-169815 | 9/1985 |
| JP | 61-27510 | 2/1986 |
| JP | 61-190305 | 8/1986 |
| JP | 61-220536 | 9/1986 |
| JP | 62-54204 | 3/1987 |
| JP | 62-59906 | 3/1987 |
| JP | 63-136007 | 6/1988 |
| JP | 63-180915 | 7/1988 |
| JP | 63-287916 | 11/1988 |
| JP | 63-310317 | 12/1988 |
| JP | 1-138828 | 5/1989 |
| JP | 2001-99946 | 4/2001 |
| JP | 2001-116968 | 4/2001 |
| JP | 2003-177254 | 6/2003 |
| WO | WO 95/07478 | 3/1995 |
| WO | WO 02/06879 A1 | 1/2002 |
| WO | WO 2005/119322 A1 | 12/2005 |
| WO | WO 2006/044080 A1 | 4/2006 |
| WO | WO 2006/050505 A1 | 5/2006 |
| WO | WO 2006/052355 A1 | 5/2006 |

OTHER PUBLICATIONS

ADC Telecommunications; Fiber Panel Products Second Edition; 16 pages ; Jul. 1996.

ADC Telecommunications; FL1000 Wall-Mount Box Installation and Operation Guide; 28 pages; ADCP-90-334 Issue 1, Nov. 2004.

ADC Telecommunications; FL2000 Products; 6 pages; Nov. 1996.

ADC Telecommunications; FL2000™ Wall Mount Box Installation Instructions; 18 pages; ADCP-90-210 Issue 4; Jan. 1998.

ADC Telecommunications; FTDI 36-Fiber Wall Box User Manual; 15 pages; ADCP-90-250 Issue 1, Nov. 1996.

ADC Telecommunications; FTUA 4- and 12-Fiber Wall Box User Manual; 14 pages; ADCP-90-249 Issue 2, Mar. 1997.

ADC Telecommunications; Six-Fiber In-Building Wall Box Installation Instructions; 8 pages; ADCP-90-167 Issue 3, Nov. 1997.

ADC Telecommunications; Value-Added Module System; 8 pages; Jun. 1998.

ADC Telecommunications; Wall Mount Box Dec. 24, 1936 Fiber User Manual; 16 pages; ADCP-90-149 Issue 3, Jul. 1997.

"Cable Assemblies: Molding & Termination," http://www.dgo.com/prodcable.htm, 8 pages (Copyright 2001).

"DAM/BLOK™ Electrical Splice Kit," http://www.pmiind.com/products/damblok.html, 2 pages (Copyright 2000).

"Factory Installed Termination Systems for Fiber Optic Cable Splices," 1 page (admitted as prior art as of the filing date).

"Installation Instructions for Pre-Connectorized MIC® Cable (2-6 Fiber) Equipped with Plug & Play™ Systems Pulling Grips," *Corning Cable Systems*, Issue 7, pp. 1-3 (Jul. 2001).

"Pre-Connectorized (4-24 Fiber) Fiber Optic Cables Equipped with Plug & Play™ Systems Pulling Sleeves and Grips," *Corning Cable Systems*, Issue 1, pp. 1-7 (Mar. 2005).

* cited by examiner

FIBER DROP TERMINAL

RELATED APPLICATION

This application claims priority under 35 U.S.C. §119(e) based on U.S. Provisional Patent Application Ser. No. 60/624,582, filed Nov. 3, 2004, the entire content of which is hereby incorporated herein by reference.

FIELD OF THE INVENTION

The present invention relates generally to communication networks and, more particularly, to fiber drop terminals for use in optical communications networks.

BACKGROUND OF THE INVENTION

Residential, corporate, government, educational, and institutional users of communication services may desire high bandwidth connections to a communications network in order to send and receive data at high rates of speed. High bandwidth communications may allow users to take advantage of advanced communication capabilities, such as voice-over-internet protocol (VoIP) communications, interactive gaming, delivery of high resolution video, such as high definition television (HDTV), as well as the transmission and/or reception of large data files.

Communication service providers, such as telephone companies, cable television companies, etc., may understand that customers want these high bandwidth applications and/or services at a reasonable cost. Past attempts at providing high bandwidth communication channels have included techniques such as integrated services digital network (ISDN), digital subscriber line (DSL), asynchronous digital subscriber line (ASDL) and cable television co-axial cable. Technologies such as these may provide broadband capabilities to an extent. For example, some DSL services may provide up to approximately 5 Mbits/sec of data. Users may, however, demand even higher bandwidths. The above technologies may have inadequate bandwidth for some users and/or these technologies may be relatively expensive to deploy and/or maintain.

Demand for higher bandwidth services, e.g., on the order of up to 500 Mbits/sec or even higher, may cause service providers to look at newer technologies. One such technology is referred to as passive optical networks (PONS). PONS may use optical fibers deployed between a service provider central office, or head end, and one or more end user premises. A service provider may employ a central office, or head end, containing electronic equipment for placing signals onto optical fibers running to user premises. End user premises may employ equipment for receiving optical signals from the optical fibers. In PONS, the central office, or head end, transmission equipment and/or the transmission equipment located at the end user premises may, respectively, use a laser to inject data onto a fiber in a manner that may not require the use of any active components, such as amplifiers between the central office, or head end, and/or the end user premises. In other words, only passive optical components, such as splitters, optical fibers, connectors and/or splices, may be used between a service provider and an end user premises in PONS. PONS may be attractive to service providers because passive networks may be less costly to maintain and/or operate as compared to active optical networks and/or older copper based networks, such as a public switched telephone network (PSTN). In addition to possibly being less expensive than other network topologies, PONS may provide sufficient bandwidth to meet a majority of end users' high bandwidth communication needs into the foreseeable future.

In PONS, transmission equipment may transmit signals containing voice, data and/or video over a fiber strand to the premises. An optical fiber may be split using, for example, passive optical splitters so that signals are dispersed from one fiber (the input fiber) to multiple output fibers running to, for example, user premises from a convergence point in the network. An optical fiber routed to a user's premises may be routed via a fiber drop terminal en route to the premises. At the fiber drop terminal, signals appearing on one or more optical fibers may be routed to one or more end user premises. Fiber drop terminals may be mounted in aerial applications, such as near the tops of utility poles, along multi-fiber and/or multi-conductor copper strands suspended between utility poles. Fiber drop terminals may also be installed in junction boxes mounted at ground level and/or in below-grade vaults where utilities are run below ground.

Fiber drop terminals may be made of injection molded plastic to keep per unit costs as low as possible. Since fiber drop terminals may be exposed to the elements, they may be resistant to water infiltration and/or degradation due to ultra-violet (UV) light. Fiber drop terminal enclosures may be fabricated from UV resistant plastic and/or equipped with gaskets to prevent water infiltration. At times, the plastic used for the enclosure may fatigue and/or crack leading to water and/or water vapor penetration into the interior of the enclosure. The design of existing enclosure mating surfaces, such as gasketed interfaces, may interact in a manner facilitating water and/or water vapor penetration. For example, gasket material may be of an inadequate durometer to provide a weather-tight seal between an enclosure body and/or an enclosure base.

Existing fiber drop terminals may not have sufficient interior space to allow fibers within the enclosures to bend with a radius of at least an industry and/or manufacturer recommended minimum bend radius. When optical fibers are bent with a radius of less than an industry and/or manufacturer recommended minimum, such as 1.75 inches, optical signal losses may result.

Existing fiber drop terminals may have connector orientations that do not facilitate unencumbered and/or ergonomic coupling and/or decoupling of optical fibers/connectors by service and installation personnel (hereafter linesmen). As a result, it may be difficult for a linesman to attach and/or remove connectors in certain situations, such as when servicing a fiber drop terminal mounted on a utility pole using, for example, a ladder and/or a bucket lift.

When fiber drop terminals are deployed in the field, they may need to be tested prior to connecting subscribers to communication services delivered via the fiber drop terminals. Testing may be required to confirm that optical fibers coupled to the fiber drop terminal are operating properly and that connectors and/or receptacles associated with the fiber drop terminal are installed and/or operating correctly. Testing may be performed by injecting a signal onto a fiber at a central office and measuring the signal with a detector at a fiber drop terminal. A linesman may inject a signal onto a fiber at a central office and then drive to a location having a fiber drop terminal. The linesman may climb a pole and connect a detector to an output receptacle on the fiber drop terminal. The linesman may determine if the signal has a desired signal-to-noise ratio. After making the measurement, the linesman may drive back to the central office and connect the test signal to another fiber associated with the fiber drop terminal. The linesman may again drive to the terminal and detect the test signal. If a fiber drop terminal has, for example, eight output receptacles, the linesman may repeat the drive to and from the drop terminal eight times. Testing fiber drop terminals using known techniques may be labor intensive and may consume a lot of fuel due to the back and forth trips between the central office and fiber drop terminal locations.

SUMMARY OF THE INVENTION

In accordance with an implementation, a fiber drop terminal may be provided. The fiber drop terminal may include a housing having an outer surface containing a plurality of receptacles, where the housing further has an inner cavity. The fiber drop terminal may include a storage cavity occupying a portion of the inner cavity, where the storage cavity being configured to store a plurality of fiber coils at an angle with respect to the outer surface.

In accordance with another implementation, a fiber drop terminal is provided. The fiber drop terminal may include a first face having a first plurality of output receptacles having a first mounting angle with respect to the first face. The fiber drop terminal may include a second face having a second plurality of output receptacles having a second mounting angle with respect to the second face. The fiber drop terminal may include a mating angle formed by an intersection of the first face and the second face, where the mating angle facilitate access to the first and second plurality of output receptacles.

In accordance with yet another implementation, a fiber drop terminal is provided. The fiber drop terminal may include a housing that includes a first receptacle support face for receiving a first output receptacle, having a lower edge; a second receptacle support face for receiving a second output receptacle, and having an upper edge; a transition portion located between the lower edge and the upper edge, where the transition portion forms a valley area at the connection with the lower edge; and a gusset contacting the lower edge, the valley and the transition portion, where the gusset is further configured to reinforce the valley area.

In accordance with still another implementation, a cylindrical fiber drop terminal is provided. The cylindrical fiber drop terminal may include an input section having an input channel for receiving an incoming fiber bundle having a plurality of input optical fibers, where the input section further has an input section mating surface and an inner cavity. The cylindrical fiber drop terminal may include a first output section having a first plurality of output receptacles. The first output section may further have a first mating surface for mating with the input section mating surface, a second mating surface, and a first inner cavity. The cylindrical fiber drop terminal may include an end cap section having a second inner cavity for storing fiber coils and further having an end cap mating surface for mating with the second mating surface.

In accordance with yet another implementation, a fiber drop terminal is provided. The fiber drop terminal may include means for receiving an incoming optical signal; means for storing optical fiber at an angled orientation within the fiber drop terminal; and means for making the incoming optical signal available to premises.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION OF THE INVENTION

Reference will now be made in detail to exemplary implementations of the present invention, examples of which are illustrated in the accompanying drawings. While exemplary implementations are provided, other implementations are possible in light of the specification. As such, changes may be made to the exemplary implementations described herein without departing from the spirit and scope of the invention. The following detailed description does not limit the invention; but instead, the scope of the invention is defined by the appended claims and their equivalents. Wherever possible, the same reference numbers may be used throughout the drawings to refer to the same or like parts.

Figure 1:
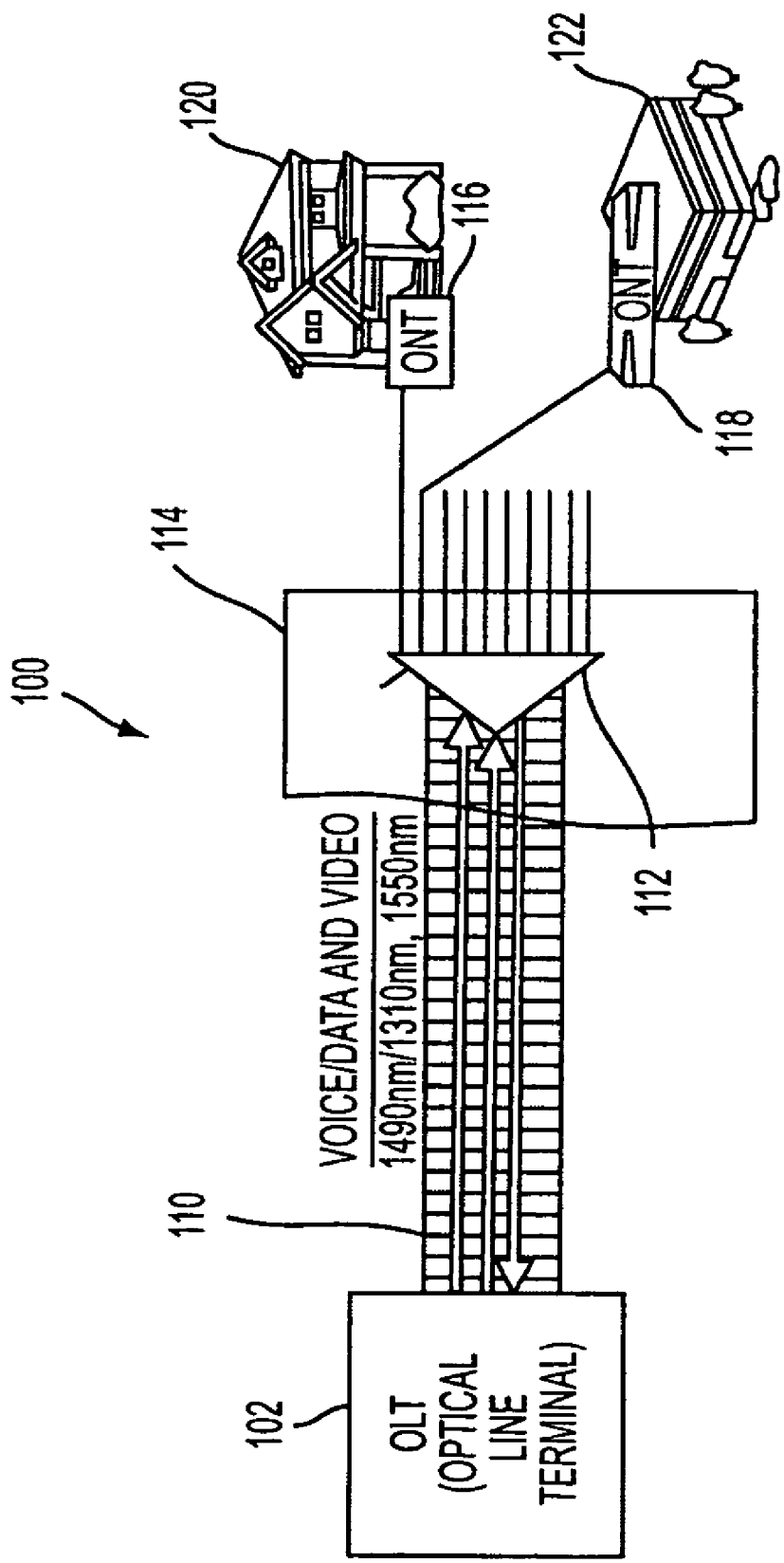
FIG. 1 illustrates a first schematic representation of an exemplary broadband access network that may include passive optical network (PON) components in an implementation consistent with the principles of the invention.

FIG. 1 illustrates a first schematic representation of an exemplary broadband access network 100 that may include PON components in an implementation consistent with the principles of the invention. Network 100 may include an optical line terminal (OLT) 102, a voice input 104, a data input 106, a video input 108, a wavelength division multiplexed (WDM) fiber 110, a passive optical splitter (POS) 112, a fiber distribution hub (FDH) 114, optical network terminals (ONTs) 116 and 118, a residence 120, and an office building 122.

OLT 102 may include any device capable of placing data onto one or more optical fibers. For example, OLT 102 may include a head end controller adapted to inject signals onto one or more optical fibers. Network 100 may employ OLT 102 for receiving input data from one or more service networks. By way of example, OLT 102 may receive voice input 104, data input 106 and/or video input 108 from one or more service networks associated with, for example, a telecommunications provider, a multi-media provider, and/or a cable television provider. OLT 102 may queue and/or output a multiplexed data stream over one or more optical fibers 110. For example, an exemplary implementation of OLT 102 may output voice at a wavelength on the order of 1490 nanometers (nm), data at a wavelength on the order of 1310 nm and/or video at a wavelength on the order of 1550 nm.

WDM fiber 110 may include any medium capable of carrying optical signals from a source to a destination. WDM fiber 110 may transport data from a proximal, or input, end using techniques, such as WDM, to a distal, or output, end. POS 112 may include any device capable of accepting an incoming optical signal and splitting the optical signal into two or more output signals. POS 112 may receive data by way of a single fiber (the input fiber) and split the data across two or more output fibers. For example, POS 112 may split incoming data across 2, 4, 8, 16, 32, or more output fibers. In an exemplary implementation, each output fiber is associated with an end user, such as a residence 120 and/or a commercial end user in office building 122. POS 112 may be located in both indoor and outdoor environments. For example, POS 112 may be located in a central office/head end, environmentally secure cabinets, and/or in outdoor enclosures such as fiber drop terminals. In one implementation, POS 112 may include optical splitters that are prepackaged in optical splitter module housings. Packaging POS 112 in an optical splitter cassette, or housing, may provide protective packaging to facilitate easy handling of otherwise fragile splitter components by linesmen. An optical splitter cassette may include any device capable of housing one or more assemblies used for splicing an incoming fiber into two or more outgoing fibers.

FDH 114 may include any device capable of housing POS 112. For example, in one implementation, FDH 114 may include a re-enterable weather tight enclosure capable of holding one or more POSs 112. Exemplary implementations of FDH 114 are described in pending U.S. patent application Ser. No. 10/714,814 entitled Systems and Methods for Fiber Distribution and Management, filed on Nov. 17, 2003, and U.S. patent application Ser. No. 10/991,135 entitled Systems and Methods for Optical Fiber Distribution and Management, filed on Nov. 17, 2004, the entire contents of which are, respectively, hereby incorporated by reference herein. Implementations of FDH 114 may allow easy re-entry by linesmen and/or other service personnel. A linesman may access FDH 114 to install one or more POSs 112, to make fiber connections available to a subscriber, and/or to troubleshoot POS 112. For example, POS 112 may be mounted in FDH 114 using cassettes operating in conjunction with a fiber patch panel to facilitate routing of fiber jumpers. Fiber jumpers may be used to connect the splitter outputs of POS 112 to one or more subscriber ports on the fiber patch panel. A subscriber port may facilitate connection of an optical signal from a central office and/or head end to a customer premises. FDH 114 may, for example, serve on the order of 144 to 432 splitter ports and/or premises, and may include multiple distribution cables, connectorized and/or fusion spliced between OLT 102 and POS 112 located within, for example, FDH 114.

Network 100 may be designed to achieve low optical insertion loss in order to achieve maximum network reach from electronics having fixed power output. Each optical component and subsystem utilized in the network may be optimized to provide minimum insertion loss. For example, an optical loss budget in an exemplary implementation may be approximately 23 to 25 dB with 1:32 passive splitting. The components and factors contributing to the optical loss may include splitters (1:32, single or cascaded), WDMs, connectors such as to OLT 102, POS 112, a fiber patch panel, a fiber drop, and/or ONT 116, 118, fiber attenuation at various frequencies, such as, wavelengths of 1310 nm, 1490 nm, and/or 1550 nm, and/or fiber splices.

ONTs 116, 118 may include any device capable of receiving an incoming optical signal and making it available to a destination. For example, and end user location, such as residence 120, may use ONT 116 to receive a multiplexed incoming optical signal and make it available to an end user device, such as a computer. In one implementation, ONT 116 may act as a demultiplexer by accepting a multiplexed data stream containing voice, video, and/or data. ONT 116 may demultiplex the incoming data stream and provide a separate voice channel to a user's telephone, a separate video channel to a television set, and/or a separate data channel to a computer.

Figure 2:
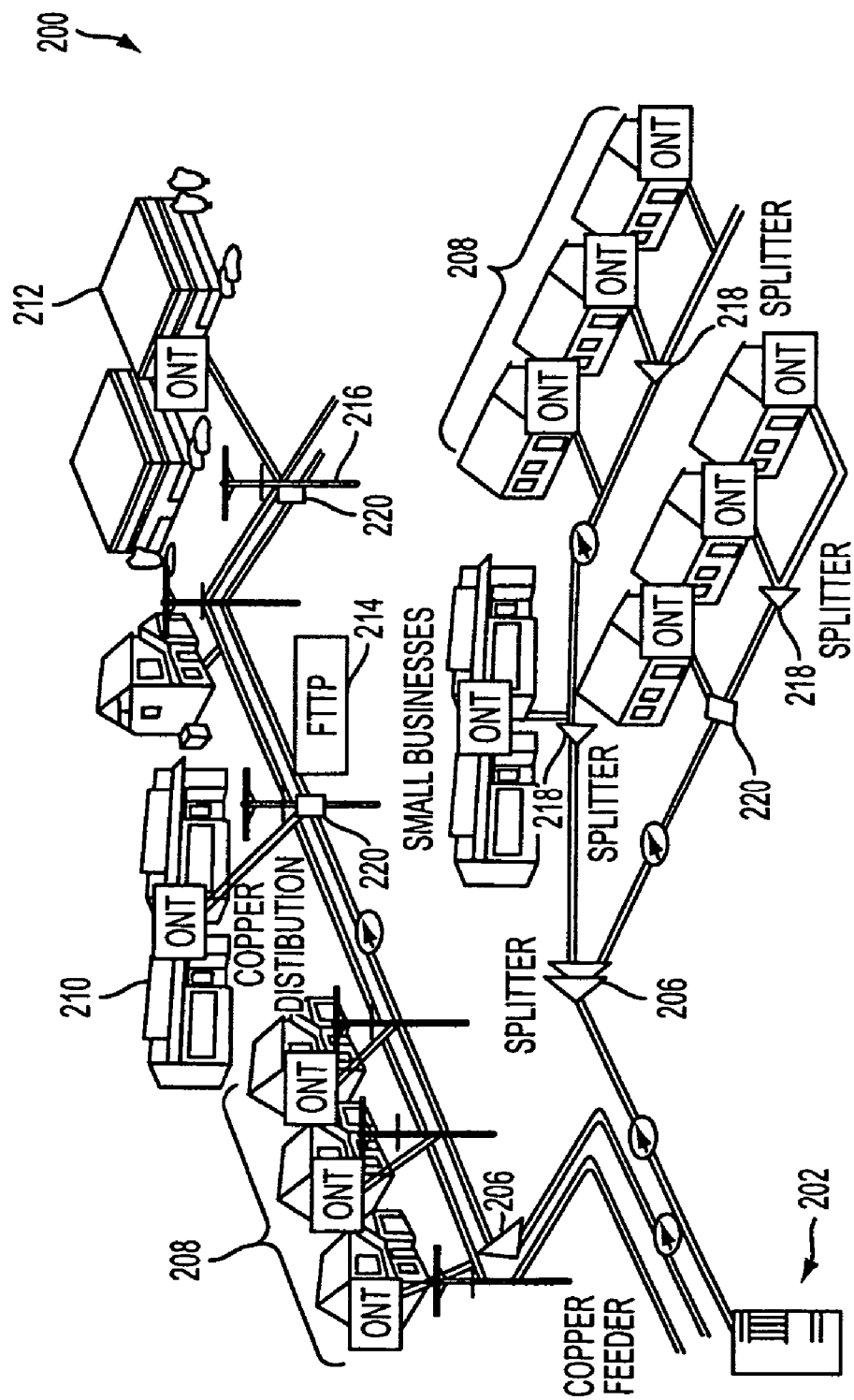
FIG. 2 illustrates a second schematic representation of an exemplary broadband access network that may employ fiber to the premises (FTTP) and/or PON components in an implementation consistent with the principles of the invention.

FIG. 2 illustrates a second schematic representation of an exemplary broadband access network 200 that may employ FTTP and/or PON components in an implementation consistent with the principles of the invention. Network 200 may include a circuit switch/OLT 202, a service area interface (SAI) 204, a splitter hub 206, one or more residential ONTs 208, one or more small business ONTs 210, one or more office park ONTs 212, FTTP 214, utility pole 216, downstream splitter 218, and fiber drop terminal 220. Circuit switch/OLT 202 may include central office equipment for placing optical signals onto FTTP 214. For example, circuit switch/OLT 202 may convert analog signals associated with a PSTN to optical signals that are conveyed to FTTP 214. SAI 204 may include any device capable of splitting an incoming signal into multiple outgoing signals. For example, SAI 204 may receive an optical fiber from circuit switch/ONT 202. SAI 204 may split data on the incoming fiber into multiple outgoing data flows on a like number of outgoing optical fibers. SAI 204 may split an incoming signal into, for example, 32 output signals using a 1×32 splitter. Splitter hub 206 may include any device capable of retaining SAI 204. For example, splitter hub 206 may be implemented as FDH 114 as discussed in conjunction with FIG. 1.

Residential ONT 208 may include any device capable of receiving an incoming optical signal and making it available to a destination. Residential ONT 208 may operate in a manner similar to ONTs 116 and 118 described in conjunction with FIG. 1. Small business ONT 210 may include any device capable of receiving an incoming optical signal and making it available to a destination, such as a small business. Small business ONT 210 may serve a single small business and/or may serve a group of small businesses, such as businesses co-located in a strip mall and/or small commercial building. Office park ONT 212 may include any device capable of receiving an incoming optical signal and making it available to a destination. Office park ONT 212 may operate to serve an office park including one or more buildings and/or offices.

Optical signals may be conveyed from SAI 204 and/or splitter hub 206 by FTTP 214. FTTP 214 may include one or more optical media capable of conveying optical signals from a source to a destination. Optical media may include optical fibers. Optical fibers used in outdoor installations may include a protective sheath surrounding the optical medium to provide rigidity, strength, durability, color coding, strain relief and/or protection from the elements such as water and/or UV radiation.

FTTP 214 may include a single fiber and/or multiple fibers. When FTTP 214 includes multiple fibers, the multiple fibers may be deployed in a multi-fiber strand, or bundle, surrounded by a protective bundle-sheath. The bundle-sheath may operate to provide rigidity, strength, durability, color coding, strain relief and/or protection from the elements such as water and/or UV radiation. Bundled fibers may include breakouts at determined locations. Breakout refers to a location on a bundle-sheath where one or more optical fibers exit the interior portion of the bundle-sheath and are made available to other devices, such as residential ONT 208, small business ONT 210, office park ONT 212 and/or fiber drop terminal 220.

FTTP 214 may be suspended above grade using one or more utility poles 216. Utility pole 216 may include any device capable of supporting an optical fiber. Utility pole 216 may include conventional utility poles and/or optical fiber supporting devices used on structures, such as the exterior surfaces of buildings. A fiber drop terminal 220 may be used in conjunction with utility pole 216. Utility pole 216 may be used to support conventional copper wire strands such as those used for plain old telephone service (POTS), those used for cable television (CATV) and/or FTTP 214.

Network 200 may include one or more downstream splitters 218. A down stream splitter 218 may include any device capable of splitting an incoming optical signal into two or more outgoing optical signals. Downstream splitter 218 may include a reduced splitting capacity as compared to splitter hub 206. For example, downstream splitter 218 may include a 1×2, 1×4 and/or 1×8 splitter. Downstream splitter 218 may include passive and/or active splitting devices operating alone or on combination. In one implementation, downstream splitter 218 may be incorporated into fiber drop terminal 220.

Fiber drop terminal 220 may include any device capable of receiving one or more input fibers and distributing optical communication signals traversing the input fibers to one or more output fibers. Fiber drop terminals 220, consistent with implementations of the invention, are used to interface between distribution cables and drop cables in a PON application. Fiber drop terminal 220 may be manufactured from injection molded plastic and may include an enclosure body, or housing, and a base. Fiber drop terminal 220 may be configured by splicing a multi-fiber cable at a branch, or breakout, point. For example, a large fiber count distribution cable may be spliced to obtain eight fibers to connect to a fiber drop terminal having eight output receptacles. A single cable having one or more optical fibers therein may depart the splice location and serve as an input, or feed, cable to fiber drop terminal 220. By way of example, a feed cable may have a central tube housing a plurality of individual optical fibers. Inside fiber drop terminal 220, the multi-fiber feed cable may be separated into individual fibers and then terminated on individual rugged outdoor receptacles, connectors and/or adapters located on an exterior surface of the enclosure. Fiber drop terminal 220 may thus used to stage the PON cabling system near premises locations, such as a residence 120 or office building 122, so that when a subscriber requests service, a simple connectorized drop cable can be quickly and easily connected between fiber drop terminal 220 and circuit switch/ONT 202 and a customer premises.

Fiber drop terminal 220 may also be coupled to a feed cable at a manufacturing or assembly plant. For example, fiber drop terminal 220 may be installed on a multi-fiber stranded feed cable at a predetermined location. In another implementation, a breakout may be terminated with an input connector at a manufacturing plant. In the field, a fiber drop terminal 220 may be attached to the input connector via an input receptacle. Implementations of fiber drop terminal 220 may take many forms. Several exemplary implementations are described herein.

The network architecture described in conjunction with FIGS. 1 and 2 may operate in a point to multi-point PON configuration utilizing, for example, 1:32 splitters at FDH 114 or splitter hub 206. The network architecture may be fiber rich, such as in a 1:1 distribution arrangement between FDH 114 and a customer's premise, such as residence 120, and/or the network architecture can be diluted, such as in a 1:X arrangement where X is an integer larger than 1.

The broadband services capability of network 100 and/or network 200 for distributing source information may include data signals, at for example 622 Mbps×155 Mbps (shared), video signals, at for example 860 MHz for approximately 600 analog and/or digital channels and/or high definition television (HDTV), and/or video on demand (VOD). Source information may consist of data, such as, voice, video, text, still images, numerical data and/or control data. Source information may originate at a source location, such as a telecommunications service provider (hereinafter service provider). Signaling may be accomplished using WDM and/or fiber sharing. Network 100 may include ONTs 116 and 118 that are scalable, provide high bandwidth, and/or support multi-service applications that can service residences and/or small to medium sized businesses. Multiple ONTs 116 and 118 may be operated in parallel to provide greater overall bandwidth to a destination, such as a large office building. Network 100 may include passive components that are located outside the plant, i.e., outside the service provider's building, and require minimal maintenance, since active components, such as amplifiers, may not be required.

Implementations of networks 100 and/or 200 may include digital subscriber plug-in line cards having a broadband terminal adapters configured to receive digitally multiplexed broadband data streams and output one or more demultiplexed broadband data streams for one or more subscriber loops.

Figure 3A:
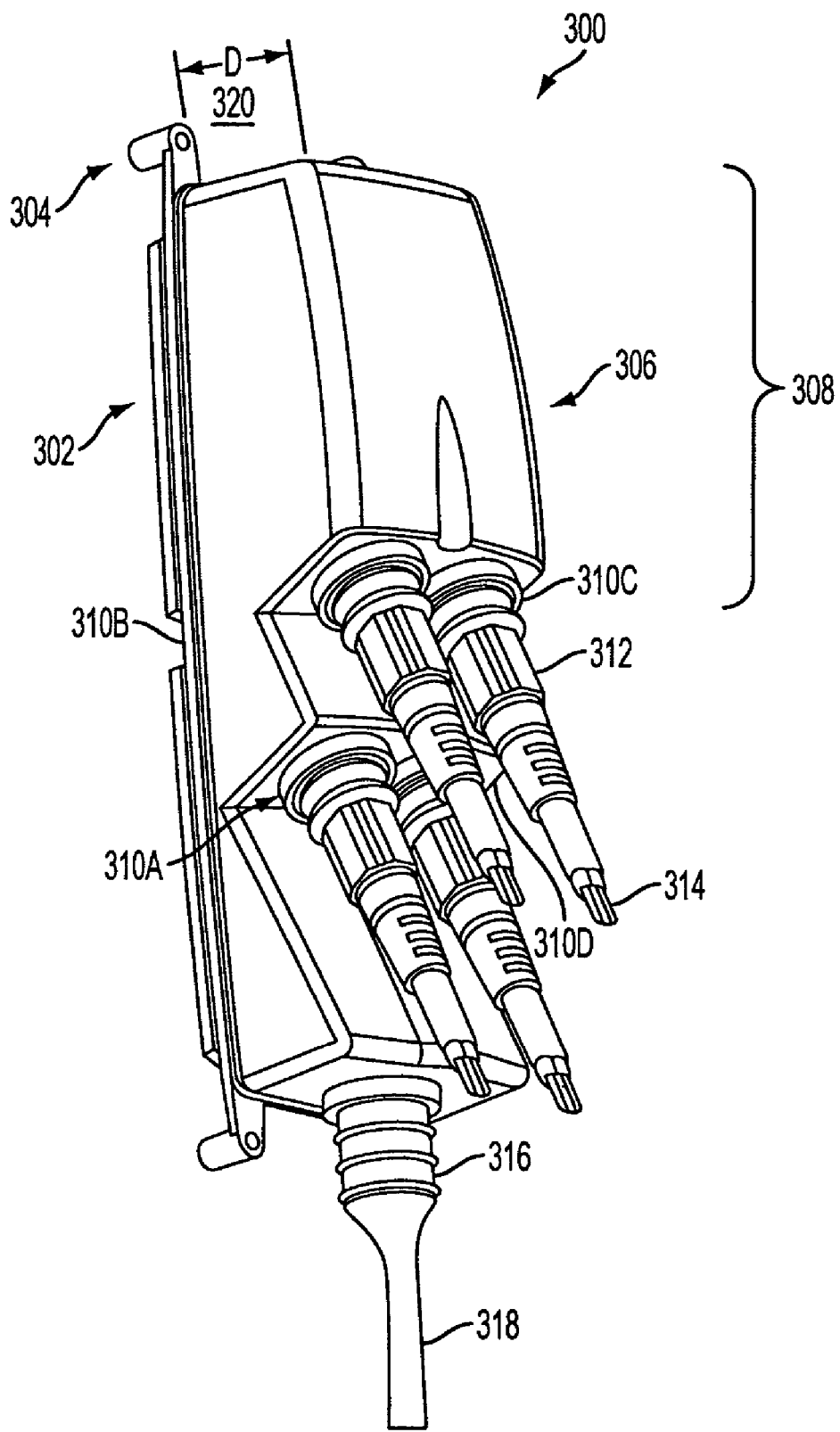
FIG. 3A illustrates an exemplary implementation of a fiber drop terminal that may include a stepped face, consistent with the principles of the invention.

FIG. 3A illustrates an exemplary implementation of a fiber drop terminal 300 that may include a stepped face, consistent with the principles of the invention. Stepped face terminal 300 may include a base 302, a fastener guide 304, a housing 306 having a fiber management portion 308, one or more output receptacles 310A-D, an output connector 312, an output fiber 314, an input channel 316, and an incoming fiber bundle 318.

Terminal 300 may be deployed in a number of installed environments including aerial (such as near the top of a utility pole), pedestal (such as cabinets accessible when standing on grade), and/or below grade (such as in below grade vaults and/or sealed enclosures). Terminal 300 may consist of two molded plastic enclosure parts separated by a flexible sealing interface that operates to seal an internal cavity against the elements. For example, terminal may consist of base 302 and housing, or body, 306.

Terminal 300 may include base 302 that can be releasably attached to housing 306 using, for example, fasteners, keyed retainers, clamping devices, etc. Base 302 may include a substantially flat shape configured to retain a gasket and/or other sealing device along a base mounting surface that may be releasably coupled to a corresponding housing mounting surface associated with housing 306. Base 302 may be adapted for attachment to a surface, such as a utility pole, using fasteners, such as nails, and/or screws, via fastener guide 304.

Housing 306 may be shaped so as to form a cavity for housing optical fibers. Housing 306 may include an outer surface having penetrations passing therethrough for receiving, for example, output receptacles 310A-D. Housing 306 may be shaped so that an upper surface of base 302 operates to form an enclosed area in conjunction with the cavity when coupled to housing 306 along a gasketed interface. Housing 306 may be configured so that a portion of the inner cavity operates as a fiber management portion 308 for storing excess optical fiber. In one implementation, housing 306 may be configured to have a depth 320 sufficient to allow storage of fiber coils in an angular orientation so as to facilitate maintaining a determined minimum bend radius. For example, fiber management portion 308 may be configured to retain fiber coils with a bend radius meeting at least a manufacturer recommended minimum bend radius.

PON fiber drop terminals similar to those shown in FIG. 3A may be used to provide a breakout of multiple fiber cable containing, for example, 4, 6, 8 and/or 12 fibers into individual rugged outdoor connector-adapters. The breakout of the fibers inside terminal 300 may be performed by placing bends on the individual fibers within the enclosure.

Terminal 300 may include an enlarged fiber management portion 308. Use of an enlarged fiber management portion 308 ensures that fibers are not adversely impinged by the interior walls of the enclosure. The enlarged fiber management portion 308 allows at least one path for a fiber which meets a manufacturer's minimum recommended bend radius for the fiber. A manufacturer's minimum recommended, or specified, bend radius refers to a parameter disseminated to the industry for particular types of optical fibers. This parameter identifies a recommended minimum bend radius for a given fiber. If a minimum bend radius is exceeded, excess signal loss may occur resulting in a reduced signal-to-noise ratio at a receiving device. For example, if a manufacturer specifies a minimum bend radius as 1.5 inches, the bend radius is exceeded when an optical fiber is bent such that the bend radius is less than 1.5 inches, such as would occur if a bend radius of 1.4 inches were used. Since signal loss may increase exponentially when the minimum bend radius is exceeded, care should be taken to maintain at least the minimum specified bend radius.

By increasing the depth 320 of terminal 300, a path exists within the enclosure for a coil to be installed at an angle that meets the minimum bend radius criteria and therefore eliminates the risk of increased signal attenuation due to excessive fiber bending. By using fiber retaining mechanisms, such as hooks (shown in FIG. 6), the coil can be organized and retained at a proper radius without losing the organization of the coils. Depth 320 may be altered as needed to achieve a desired bend radius for fiber coils arranged therein.

Implementations of terminal 300 may have the following exemplary dimensions: for a 4 output enclosure, 3" (76.2 mm) deep×3.6" (91.4 mm) wide×11.1" (281.9 mm) long; for a 6 or 8 output enclosure, 3" (76.2 mm) deep×3.6" (91.4 mm) wide× 16.6" (421.6 mm) long; and for a 12 output enclosure, 3" (76.2 mm) deep×3.6" (91.4 mm) wide×22.7" (576.6 mm) long.

Output receptacles 310A-D may include any device capable of receiving a connector. For example, output receptacle 310 may convey optical data received via incoming fiber bundle 318 to an output fiber 314. For example, output receptacles 310A-D may provide a rugged exterior package that houses a ferrule alignment sleeve for the purpose of mating two fiber optic connectors. Output receptacles 310 may include a fiber optic connector consisting of an interior SC/APC (angled physical contact) that is connected to a single optical fiber. The optical fiber may be over-tubed with a 900 µm (nine-hundred micron) diameter clear and/or color coded tubing material to protect the waveguide portion of the fiber that carries the optical signal. The interior SC/APC connector may releasably mate with output connector 312. Output receptacles 310A-D may be plugged when not in use so as to prevent dirt and moisture from accumulating on a fiber within an output receptacle.

Output connector 312 may include a modified SC/APC connector that has been strengthened to increase its durability to meet, for example, outdoor environments. For example, output connector 312 may include modifications to provide weather and UV protection to an optical fiber inside the connector. Output connector 312 may also be adapted to increase the pull-out force of the fiber from the connector and/or connector from a receptacle to a value of 100 pounds or more. By way of example, a pull out strength for a typical SC/APC connector may be on the order of 3 to 4 pounds. Employing implementations of output connector 312 may significantly improve pull out resistance as compared to that of conventional SC/APC connectors. Output connector 312 and output receptacle 310 may form a watertight assembly when coupled together using, for example, threaded sleeves. In one implementation, output connector 312 and/or output receptacle 310 are equipped with o-rings to provide radial seals within each receptacle when mated to output connector 312. Output receptacles 310 may also be equipped with one or more o-rings proximate to an interface between output receptacles 310 and housing 306.

Examples of connectors and/or receptacles that can be used with implementations of fiber drop terminals described herein are, but are not limited to, those described in U.S. Pat. No. 6,648,520 B2 entitled Fiber Optic Plug and U.S. Pat. No. 6,579,014 B2 entitled Fiber Optic Receptacle, each of these patents is hereby incorporated by reference herein in its respective entirety.

Incoming fiber bundle 318 may include one or more input optical fibers enclosed within a protective sheath, or tube, for coupling incoming optical signals with output connector 312 via output receptacle 310. For example, if terminal 300 includes four receptacles, incoming fiber bundle 318 may include four optical fibers. An incoming optical fiber may be associated with a particular output receptacle. The quantity of fibers within incoming fiber bundle 318 may match the number of receptacles 310A-D, may exceed the number of receptacles 310A-D, and/or may be fewer than the number of receptacles 310A-D. Individual optical fibers within an incoming fiber bundle 318 may be adapted for outdoor applications using 900 µm clear and/or color coded tubing for protection. The incoming fibers may terminate with an industry standard SC/APC connector.

Incoming bundle 318 may enter terminal 300 by way of input channel 316. Input channel 316 may consist of a passage or tubular entrance through which bundle 318 may pass. Individual fibers may be fanned out from incoming bundle once inside the inner cavity of terminal 300. Incoming bundle 318 may be sealed to input channel 316 using, for example, potting techniques know in the art. Input channel 316 may be adapted to receive an input receptacle for receiving incoming fibers. When input channel 316 is adapted with a receptacle, incoming bundle 318 may be terminated with a mating input connector for coupling optical signals to the input receptacle and/or to output receptacle 310.

Figure 3B:
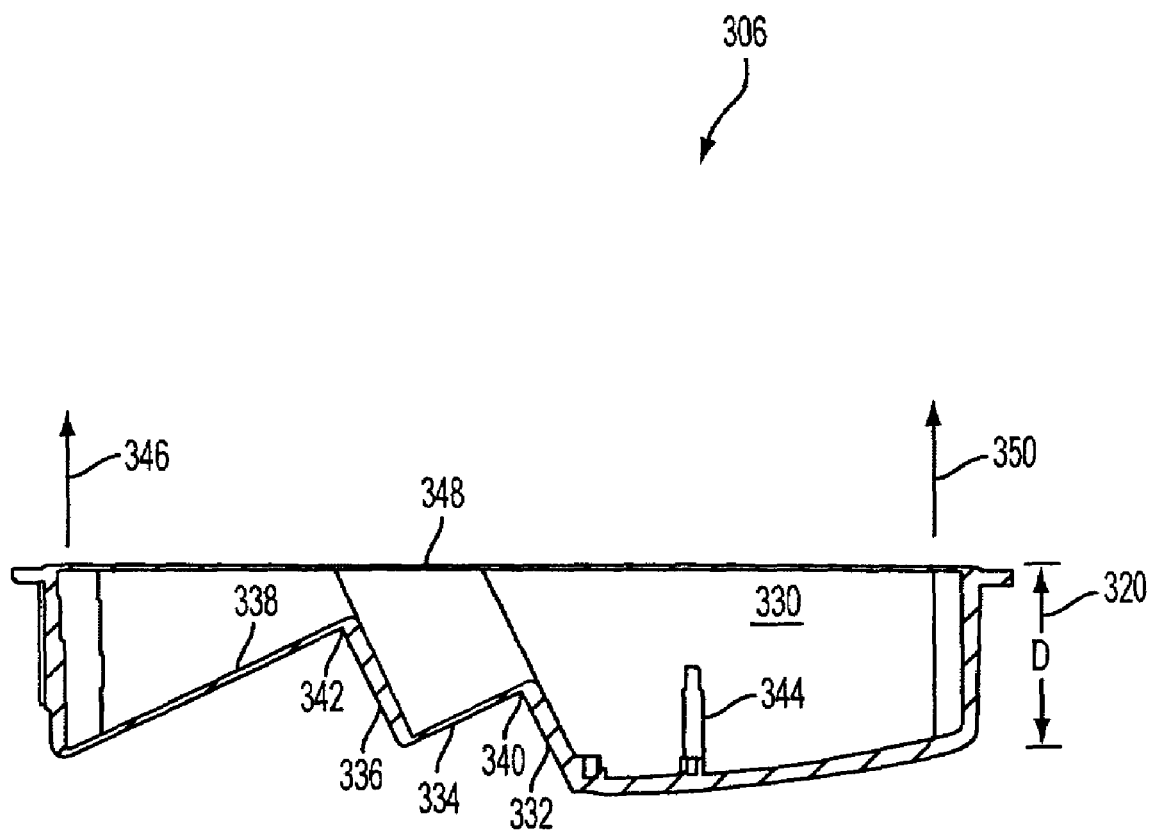
FIG. 3B illustrates a cut away view of the exemplary implementation the housing illustrated in FIG. 3A, consistent with the principles of the invention.

FIG. 3B illustrates a cut away view of the exemplary implementation of the housing illustrated in FIG. 3A, consistent with the principles of the invention. Housing 306 may be configured with a stepped face for mounting connector receptacles. Housing 306 may include a storage cavity 330, a first stepped face 332, a first transition region 334, a second stepped face 336, a second transition region 338, a first inside angle 340, a second inside angle 342 and a retainer mounting channel 344. First applied force 346, second applied force 348, and third applied force 350 may represent forces associated with mounting terminal 300.

Storage cavity 330 may occupy a portion of the interior of housing 306 and may be used for storing excess optical fiber. For example, storage cavity 330 may be located in an upper portion of the interior of housing 306 and may be sized for storing coiled optical fibers. Storage cavity 330 may be used for maintaining excess optical fiber in an organized manner that facilitates efficient configuration and assembly of terminal 300.

First stepped face 332 and second stepped face 336 may be configured to receive output receptacle 310. First stepped face 332 and second stepped face 336 may operate as output receptacle support surfaces. First stepped face 332 and second stepped face 336 may be arranged with respect to first transition region 334 and second transition region 338, respectively, so as to maintain output receptacle 310 at a determined relationship, or orientation, with respect to housing 306 and or a mounting location, such as a utility pole. First inside angle 340 may operate with first stepped face 332 and first transition region 334 to establish the predetermined orientation for a output receptacle 310 installed therein. Second inside angle 342 may operate with second stepped face 336 and second transition region 338 to establish the predetermined orientation for an output receptacle 310 installed therein. The predetermined orientation for receptacles in first stepped face 332 and second stepped face 336 may be substantially similar or they may be different. For example, housing 306 may be associated with base 302 and mounted to a utility pole. It may be determined that linesmen will approach housing 306 via a ladder. First stepped face 332 and second stepped face 336 may be configured so that receptacles mounted therein are aligned to provide a linesman with an ergonomic and/or readily visible access to output receptacle 310 when attaching an output connector 312 and/or output fiber 314.

Housing 306 may include one or more retainer mounting channels 344 for adjustably retaining fiber retention devices, such as hooks, clamps, cable ties, etc. For example, retainer channel 344 may facilitate a height adjustment with a fiber retaining hook used to retain excess optical fiber in coils within the inner cavity of housing 306.

Housing 306 may be subject to one or more applied forces when attached to a base, such as base 302, using attachment devices, such as fasteners. For example, first applied force 346, second applied force 348 and/or third applied force 350 may result from attaching housing 306 to base 302 using screws. Housing 306 may be adapted to reduce the detrimental effects of applied bending forces by, for example, reinforcing first inside angle 340 and/or second inside angle 342. For example, the thickness of material in the vicinity of first inside angle 340 and/or second inside angle 342 may be increased in order to increase the stiffness of housing 306.

Figure 4:
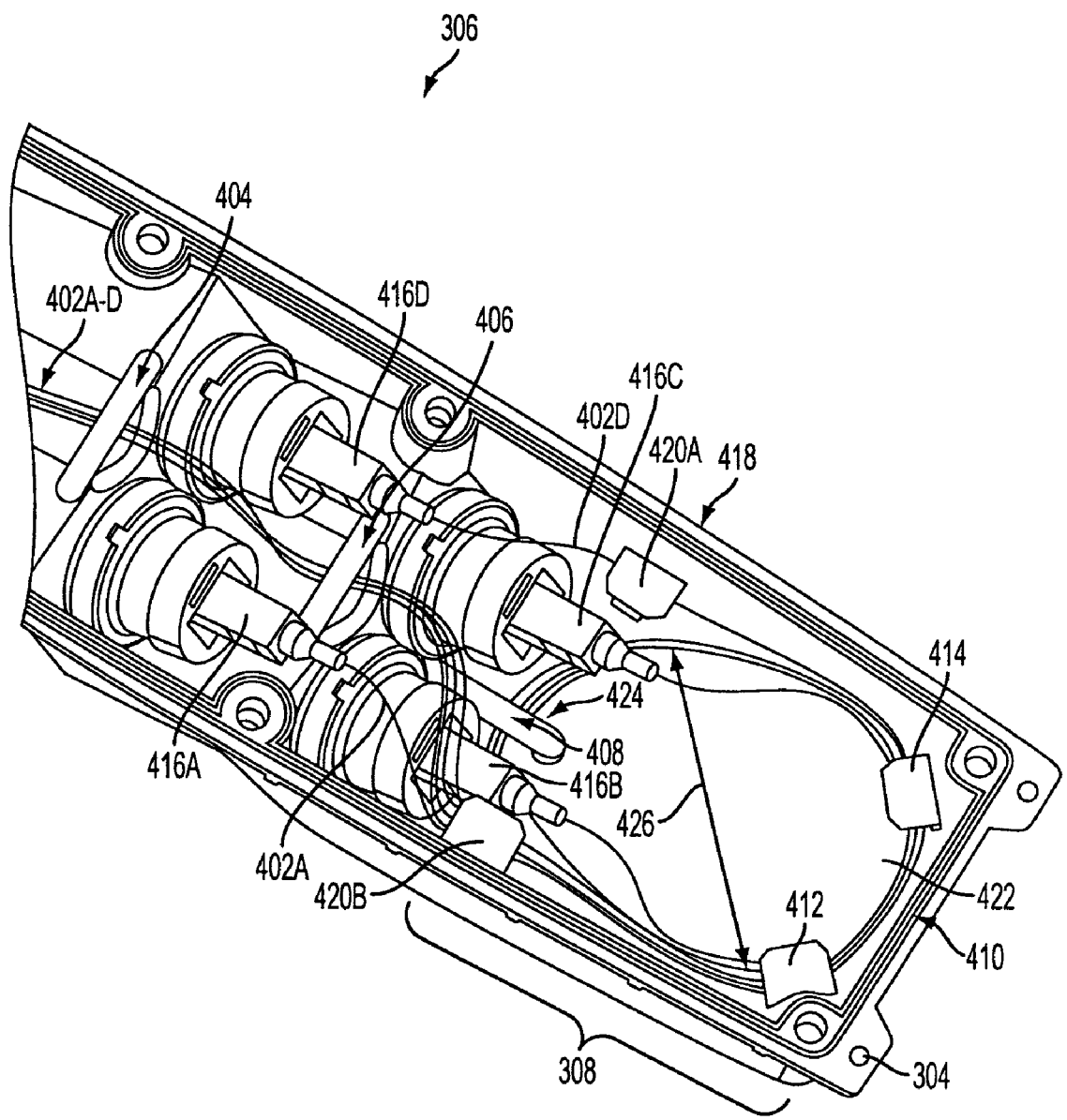
FIG. 4 illustrates a view of an interior cavity associated with an exemplary implementation of a fiber drop terminal employing an angled fiber management cavity, consistent with the principles of the invention.

FIG. 4 illustrates a view of an interior cavity associated with an exemplary implementation of a fiber drop terminal employing an angled fiber management cavity, consistent with the principles of the invention. FIG. 4 illustrates the interior cavity of stepped housing 306. The interior cavity may include an incoming fiber group 402A-D, a first central retainer 404, a second central retainer 406, a low elevation retainer 408, fiber coils 410, a first high elevation retainer 412, a second high elevation retainer 414, individual fibers 402A, B, C and D, receptacle bodies 416A, B, C and D, a gasket 418, and fiber guides 420A and 420B.

Incoming fiber group 402A-D may include individual fibers 402A, B, C and D and may be received via incoming fiber bundle 318. First and second central retainers 404 and 406 may include any device capable of substantially retaining one or more fibers in a determined location. For example, first and second central retainers 404 and 406 may releasably retain incoming fiber group 402A-D along a central portion of housing 306, such as along the centerline of housing 306. First and second central retainers 404 and 406 may be held in place via adhesive and/or mechanical fastening techniques. For example, first and second central retainers 404 and 406 may employ fasteners, releasable fingers, fiber guides, tie wraps, hooks, channels, etc., for securing incoming fiber group 402A-D. Therefore, any device capable of retaining a fiber at a desired location is contemplated by first and second central retainers 404 and 406.

Excess fiber in incoming fiber group 402A-D may be stored in one or more fiber coils 410 within housing 306. Fiber coils 410 may be formed in cooperation with low elevation retainer 408, first high elevation retainer 412 and second high elevation retainer 414. Low elevation retainer 408 may include any device capable of retaining one or more fibers at a determined location. First high elevation retainer 412 and second high elevation retainer 414 may include any device capable of retaining one or more optical fibers at a determined location with respect to, for example, low elevation retainer 408. For example, a relationship between first high elevation retainer 412 and low elevation retainer 408 may cause fiber coils 410 to be stored at an angular orientation within housing 306. Fiber coils 410 may have an upper coil portion 422 and/or a lower coil portion 424 resulting from the relationship of low elevation retainer 408 and/or first and second high elevation retainers 412 and 414.

Housing 306 may be configured so that fiber coils 410 are retained in a manner in accordance with a manufacturer suggested minimum bend radius, which may be one-half of diameter 426. Assume that a manufacturer specifies that fibers 402A-D should have a recommended bend radius of at least 1.5 inches. Fiber management portion 308 of housing 306 may be configured so that fiber coils 410 are retained at an angular orientation using low elevation retainer 408 and one or more first and/or second high elevation retainers 412 and/or 414. The angled orientation of fiber coils 410 may facilitate achieving at least the manufacturer recommended minimum bend radius.

Fibers 402A-D may be terminated within housing 306 using, for example, a like number of receptacle bodies 416A-D. Receptacle bodies 416A-D may include any device capable of terminating an optical fiber and making signals traversing the fiber available to another device, such as a connector, and/or to a destination, such as a user premises. Receptacle bodies 416A-D may include connectors for mating a terminated fibers 402A-D with a receptacle body and/or fiber 402A-D may be mated with receptacle body 410A-D using a fused and/or adhesive based connection.

Housing 306 may include a gasket 418 located in a recess, or channel, to facilitate a watertight seal with a base, such as base 302. Gasket 418 may include any device capable of facilitating a moisture resistant seal with a mating surface. For example, gasket 418 may include an elastomer-like material with or without adhesive, lubricant, and/or sealing compounds such as liquids and/or gels.

Figure 5:
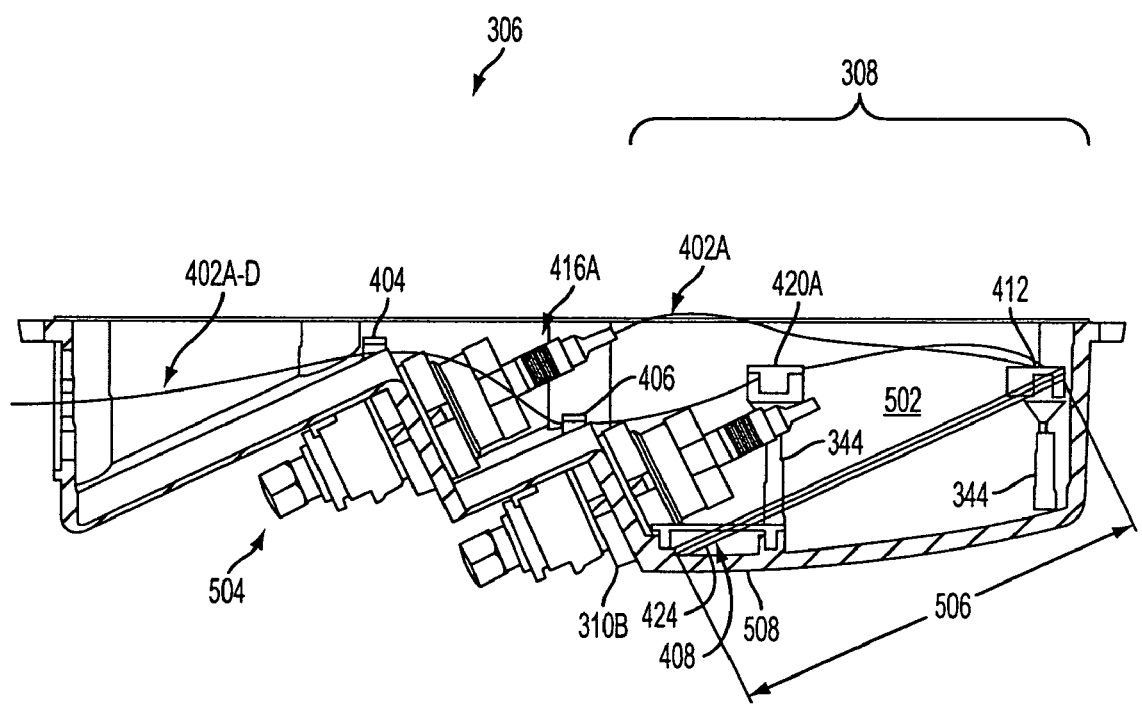
FIG. 5 illustrates a cross-section of an exemplary implementation of a fiber drop terminal housing employing a fiber management cavity for storing fiber coils at an angled orientation, consistent with the principles of the invention.

FIG. 5 illustrates a cross-section of an exemplary implementation of a fiber drop terminal housing 306 employing a fiber management cavity for storing fiber coils at an angled orientation, consistent with the principles of the invention. Housing 306 may include components illustrated and described in conjunction with FIGS. 3A, 3B and/or 4, such as input channel 316, output receptacle 310, incoming fiber bundle 318, etc. Housing 306 may employ a first high elevation retainer 412 for retaining one or more fibers 402A-D. First high elevation retainer 412 may be used individually and/or in combination with other fiber retention devices. First high elevation retainer 412 may be located in storage cavity 502 and may be slideably disposed in retainer mounting channel 344 to variably position optical fibers 402A-D with respect to the interior of housing 306.

As shown in FIG. 5, low elevation retainer 408 may operate with one or more high elevation retainers 412 and/or 414 to retain fiber coils 410 at an angled orientation 506 relative to storage cavity 502 and/or a housing face 508. The use of angled orientation 506 may facilitate storage of fiber coils 410 without violating a manufacturer recommended bend radius. Implementations may employ angular orientations having a wide range of angles with respect to a reference location, such as housing face 508. In one implementation angular orientation 506 with respect to housing face 508 may be on the order of 20° to 60° and in another implementation may be on the order of 35° to 45°. Storing the fiber coils 410 at an angular orientation with respect to an outer surface of fiber drop terminal 300, as opposed to a planar orientation with respect to an outer surface of terminal 300, advantageously enables the overall dimensions of fiber drop terminal 300 to be reduced, while maintaining a desired minimum bend radius. The orientation of the angled fiber coil 410 may be reversed so that the base of retainer mounting channel 344 is associated with, for example, base 302 instead of with a face of housing face 306. Housing 306 may include dummy plug 504 to protect output receptacle 310 when output connector 312 is not installed.

Figure 6:
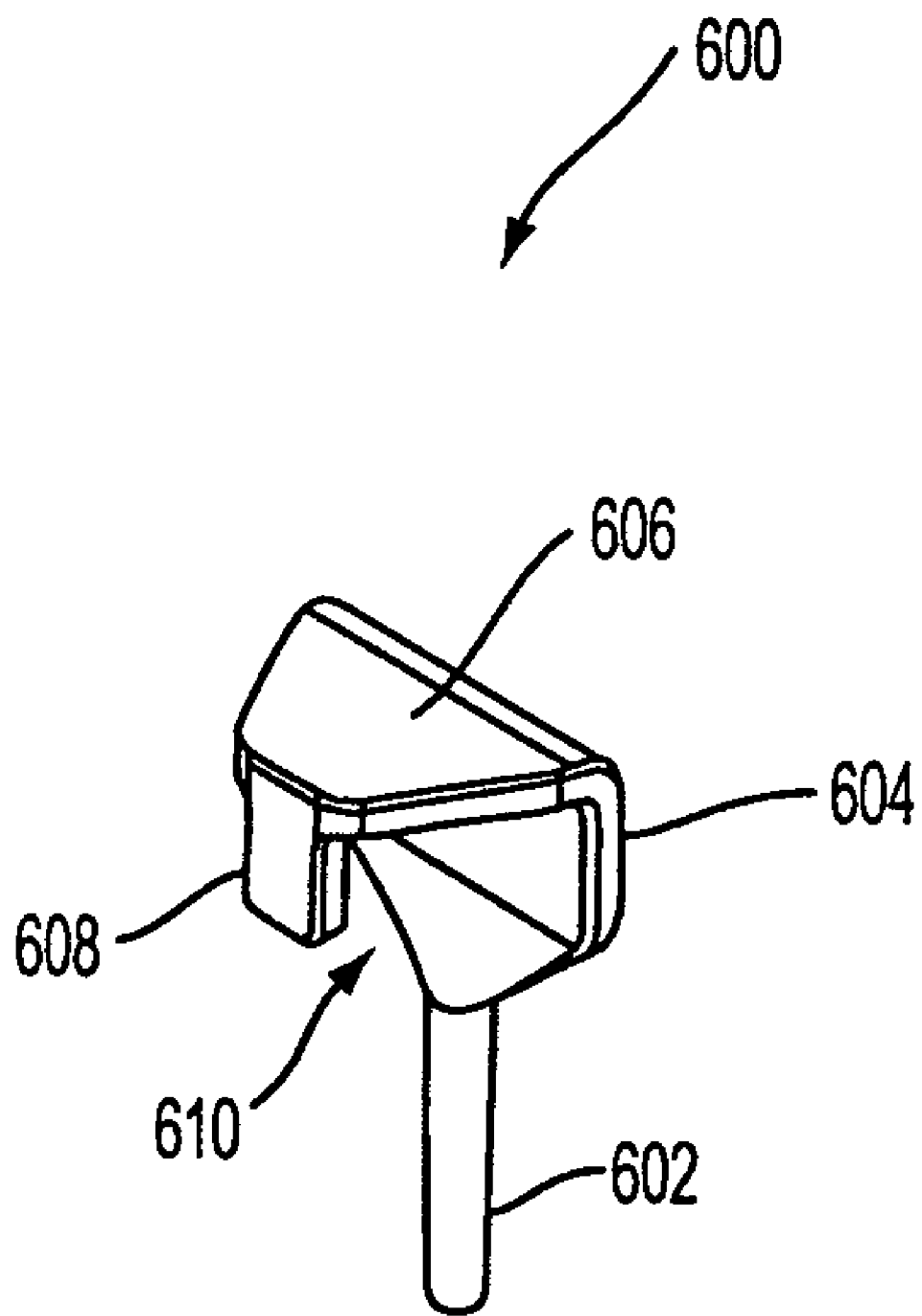
FIG. 6 illustrates an exemplary implementation of a fiber retention device in accordance with an implementation consistent with the principles of the invention.

FIG. 6 illustrates an exemplary implementation of a fiber retention device in accordance with an implementation consistent with the principles of the invention. The fiber retention device of FIG. 6 may be implemented as retainer hook 600. Retainer hook 600 may include a mounting post 602, a back face 604, a top face 606, and a retaining face 608. Back face 604, top face 606, and retaining face 608 may form an inner channel 610 for receiving one or more optical fibers. Retainer hook 600 may include any device capable of retaining one or more optical fibers in a desired position. Retainer hook 600 may be fabricated from plastic, composite, metal, glass, or the like depending on the desired properties of hook 600. For example, fiber coils 410 may be placed within inner channel 610. Fiber coils 410 may be retained using the inner surface of retaining face 608. Tension present in fiber coils 410 may facilitate retention of fiber coils 410 within inner channel 610. Retainer hook 600 may include mounting post 602. Mounting post 602 may be adapted to facilitate adjusting a height of inner channel 610 with respect to storage cavity 502 and/or another reference location. Mounting post 602 may be slideably disposed within retainer mounting channel 344 (FIG. 3B and FIG. 5) for adjusting the height of inner channel 610 with respect to a reference location.

Fiber management components, such as retainer mounting channel 344, first central retainer 404, low elevation retainer 408, and retainer hook 600 may be fabricated from plastic, composite, metal, rubber, and the like. In one implementation, the fiber management components are fabricated from the same material used to make terminal 300 so that fiber management components may have the same thermal coefficients as, for example, base 302 and housing 306. For example, base 302, housing 306, and/or fiber management components may be fabricated from polypropylene.

Terminal 300 may be used in utility pole mount installations where incoming fiber bundle 318 approaches terminal 300 via a breakout originating from a strand located above terminal 300. In this configuration, terminal 300 may be adapted to receive incoming fiber bundle 318 from an input channel 316 located in an upper portion of terminal 300. Alternatively, terminal 300 may have input channel 316 located in a lower portion of terminal 300. When terminal 300 is adapted for bottom entry, an input cable may need to bypass the terminal on the pole and be looped on the pole for entry in the bottom of the terminal. One or more output receptacles may be arranged so as to discourage entry of precipitation as well as for channeling water away from receptacles 310A-D. Output receptacles 310A-D may be mounted so as to facilitate access by a linesman having a desired angle of approach regardless of whether a bottom entry or top entry input channel 316 is used.

As used herein, angle of approach may broadly refer to an anticipated direction and/or angle from which a linesman will approach and/or access terminal 300, a mounting bracket, output receptacle 310, and/or output connector 312 when being connected to output receptacle 310 and/or removed from output receptacle 310. An angle of approach may vary based on a mounting location of terminal 300 (e.g., on a utility pole, pedestal, building, etc.), the orientation of terminal 300 (e.g., horizontal mounting vs. vertical mounting), a method of approach utilized by a linesman (e.g., approach by ladder, bucket lift, and/or foot), and/or a working position taken by a linesman when interacting with terminal 300 (e.g., using one hand while the other hand holds a ladder rung, and/or using two hands while in a bucket lift and/or while standing on grade). In addition, the angle of approach may take into account the size of a connector and/or cable being coupled to an input receptacle and/or output receptacle 310, prevailing weather patterns, aesthetic appearance of the terminal 300, the number of connections on terminal 300, etc.

Figure 7A:
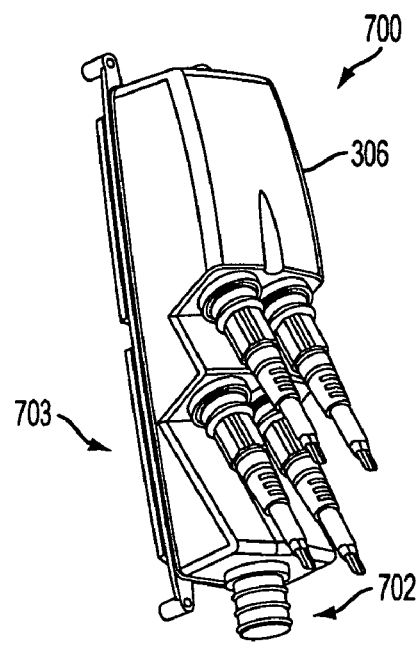
FIG. 7A illustrates an exemplary implementation of a fiber drop terminal that may include a fiber input channel located in a lower portion of the terminal, consistent with the principles of the invention.

FIG. 7A illustrates an exemplary implementation of a fiber drop terminal 700 that may include a fiber input channel located in a lower portion 703 of terminal 700, consistent with the principles of the invention. In FIG. 7A, terminal 700 may include a lower input channel 702 for receiving an incoming fiber bundle 318. Incoming fiber bundle 318 may be sealed to lower input channel 702 to form a weather tight interface using, for example, potting, over-molding, sealant, and/or weather tight feed-throughs. Terminal 700 may facilitate shedding water away from lower input channel 702 by placing input channel 702 proximate to a lower portion 703 of terminal 700 when mounted to, for example, a utility pole. If incoming fiber bundle 318 is received from a suspended strand, incoming fiber bundle 318 may have to be run alongside terminal 700 and looped upwards, while maintaining a determined bend radius, to pass fiber bundle 318 into lower input channel 702.

Figure 7B:
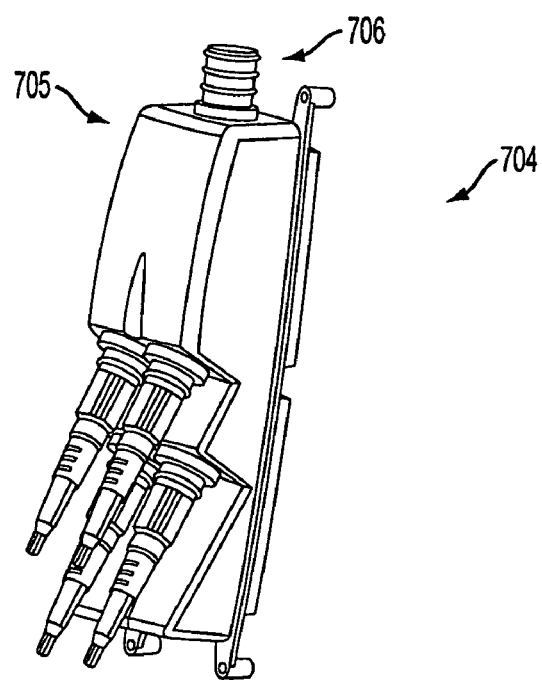
FIG. 7B illustrates an exemplary implementation of a fiber drop terminal including a fiber input channel located in an upper portion of the terminal, consistent with the principles of the invention.

FIG. 7B illustrates an exemplary implementation of a fiber drop terminal 704 including a fiber input channel located in an upper portion 705 of terminal 704, consistent with the principles of the invention. In FIG. 7B, terminal 704 may include an upper input channel 706 for receiving an incoming fiber bundle 318. Fiber bundle 318 may be sealed to upper input channel 706 using, for example, potting, over-molding, sealant, and/or weather tight feed-throughs. An implementation, such as terminal 704, may facilitate running an incoming fiber bundle 318 received from, for example, a suspended strand, into upper input channel 706 without requiring undue bending of incoming fiber bundle 318.

Figure 8A:
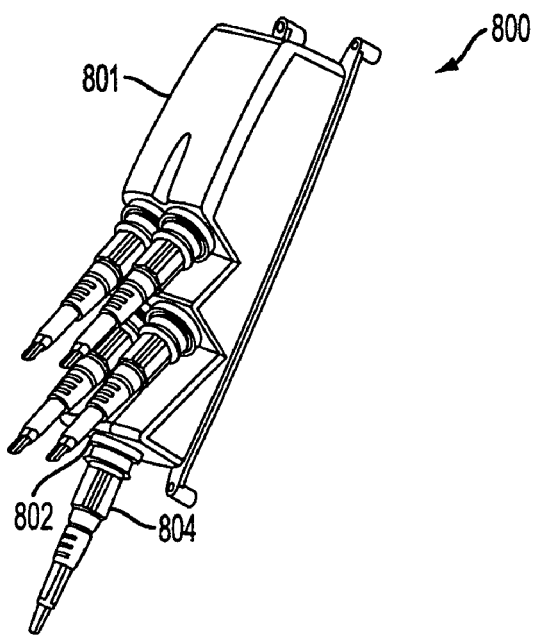
FIGS. 8A and 8B illustrate the exemplary implementations of FIGS. 7A and 7B, respectively, in combination with ruggedized multi-fiber input connectors to facilitate a removable interconnection between an incoming fiber bundle and/or an output connector, consistent with the principles of the invention.
Figure 8B:
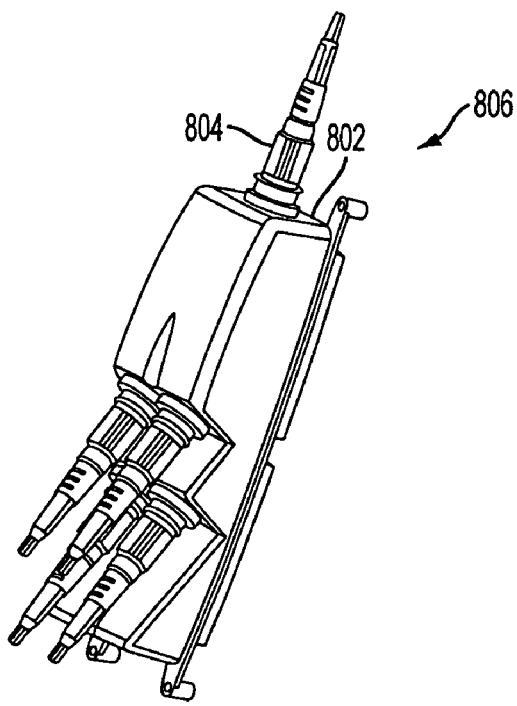

FIGS. 8A and 8B illustrate the exemplary implementations of FIGS. 7A and 7B, respectively, in combination with ruggedized multi-fiber input connectors to facilitate a removable interconnection between an incoming fiber bundle 318 and/or an output connector, such as output connector 312, consistent with the principles of the invention. In FIG. 8A, terminal 800 may include a housing 801 and an input receptacle 802 for receiving an input connector 804. Input receptacle 802 may include any device capable of mating with a connector. Input connector 804 may include any device capable of making optical signals present in one or more optical fibers available to another device. In one implementation, input receptacle 802 may provide a weather tight seal when coupled to input connector 804. Input receptacle 802 may be capped using a dummy input plug when input connector 804 is not present. Terminal 800 may include input receptacle 802 located at a lower portion of terminal 800. Input receptacle 802 may be adapted to facilitate shedding of water from a mating area of input receptacle 802 and input connector 804 using, for example, o-ring seals.

In FIG. 8B, terminal 806 may include an input receptacle 802 for receiving an input connector 804. Input receptacle 802 may be located in an upper portion of terminal 806. Locating input receptacle 802 in an upper portion of terminal 806 may facilitate direct routing of an incoming fiber bundle to input receptacle 802 without requiring that incoming fiber bundle 318 be bent in, for example, a loop before mating input connector 804 to input receptacle 802. The implementations of FIGS. 8A and 8B may allow for the installation of ruggedized input connectors on an incoming fiber bundle 318 at the time a multi-strand fiber optic cable is manufactured. For example, if an incoming fiber bundle 318 includes four optical fibers, input connector 804 may be adapted to make optical signals traversing the four fibers available to a like number of optical fibers associated with input receptacle 802. Input connector 804 may be capped using a dummy receptacle to protect optical fibers within the connector when not in use. A dummy receptacle may provide a weather tight seal and may be removed when input connector 804 is coupled to terminal 800 and/or 806. The implementations of FIGS. 8A and 8B may facilitate economic fabrication of fiber drops while providing a way to keep connectors and/or input receptacles sealed until they are needed. While implementations associated with FIGS. 8A and 8B have illustrated input receptacle 802 as located in a lower portion or an upper portion of terminal 800 and 806, input receptacle 802 may be located elsewhere. For example, input receptacle 802 may be located on a side of terminal 800 and/or 806 and/or on a front surface and/or base of terminal 800 and/or terminal 806.

Figure 8C:
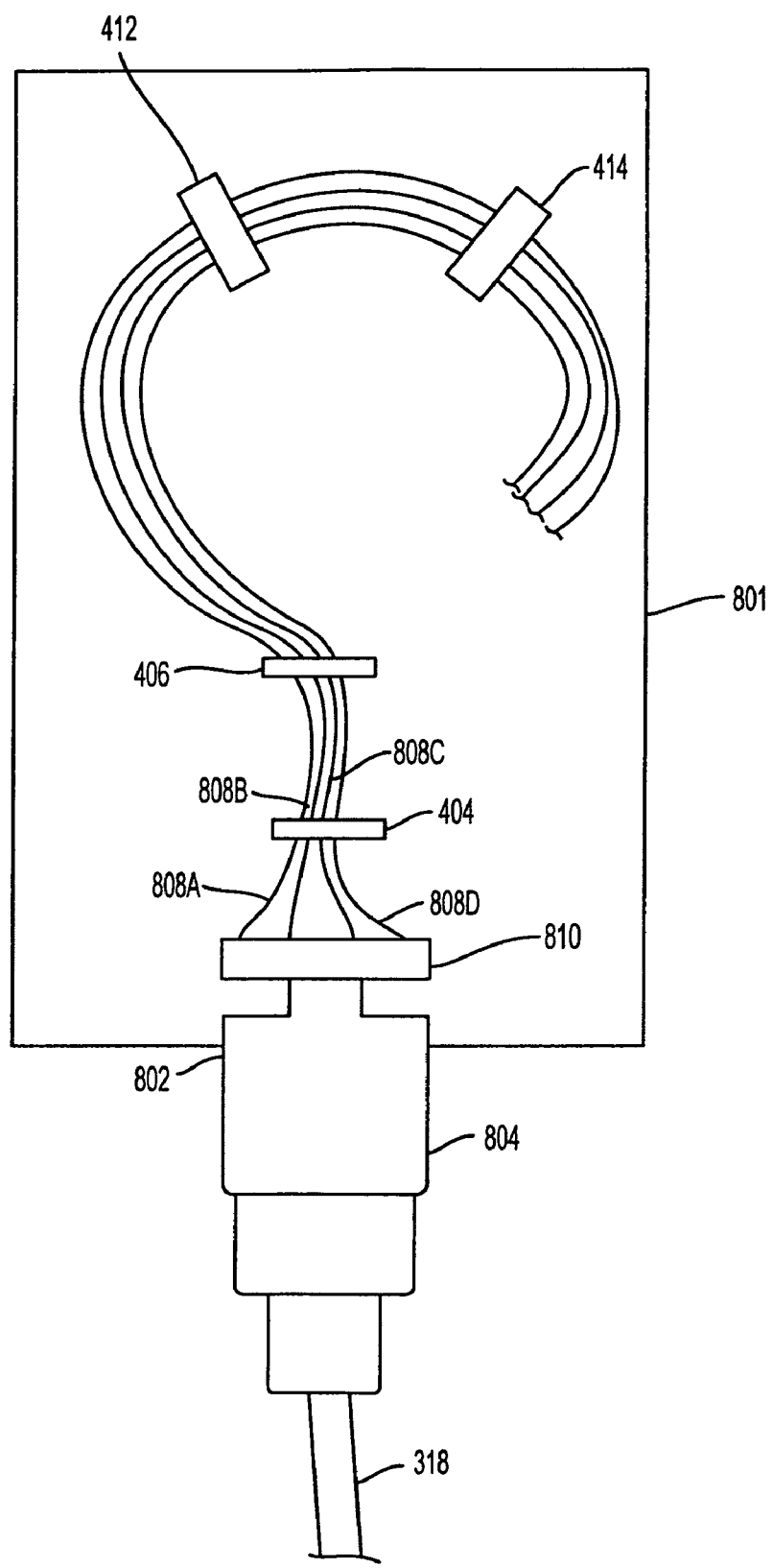
FIG. 8C illustrates an overhead view of an exemplary implementation of the fiber drop terminal of FIG. 8A and/or 8B showing fiber retention and/or routing techniques that may be employed within the terminals, respectively, consistent with the principles of the invention.

FIG. 8C illustrates an overhead view of an exemplary implementation of the fiber drop terminals of FIG. 8A and/or 8B showing fiber retention and/or routing techniques that may be employed within terminal 800 and/or 806, respectively, consistent with the principles of the invention. The implementation of FIG. 8C may include a housing 801, an incoming fiber bundle 318, first and second central retainer 404, 406, first and second high elevation retainer 412 and/or 414, an input receptacle 802, an input connector 804, a breakout device 810, optical fibers 808A-D. Housing 306, incoming fiber bundle 318, first central retainer 404 and/or second central retainer 406, first and second high elevation retainer 412 and 414, input receptacle 802 and input connector 804 may be substantially configured, dimensioned and/or arranged as previously described.

Breakout device 810 may include any device capable of receiving an optical signal and making that signal available to one or more optical fibers. Breakout device 810 may be integral with input receptacle 802, such as via molding input receptacle 802 to breakout device 810 and/or breakout device 810 may be removeably attached to input receptacle 802, such as if breakout device 810 is coupled to input receptacle 802 using a keyed attachment mechanism. In one implementation, input receptacle 802 may receive signals associated with four optical fibers, breakout device 810 may convey the respective signals to optical fibers 808A-D. Optical fibers 808A-D may have respective proximal ends and distal ends. The proximal ends of optical fibers 808A-D may be coupled to breakout device 810 and the distal ends may be associated with one or more output receptacles 310. For example, housing 306 may accommodate four output receptacles. In one implementation, optical fiber 808A may be associated with a first output receptacle, optical fiber 808B may be associated with a second output receptacle, optical fiber 808C may be associated with a third output receptacle, and optical fiber 808D may be associated with a fourth output receptacle.

Optical fibers 808A-D may be routed inside housing 306 using first central retainer 404 and/or second central retainer 406 and first and second high elevation retainer 412 and 414. Optical fibers 808A-D may be cut longer than necessary to reach from breakout device 810 to one or more output receptacles, such as output receptacles 310A-D. Excess fiber associated with optical fibers 808A-D may be placed in fiber coils using, for example, low elevation retainer 408 (not shown in FIG. 8C) and/or first and second high elevation retainer 412 and 414. The fiber coils may be arranged in accordance with manufacturer specified minimum bend radii associated with optical fibers 808A-D. Distal ends of optical fibers 808A-D may have connectors attached thereto for coupling to a like number of receptacle bodies, such as receptacle bodies 416A-D and/or the distal ends may be left bare and fused/spliced to receptacle bodies.

Components used with fiber drop terminals may exert internal and/or external loads on the fiber drop terminal. For example, incoming fiber bundle 318, output connector 312, and/or output fiber 314 may impart loads and/or stresses on terminal 300. In some situations, these loads and/or stresses may be transferred directly portions of terminal 300. Loads and/or stresses applied to terminal 300 may increase and/or decrease due to sagging cables, cables subject to wind loads and/or cables subject to ice loads. Constant and/or varying loads and/or stresses may lead to formation of stress cracks on portions of terminal 300. For example, stress cracks may form at stress concentration points on terminal 300, such as proximate to first transition region 334, second transition region 338, first inside angle 340, and/or second inside angle 342. Implementations may employ reinforcing techniques to mitigate loads and/or stresses associated with implementations of fiber drop terminals, such as terminal 300.

Figure 9A:
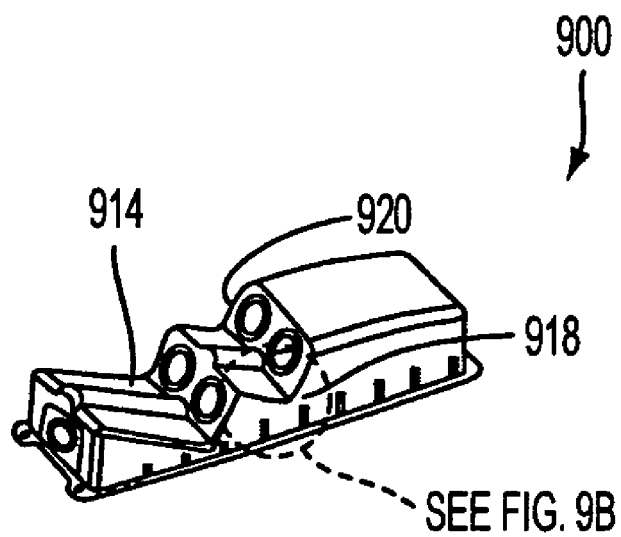
FIGS. 9A and 9B illustrate an exemplary implementation of a fiber drop terminal having a reinforced housing that may include reinforcing gussets at locations that may be associated with regions of adverse stress, consistent with the principles of the invention.
Figure 9B:
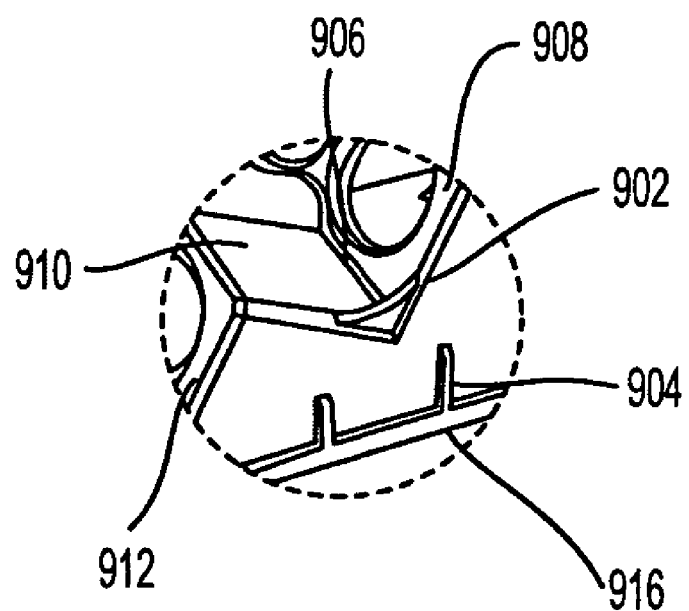

FIGS. 9A and 9B illustrate an exemplary implementation of a fiber drop terminal having a reinforced housing that may include reinforcing gussets at locations that may be associated with regions of adverse stress, consistent with the principles of the invention. Reinforced housing 900 (FIG. 9A) may include an external gusset 902 and/or an external housing rib 904. External gusset 902 may include any device capable of providing a retention force between two surfaces joined at an intersection and forming an angle. For example, external gusset 902 may span valley 906 by contacting first stepped face 908 and/or first transition region 910 and/or second stepped face 912 and/or second transition region 914 (FIG. 9A). External gusset 902 may operate to increase the rigidity of first stepped face 908, second stepped face 912 and/or valley 906. External gusset 902 may be molded with reinforced housing 900, held in place via adhesive and/or mechanical fasteners. External gusset 902 may be implemented as a pair with one gusset located proximate to a first outer edge 918 of reinforced housing 900 and the other gusset located proximate to a second outer edge 920 of reinforced housing 900. External gusset 902 may be adapted so as to not interfere with output receptacle 310 and/or output connector 312.

Implementations of reinforced housing 900 may utilize one or more internal gussets in addition to, or in lieu of, external gusset 902. Internal gussets may be located proximate to valley 906 within an inner cavity associated with reinforced housing 900. Inner gussets may operate to reinforce valley 906 to reduce detrimental effects of loads and/or stresses applied to reinforced housing. Implementations may reinforce valley 906 and/or housing portions proximate thereto by increasing the thickness of material used to form valley 906 and/or housing portions proximate thereto. The cross-section of valley 906 may be increased in conjunction with the use of gusset 902 or the cross-section of valley 906 may be increased in place of employing gusset 902. Implementations may also employ standoffs spanning from an inner point of valley 906, located within an inner cavity of terminal 900, to a base. Standoffs may be configured and dimensioned so as to exert a force on a portion of a base when a housing of terminal 900 is attached to the base. Loads associated with valley 906 may be transferred via the standoff to the base and/or to a mounting bracket associated with a base.

Implementations of reinforced housing 900 may include an external housing rib 904 to increase the stiffness associated with a side of reinforced housing 900. For example, one or more external housing ribs 904 may be arranged substantially perpendicular to a mounting face 916. An external housing rib 904 may operate to increase the cross section of reinforced housing 900 proximate to an area of potentially adverse load and/or stress. Reinforced housing 900 may include internal housing ribs in addition to, or in lieu of, external housing ribs 904 and/or external gusset 902.

Analytical tools such as finite element modeling can be used for analyzing an existing enclosure design and/or for designing new enclosures so as to minimize the likelihood of load and/or stress related failures. For example, finite element modeling may be used to identify an implementation of a stepped-face enclosure wherein fasteners and their corresponding attachment structures are located so as to coincide with locations of high stress, such as for example, at either end of a valley 906. In particular, the fasteners can be used to attach the enclosure to a base in a manner providing reinforcement to the valley 906.

Figure 10A:
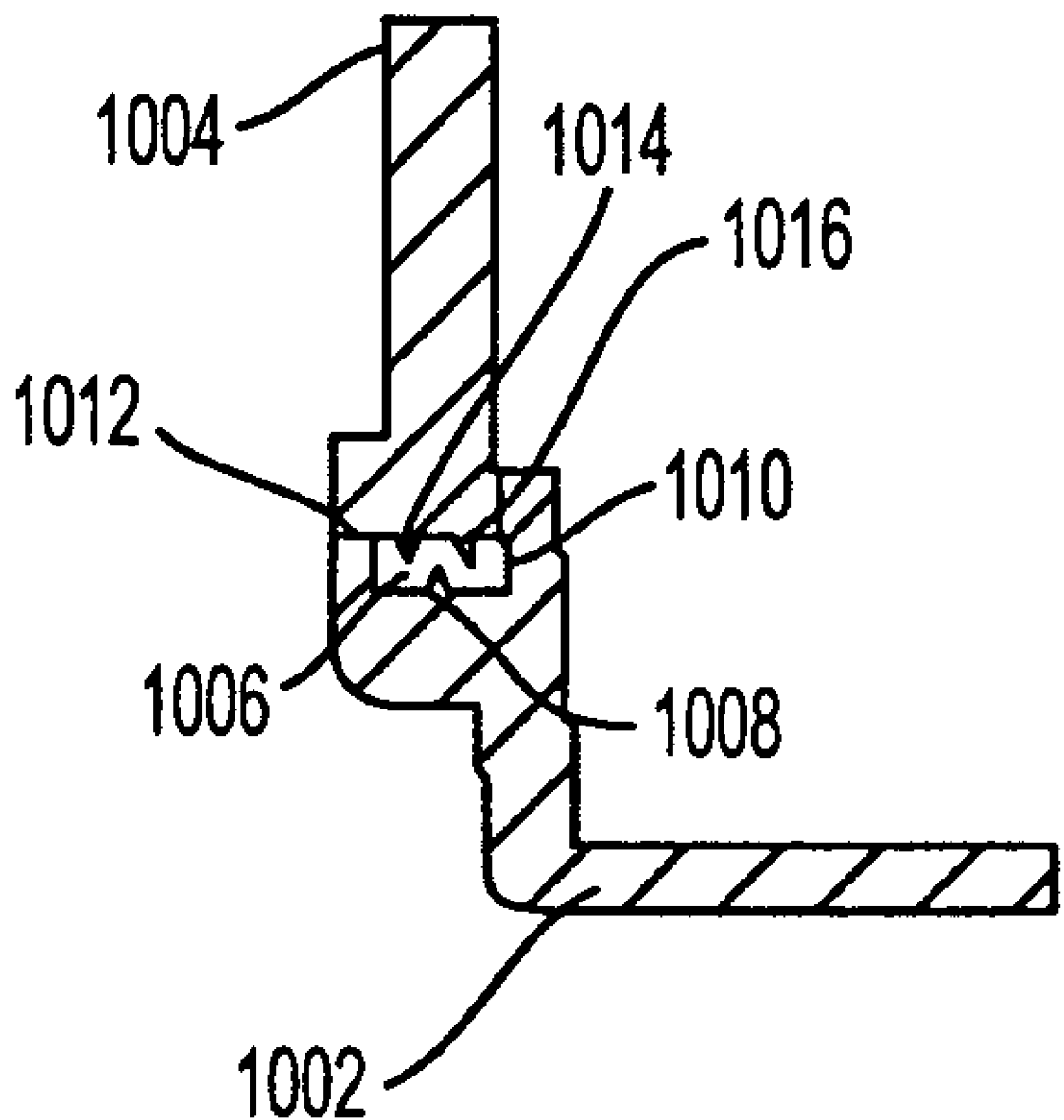
FIG. 10A illustrates an exemplary implementation of an enclosure mating surface utilizing a gasket device to facilitate a weatherproof seal between a housing and a base, consistent with the principles of the invention.

FIG. 10A illustrates an exemplary implementation of an enclosure mating surface utilizing a gasket device to facilitate a weatherproof seal between a housing and a base, consistent with the principles of the invention. The implementation illustrated in FIG. 10A may include, an enclosure base 1002, an enclosure housing 1004, a gasket 1006, a base rib 1008, a channel 1010, a housing mating surface 1012, a first housing rib 1014, and a second housing rib 1016.

Enclosure housing 1004 may be similar in shape, design and/or material composition to housing 306. Enclosure housing 1004 may include an upper surface and a lower surface. The upper surface may have an outer surface exposed to the elements and an inner surface forming an inner cavity for housing fiber pigtails. The upper surface of enclosure housing 1004 may include output receptacles and/or output connectors. The lower surface of enclosure housing 1004 may include a mating surface 1012. Mating surface 1012 may be substantially flat so as to form a weather tight seal with enclosure base 1002 and/or gasket 1006. Enclosure housing 1004 may include a first housing rib 1014 and/or a second housing rib 1016 extending from a portion of mating surface 1012. First housing rib 1014 and/or second housing rib 1016 may operate with mating surface 1012 to cause a deformation of gasket 1006 when enclosure housing 1004 is mated to enclosure base 1002 using, for example, threaded fasteners.

Enclosure base 1002 may be similar to base 302 in shape, design and/or material composition. Enclosure base 1002 may include a substantially continuous channel 1010 running proximate to a perimeter of enclosure base 1002. Channel 1010 may be configured to receive gasket 1006. Channel 1010 may be sized so that gasket 1006 extends slightly beyond the surfaces of enclosure base 1002 that gasket 1006 may contact housing mating surface 1012 when enclosure housing 1004 is mated to enclosure base 1002. Enclosure base 1002 may include a base rib 1008 for facilitating deformation of gasket 1006 when enclosure housing 1004 is mated to enclosure base 1002.

Figure 10B:
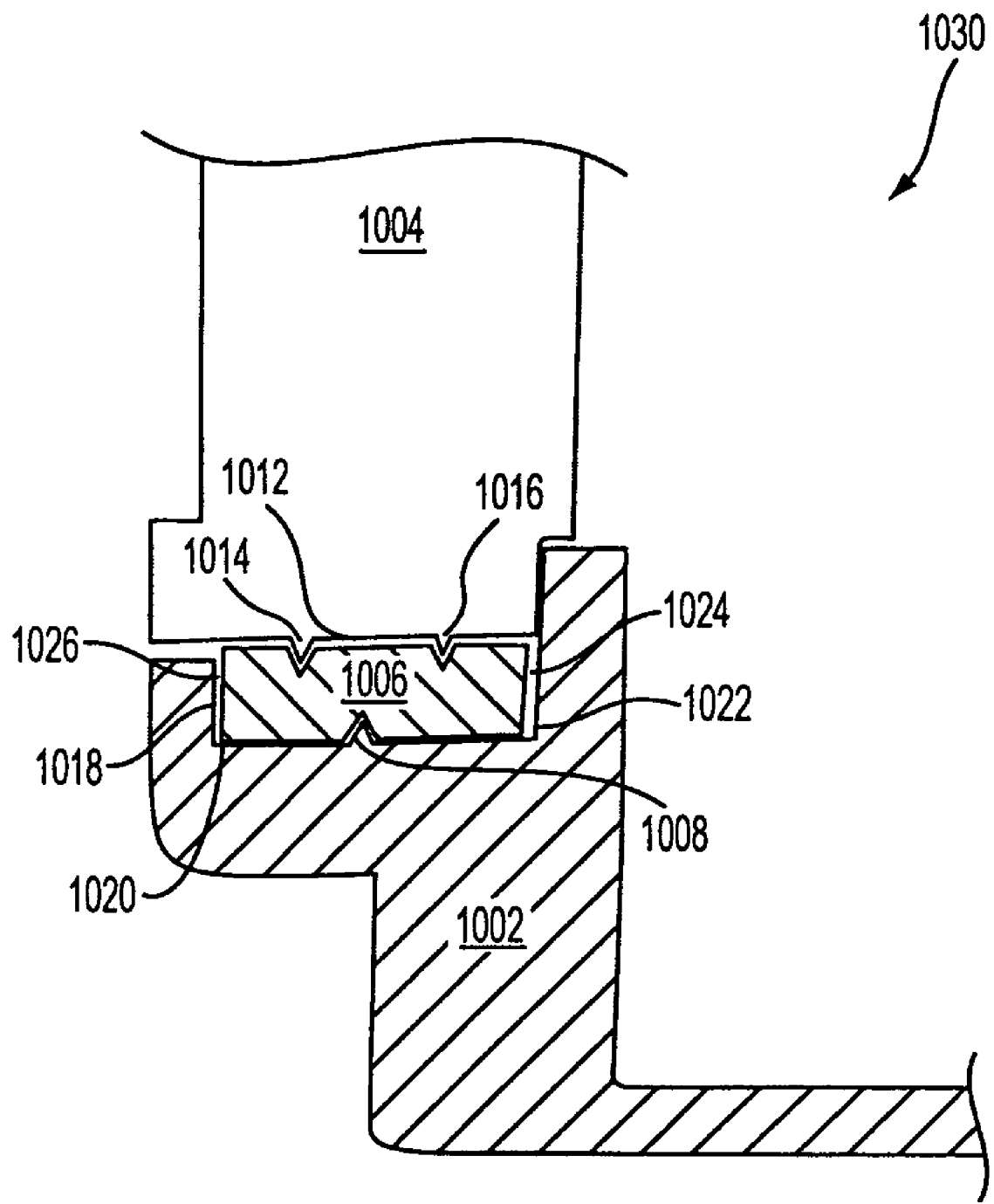
FIG. 10B illustrates the mating surface of the exemplary implementation of FIG. 10A in greater detail, consistent with the principles of the invention.

FIG. 10B illustrates the mating surface of the exemplary implementation of FIG. 10A in greater detail, consistent with the principles of the invention. In addition to the elements shown in FIG. 10A, the implementation of FIG. 10B may include a first inner wall 1018, a lower wall 1020, a second inner wall 1022, an inner void 1024 and an outer void 1026. When gasket 1006 is uncompressed, as shown in FIG. 10B, an inner void 1024 and outer void 1026 may be present. When housing mating surface 1012, in combination with first housing rib 1014 and second body rib 216, applies pressure to a first side of gasket 1006 and base 1002, in combination with base rib 1008, applies pressure to gasket 1006 from a second side, gasket 1006 may expand laterally to fill inner void 1024 and/or outer void 1026. When compressed, gasket 1006 may exert sufficient pressure on mating surface 1012 and the inner walls of channel 1010, namely first inner wall 1018, second inner wall 1022 and lower wall 1020, to prevent moisture from entering an inner cavity 1030 of housing 1004.

First housing rib 1014, second housing rib 1016 and/or base rib 1008 may operate to facilitate a lateral expansion of gasket 1006. First housing rib 1014, second housing rib 1016 and/or base rib 1008 may serve to form a circuitous path for moisture and/or condensed vapor proximate to mating surface 1012, gasket 1006, and channel 11010. Gasket 1006 may be used dry and/or with gasket sealants and/or lubricants known in the art. In one implementation, gasket 1006 may have a substantially rectangular cross-section when uncompressed. Uniform expansion of gasket 1006 helps facilitate a waterproof seal. In an alternative implementation, channel 1010 and gasket 1006 may be disposed in enclosure housing 1004.

Implementations may facilitate correct installation on a mounting structure, such as a utility pole, by using a mounting bracket that is attached to the mounting structure using a tool, such as a hammer. A fiber drop terminal, such as terminal 300, may be attached to the mounting bracket without requiring tools. The risk of damage to a fiber drop terminal may be reduced when installation of the terminal to a mounting bracket and/or a mounting structure may take place without the use tools. Implementations may employ a relatively uncomplicated locking and/or retaining mechanism for removeably coupling the fiber drop terminal to the mounting bracket.

Figure 11A:
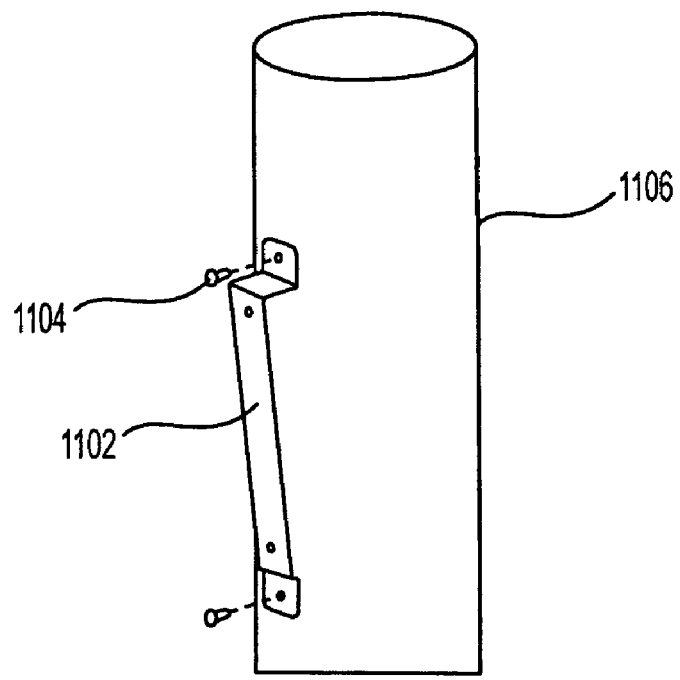
FIG. 11A illustrates an exemplary implementation of a mounting bracket that may be used to attach an implementation of a fiber drop terminal to a substantially vertical surface, consistent with the principles of the invention.

FIG. 11A illustrates an exemplary implementation of a mounting bracket that may be used to attach an implementation of a fiber drop terminal to a substantially vertical surface, consistent with the principles of the invention. FIG. 11A may include a mounting bracket 1102, a fastener 1104 and a utility pole 1106. Mounting bracket 1102 may include any device capable of receiving a fiber drop terminal and coupling the fiber drop terminal to a mounting structure. Fastener 1104 may include any device capable of securing mounting bracket 1102 to a mounting structure, such as utility pole 1106. Utility pole 1106 may include any mounting structure capable of supporting mounting bracket 1102 and/or a fiber drop terminal.

Mounting bracket 1102 may be removeably coupled to utility pole 1106 using fasteners 1104. Mounting bracket 1102 may be fabricated from metal, plastic, composite, etc. Fastener 1104 may include attachment devices such as screws, nails, rivets, etc. Mounting bracket 1102 may be mounted on utility pole 1106 using tools, such as a hammer, screw driver, rivet gun, etc.

Figure 11B:
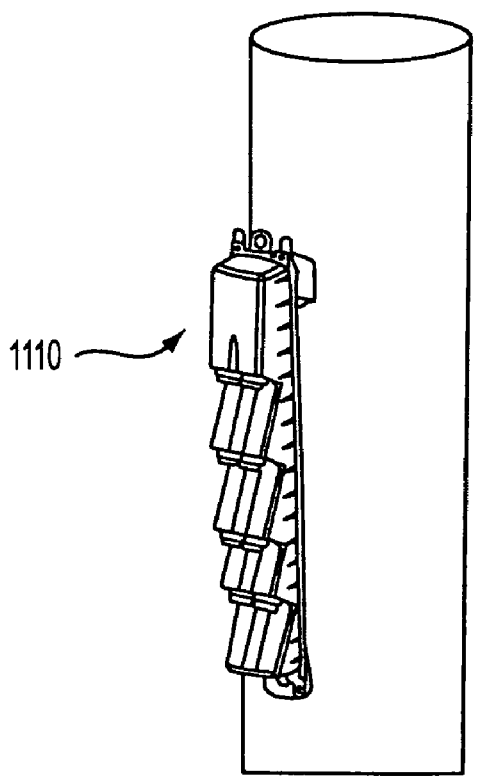
FIG. 11B illustrates an exemplary implementation of a fiber drop terminal mounted to a substantially vertical surface via the mounting bracket illustrated in FIG. 11A, consistent with the principles of the invention.

FIG. 11B illustrates an exemplary implementation of a fiber drop terminal mounted to a substantially vertical surface via the mounting bracket illustrated in FIG. 11A, consistent with the principles of the invention. Fiber drop terminal 1110 may include any device capable of receiving an optical signal from an incoming optical fiber and making the signal available to an outgoing optical fiber. Fiber drop terminal 1110 may be coupled to mounting bracket 1102 after the bracket is attached to utility pole 1106 without the use of tools. For example, fiber drop terminal 1110 may be attached to mounting bracket 1102 using cable ties and/or other fastening techniques known in the art.

Figure 11C:
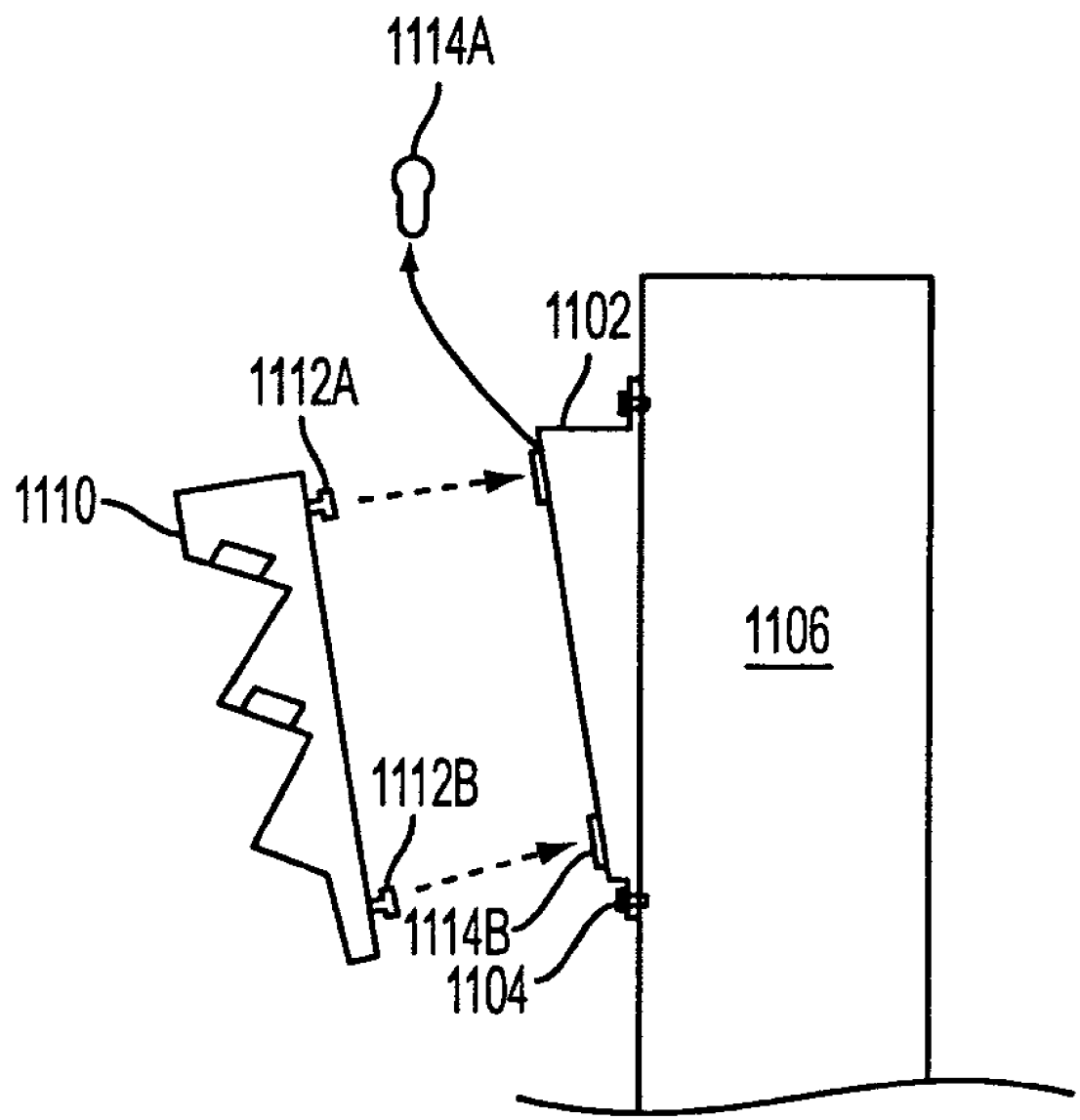
FIG. 11C illustrates an exemplary technique for attaching the fiber drop terminal of FIG. 11B to the bracket of FIG. 11A, consistent with the principles of the invention.

FIG. 11C illustrates an exemplary technique for attaching the fiber drop terminal of FIG. 11B to the bracket of FIG. 11A, consistent with the principles of the invention. FIG. 11C may include mounting bracket 1102, fastener 1104, utility pole 1106, mounting post 1112A and 1112B, fiber drop terminal 1110, and keyed receptacles 1114A and 114B. Mounting bracket 1102 may be mounted as described in conjunction with FIGS. 11A and 11B. Fiber drop terminal 1110 may include one or more mounting posts 1112A and 1112B. Mounting posts 1112A and 1112B may include any device capable of releasably coupling fiber drop terminal 1110 to a mounting bracket 1102. For example, fiber drop terminal 1110 may include a first mounting post located near the top of the terminal and a second mounting post located near the bottom of the terminal. Mounting posts 1112A and 1112B may operate as part of a keyed coupling technique for coupling fiber drop terminal 1110 to mounting bracket 1102. Keyed receptacle 1114A and 114B may be configured to receive mounting post 1112A and 1112B, respectively. For example, mounting post 1112A and 1112B may each have a head attached to a shaft where the head has a larger diameter than the shaft. Keyed receptacles 1114A and 114B may include a top portion having a large opening capable of receiving the head and a lower portion including smaller opening capable of receiving the shaft but not the head. The heads on mounting post 1112A and 1112B may be passed through the large opening and displaced so that the mounting post shafts slide into the smaller keyed receptacle openings.

Fiber drop terminal 1110 may be releasably coupled to mounting bracket 1102 when the shaft is located in the lower portion of the keyed receptacle opening. Fiber drop terminal 1110 may be displaced in a direction substantially opposed to the direction used for installation in order to disengage fiber drop terminal 1110 from mounting bracket 1102.

Figure 11D:
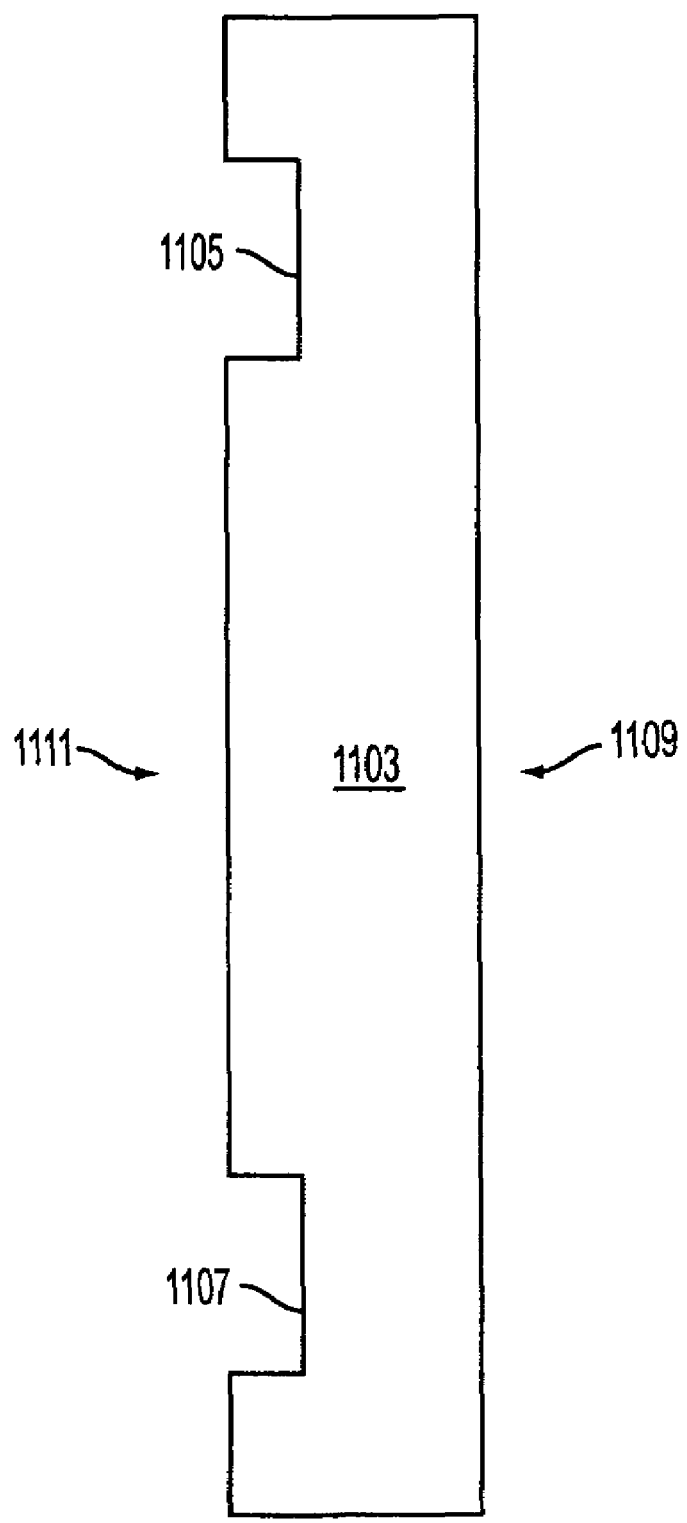
FIG. 11D illustrates an exemplary implementation of a base module having self-alignment channels to facilitate self-alignment of a fiber drop terminal with a mounting bracket, consistent with the principles of the invention.

FIG. 11D illustrates an exemplary implementation of a base module 1103 having self-alignment channels to facilitate self-alignment of a fiber drop terminal with a mounting bracket, consistent with the principles of the invention. Implementations of a fiber drop terminal 1110 may include a base 1103 having one or more channels for mateably coupling fiber drop terminal 1110 to a mounting bracket, such as mounting bracket 1102. The channels may be arranged on a mounting bracket side 1111 of base 1103, which may oppose a housing side 1109. Base 1103 may include an upper channel 1105 and a lower channel 1107. Upper channel 1105 and lower channel 1107 may be configured to mate with, for example, one or more protuberances on mounting bracket 1102. The protuberances may be configured and dimensioned to mate upper channel 1105 and lower channel 1107 to mounting bracket 1102. When upper channel 1105 and/or lower channel 1107 are mated with mounting bracket 1102, fiber drop terminal 1110 may be retained in a desired position. Upper channel 1105 and/or lower channel 1107 may provide a self-alignment feature when mating a fiber drop terminal base and/or housing to mounting bracket 1102. Self-aligning mounting devices may include locking devices, friction based retaining devices, keyed retaining devices, etc. for supporting fiber drop terminal 1110 on mounting bracket 1102.

Implementations employing mounting brackets may be configured to receive incoming signals from one or more locations on a fiber drop terminal. For example, an incoming fiber bundle may enter a fiber drop terminal from the top and/or the bottom.

Figure 11E:
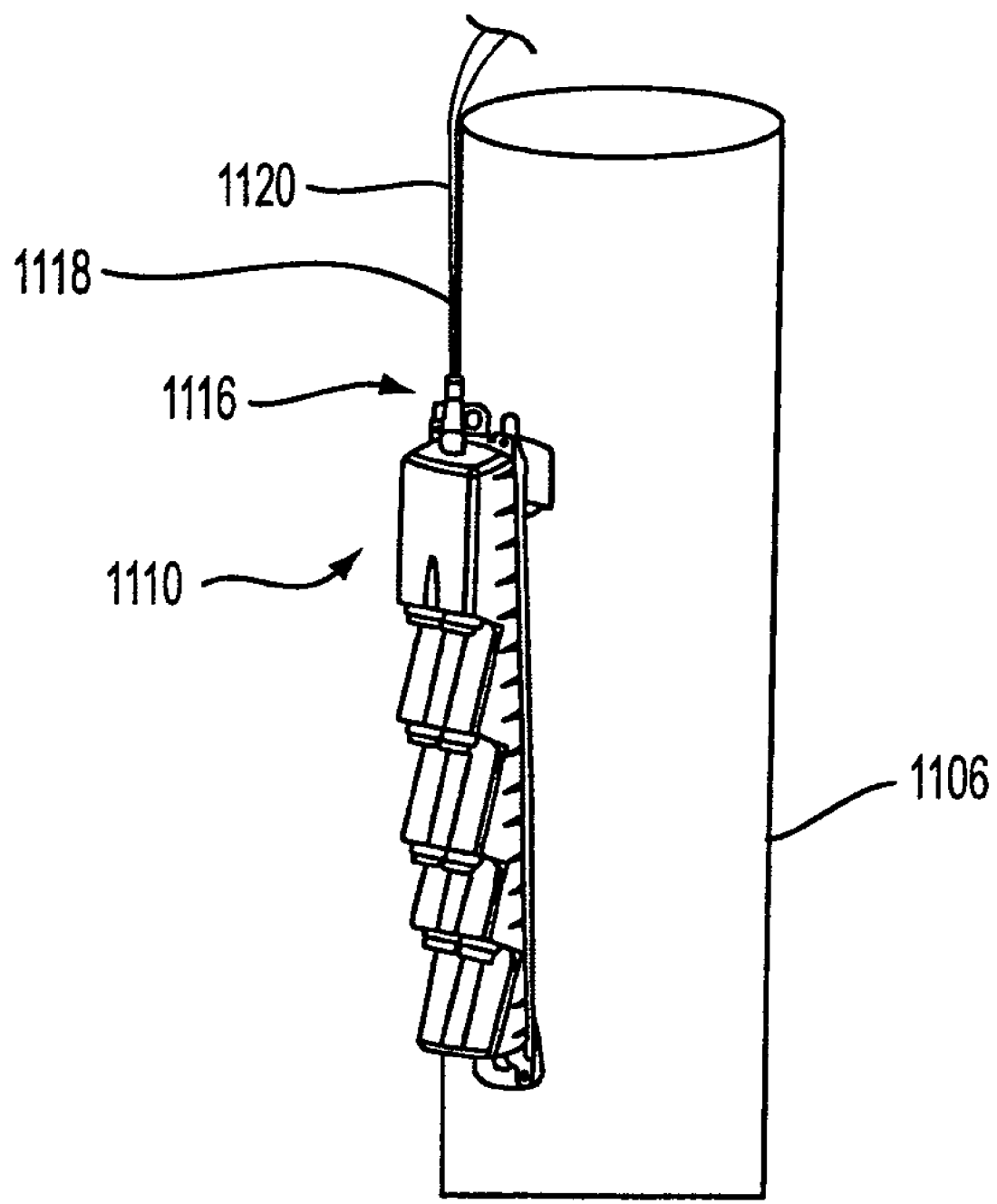
FIG. 11E illustrates the exemplary enclosure of FIG. 11B along with an exemplary implementation of a top entry fiber optic connector, consistent with the principles of the invention.

FIG. 11E illustrates the exemplary enclosure of FIG. 11B along with an exemplary implementation of a top entry fiber optic connector, consistent with the principles of the invention. FIG. 11E illustrates a fiber drop terminal 1110 including a multi-fiber input cable 1120, an input connector 1116, and a strain relief 1118. Fiber drop terminal 1110 may include an input receptacle mounted in a top portion of a terminal housing. Input connector 1116 may couple optical signals associated with one or more optical fibers to one or more components associated with fiber drop terminal 1110. Input connector 1116 may be coupled to a multi-fiber input cable 1120. Strain relief 1118 may be molded and/or potted to multi-fiber input cable 1120 and/or input connector 1116 to provide strain relief to the one or more optical fibers passing through input connector 1116. For example, multi-fiber input cable 1116 may include an outer jacket that protects fibers within the cable and/or operates as a structural member for reducing the risk of damage during handling and/or installation. Strain relief 1118 may be over-molded to the outer jacket and to an outer surface of input connector 1116. Strain relief 1118 may operate to prevent undue flexing of the optical fibers in the vicinity of input connector 1116. Input connector 1116, strain relief 1118 and/or an input receptacle may operate to provide a waterproof connection to fiber drop terminal 1110. Running incoming signals into a top portion of fiber drop terminal 1110 may eliminate the need to bend an input cable prior to connecting input connector 1116 to an input receptacle or terminal 1110.

Figure 11F:
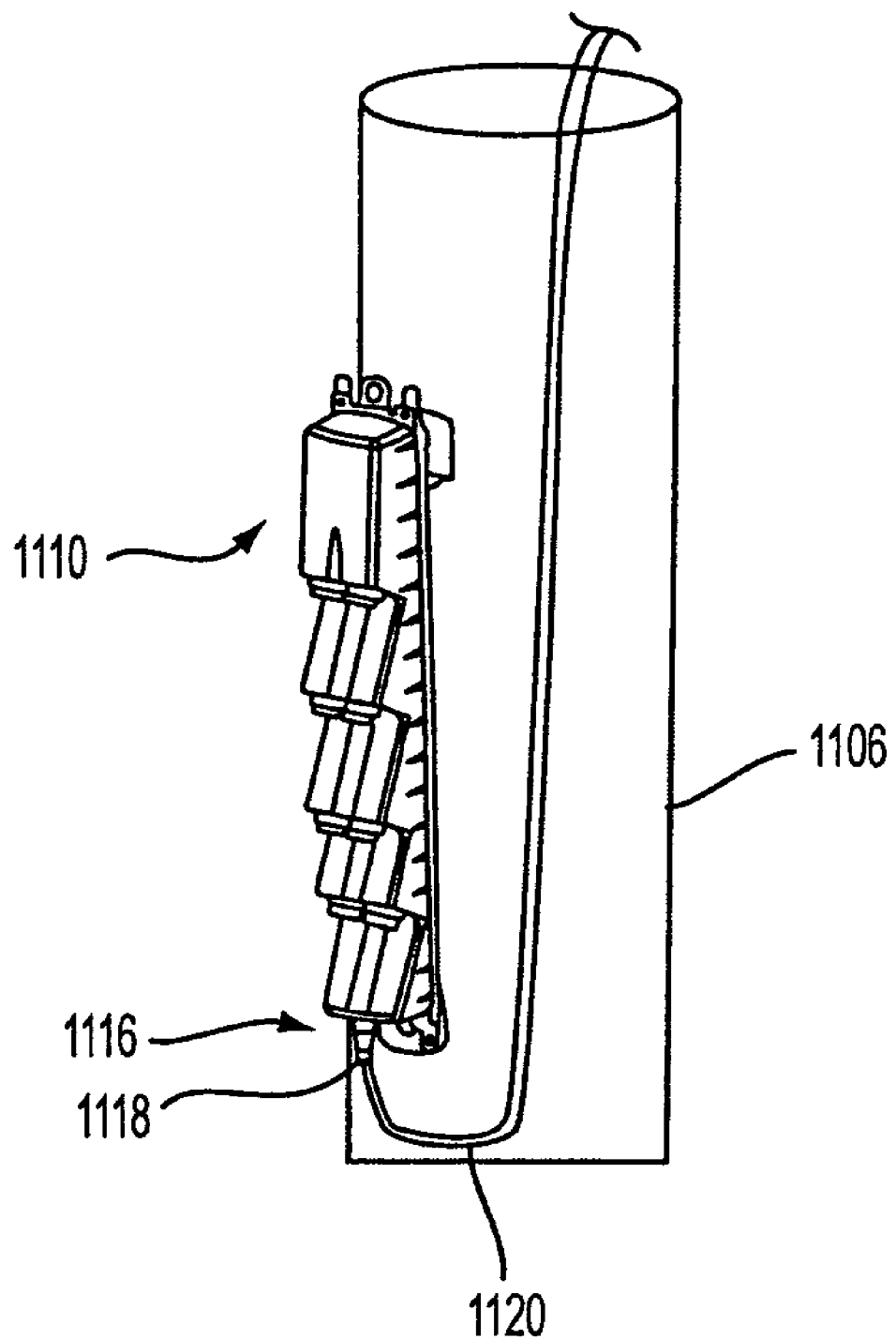
FIG. 11F illustrates the exemplary enclosure of FIG. 11B along with an exemplary implementation of a bottom entry fiber optic connector, consistent with the principles of the invention.

FIG. 11F illustrates the exemplary enclosure of FIG. 11B along with an exemplary implementation of a bottom entry fiber optic connector, consistent with the principles of the invention. FIG. 11F illustrates fiber drop terminal 1110 in an implementation employing an input receptacle located in a bottom portion of the terminal. In FIG. 11F, multi-fiber input cable 1120 enters the bottom of fiber drop terminal 1110. The implementation of FIG. 11F may be desirable in certain situations, such as when it is desirable to discourage water and/or ice accumulation in the vicinity of input connector 1116 and an input receptacle interface on terminal 1110.

Implementations may be installed in outdoor environments for extended periods of time and may be exposed to high and low temperature extremes. Over time, housing 1004 and/or base 1002 may stick to gasket 1006 in such a way that it may be difficult for a linesman to remove the housing from the base 1002 without using a prying device, such as a coin, knife, screw driver, pliers, putty knife, wrench, etc. Implementations may be configured to facilitate separating the housing from a base using a prying device without risking damage to optical fibers within a fiber drop terminal.

Figure 12A:
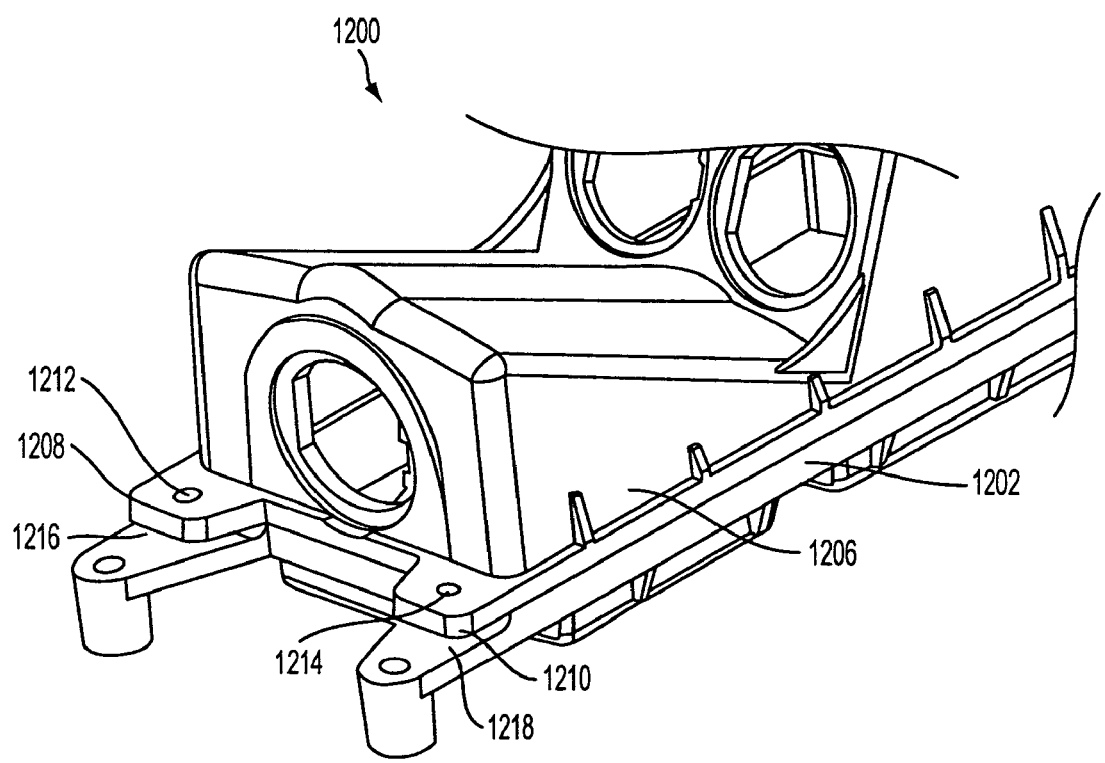
FIG. 12A illustrates a first exemplary implementation of a fiber drop terminal that may include pry tabs for facilitating removal of an enclosure housing from a base, consistent with the principles of the invention.

FIG. 12A illustrates a first exemplary implementation of a fiber drop terminal 1200 that may include pry tabs for facilitating removal of an enclosure housing from a base, consistent with the principles of the invention. The implementation of FIG. 12A may include a base 1202, a housing 1206, a first pry tab 1208, a second pry tab 1210, a first integrated hole 1212, a second integrated hole 1214, a first pry gap 1216 and a second pry gap 1218.

Base 1202 and housing 1206 may be configured in substantially the same manner as base 302 and/or housing 306. First pry tab 1208 and second pry tab 1210 may include any device configured to provide a prying surface for facilitating removal of housing 1206 from base 1202. For example, first pry tab 1208 and second pry tab 1210 may be include protrusions, or tabs, molded onto housing 1206 and having a thickness and/or rigidity sufficient to facilitate separating housing 1206 from base 1202 when a prying device is operated therewith. For example, the tip of a screwdriver may be placed between an underside of first pry tab 1208 and base 1202. The screwdriver may be operated to separate housing 1206 from base 1202 without damaging incoming optical fibers, input connectors, and/or optical pigtails located inside housing 1206.

First pry tab 1208 and second pry tab 1210 may, respectively, include first integrated hole 1212 and second integrated hole 1214. First integrated hole 1212 and second integrated hole 1214 may be configured and arranged to operate as retaining components receiving a retaining device such as a tie wrap, wire tie, string, chain, tape, etc., for securing housing 1206 to base 1202 when housing 1206 has been separated from base 1202 using a prying device.

Figure 12B:
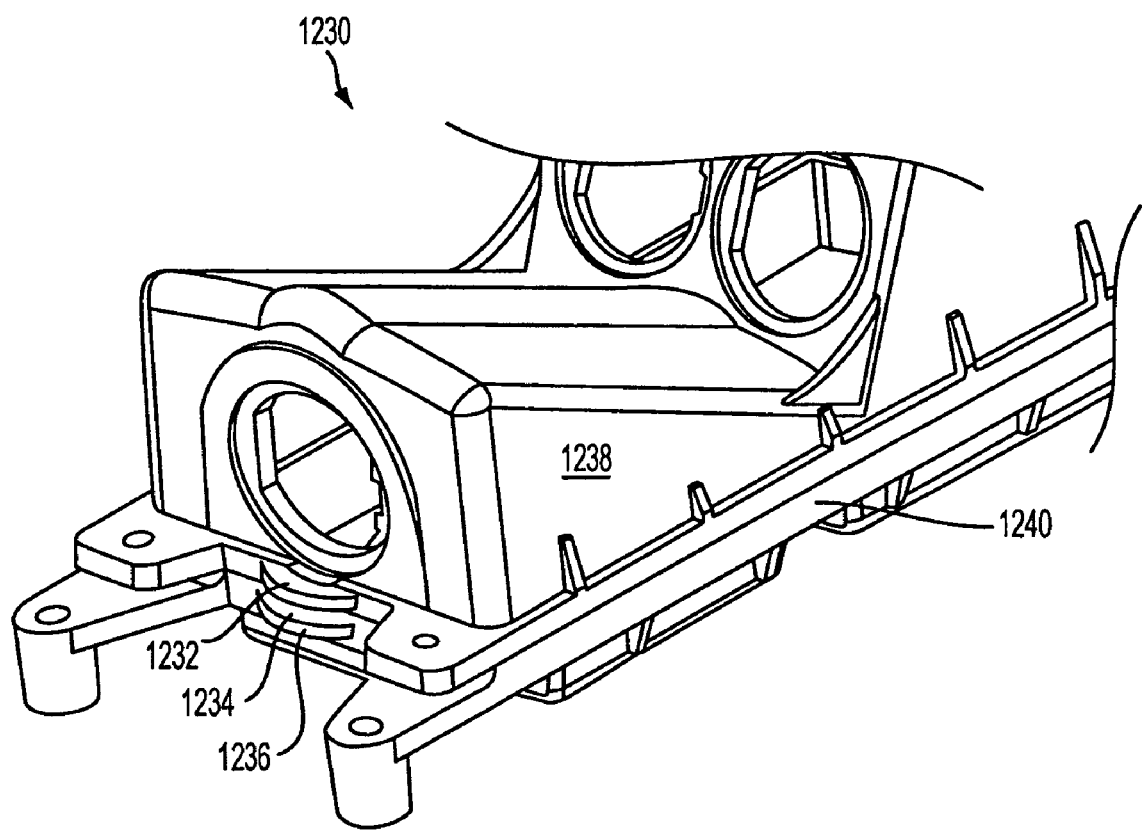
FIG. 12B illustrates a second exemplary implementation of a fiber drop terminal employing pry tabs, consistent with the principles of the invention.

FIG. 12B illustrates a second exemplary implementation of a fiber drop terminal 1230 employing pry tabs, consistent with the principles of the invention. The implementation of FIG. 12B may include the features of the implementation of FIG. 12A with the addition of a housing pry tab 1232 and a base pry tab 1234. Housing pry tab 1232 and base pry tab 1234 may be configured similar to first pry tab 1208 and second pry tab 1210. Housing pry tab 1232 and base pry tab 1234 may be located substantially along a centerline of terminal 1230. Housing pry tab 1232 and base pry tab 1234 may be located along housing 1238 and/or base 1234 at other locations. For example, housing pry tab 1232 and base pry tab 1234 may be located at a first alternative location located, for example, along a side of terminal 1230.

Figure 13:
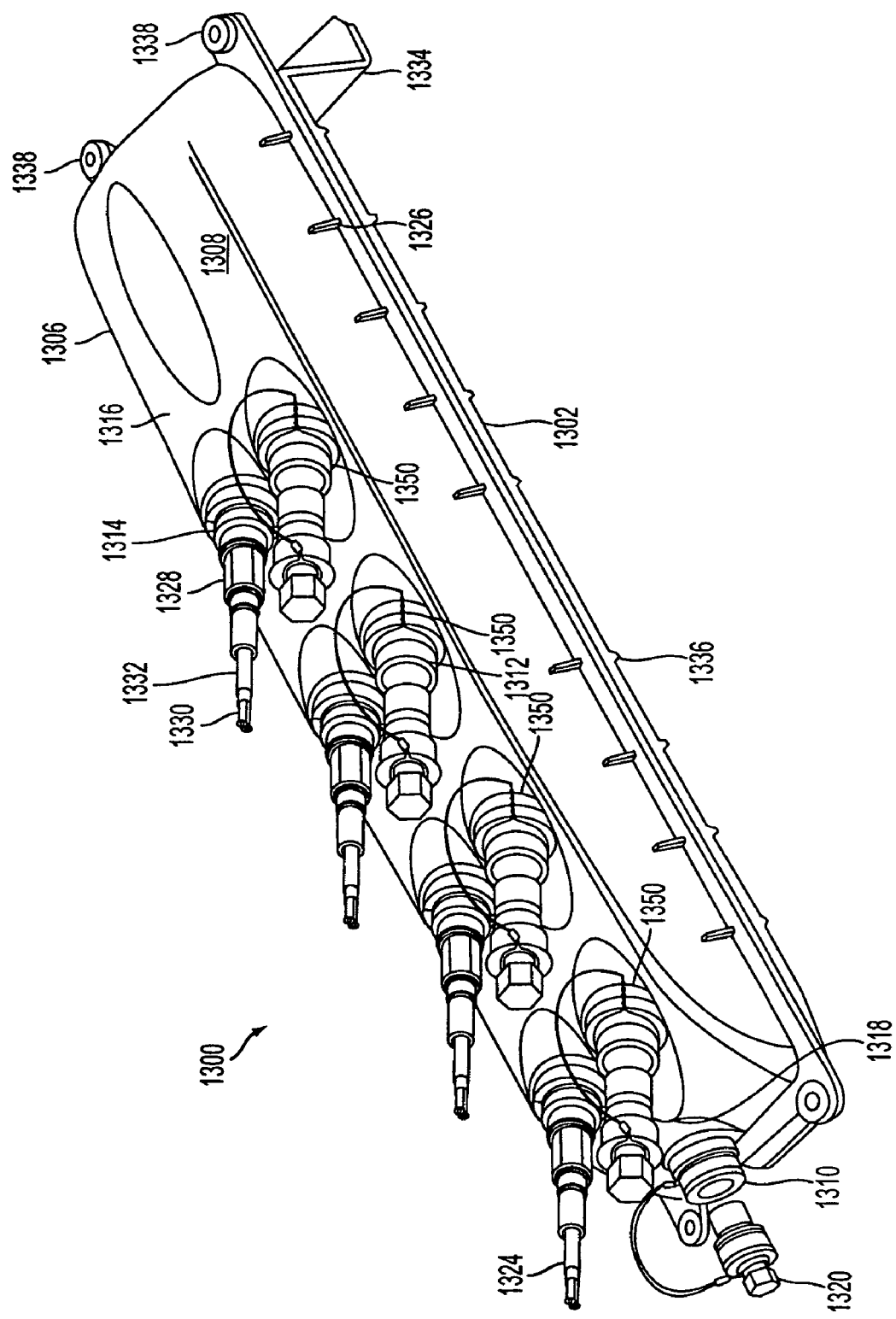
FIG. 13 illustrates an exemplary implementation of a fiber drop terminal including recessed pockets for supporting output receptacles that may be adapted to receive output connectors, consistent with the principles of the invention.

FIG. 13 illustrates an exemplary implementation of a fiber drop terminal 1300 including recessed pockets for supporting output receptacles that may be adapted to receive output connectors, consistent with the principles of the invention. The implementation of FIG. 13 may consist of a fiber drop terminal 1300 that includes a housing 1306 and a base 1302. Housing 1306 may include a front surface 1308, an input receptacle 1310, a receptacle pocket 1312, an output receptacle 1314, a rear base 1316, an output dummy plug 1318, a receptacle plug 1320, an o-ring 1322, a retaining lead 1324, and a stiffening rib 1326.

Housing 1306 may include any device of receiving signals from an input cable, such as incoming bundle 318, including one or more optical fibers and may make those signals available to one or more output connectors via one or more output receptacles 1314. Input receptacle 1310 may be similar to input receptacle 802. A receptacle plug 1320 may be provided to sealably protect fibers within input receptacle 1310 from dirt and moisture contamination. Receptacle plug 1320 may be equipped with a sealing device such as o-ring 1322 to facilitate a weatherproof seal. A retaining lead 1324 may be attached between housing 1306 and receptacle plug 1320 to captively retain plug 1320 when it is removed from receptacle 1310. Retaining lead 1324 can be made from wire rope, wire, plastic, rubber, and the like using crimped connectors, adhesive, or knots to complete attachment to housing 1306 and plug 1320.

Housing 1306 may be configured to provide structural rigidity, water tightness, and user access via one or more receptacle pockets 1312. Housing 1306 may be fabricated from ultraviolet resistant (UV-resistant) plastic using injection molding techniques known in the art. Housing 1306 may be equipped with one or more stiffening ribs 1326 that may server to increase the structural rigidity of housing 1306. Stiffening ribs 1326 may be located substantially on the exterior of the housing 1306 and/or substantially on the interior. Housing 1306 may be designed to sealably mate with base 1302 to form a weather tight seal along the junction of housing 1306 and base 1302.

Receptacle pocket 1312 may include a rear base 1316 for supporting an output receptacle 1314. A front portion of rear base 1316 may have a substantially flat surface for receiving output receptacle 1314 and a rear portion that may transition into front surface 1308. Receptacle pocket 1312 and/or rear base 1316 may be configured to have an angular relationship with, for example, front surface 1308. Receptacle pocket 1312 may facilitate mounting output receptacle 1314 at a variety of angles for facilitating ergonomic access to output receptacle 1314 by a linesman when working with terminal 1300, such as when coupling an output connector 1328 to an output receptacle 1314. In addition, corresponding rows 1350 of output receptacles 1314 may be deployed in tiers so as to facilitate visual inspection by the linesman working from an anticipated angle of approach. Furthermore, pockets 1312 may be arranged so as to discourage precipitation from entering output receptacles 1314. For example, if terminal 1300 is mounted on a utility pole in a vertical orientation, output receptacles 1314 may be oriented so as to generally be directed downward toward the base of a utility pole.

Implementations of terminal 1300 may employ output receptacle mounting angles in the range of 10° to 45° as measured from front surface 1308 of housing 1306. In certain implementations of housing 1306, receptacle mounting angles in the range of 25° to 30° may be used.

Receptacle pocket 1312 may include a rear base 1316 for providing a substantially planar surface through which output receptacle 1314 may be mounted. Rear base 1316, or receptacle mounting surface, may also function to provide additional stiffness to the interface between output receptacle 1314 and housing 1306. Employing receptacle pockets 1312 may serve to reduce and/or eliminate areas of stress that may be encountered in implementations employing, for example, a stepped face design.

An output connector 1328 may used in conjunction with output receptacle 1314. Output connector 1328 may be communicatively coupled to an output cable 1330 that includes at least one optical fiber for conveying optical signals to a customer. Connector 1328 may employ a strain relief 1332 in the vicinity of the transition to cable 1330 to provide strength and prevent excessive bending of the fiber contained within cable 1330.

Base 1302 may include one or more mounting/standoff flanges 1334 to facilitate mounting of terminal 1300 at a determined orientation with respect to a mounting structure. Base 1302 may include one or more base stiffening ribs 1336. Housing 1306 may also be used to facilitate mounting terminal 1300 using retaining holes 1338. Retaining holes 1338 may receive fasteners such as nails, screws, tie wraps, wire ties, etc., and can also be used for moveably securing housing 1306 to base 1302 during servicing.

Retaining holes 1338 may also serve as part of pry tab such as that shown in conjunction with FIGS. 12A and 12B to facilitate separation of housing 1306 from base 1302 and/or a gasket running in a channel associated with base 1302, such as the channel shown in conjunction with FIGS. 10A and 10B.

Implementations of terminal 1300 may be further designed so as to attach to brackets such as those shown in conjunction with FIG. 11A. Terminal 1300 may be configured so that housing 1306 may be removed while base 1302 remains attached to a mounting bracket and/or mounting structure. If terminal 1300 may be mounted on strands, weight can be added to areas of base 1302 and/or housing 1306 so as to cause terminal 1300 to remain at a desired orientation, e.g., substantially parallel to the ground with the terminal 1300 hanging directly below the strand to facilitate ergonomic access by a linesman working from an expected angle of approach.

Figure 14A:
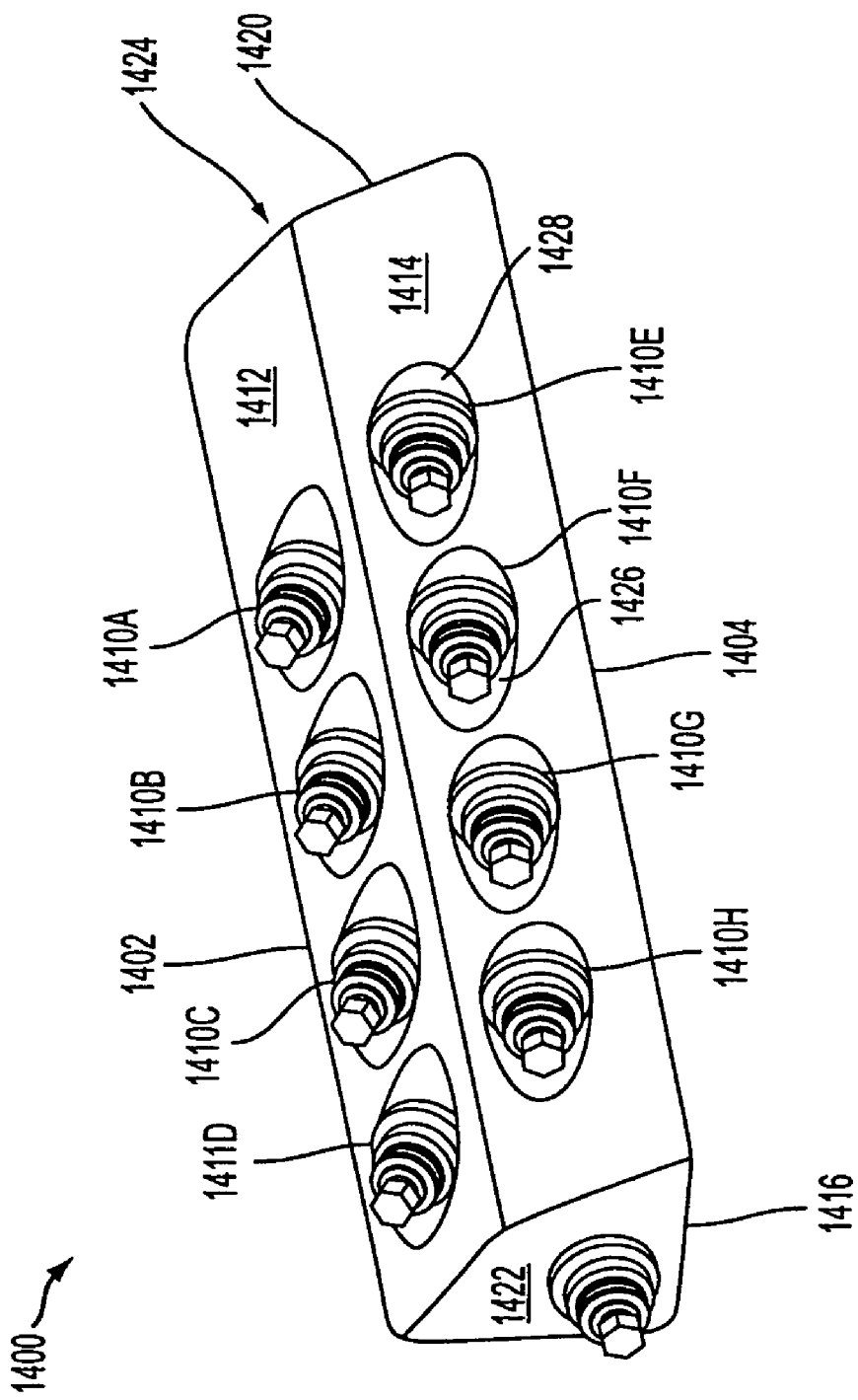
FIGS. 14A-C illustrate various aspects of an exemplary implementation of a fiber drop terminal 1400 having tiered receptacles mounted on faces having an angular association with each other, consistent with the principles of the invention.
Figure 14B:
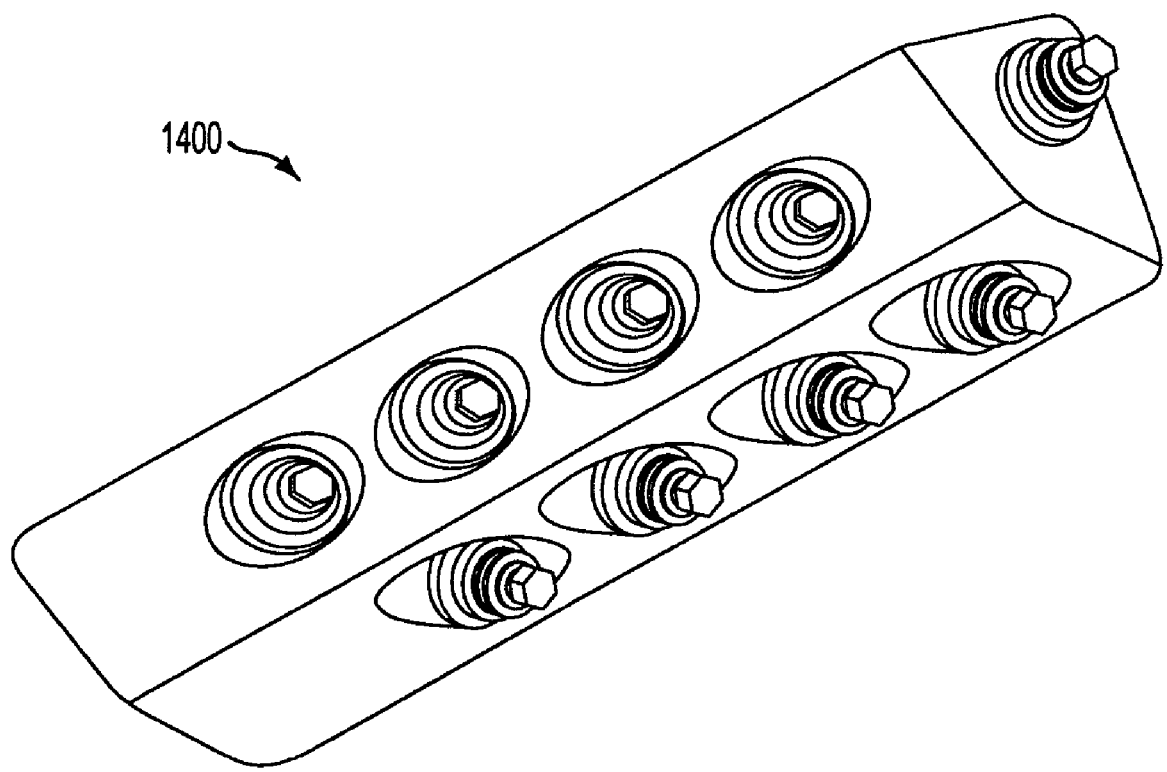
Figure 14C:
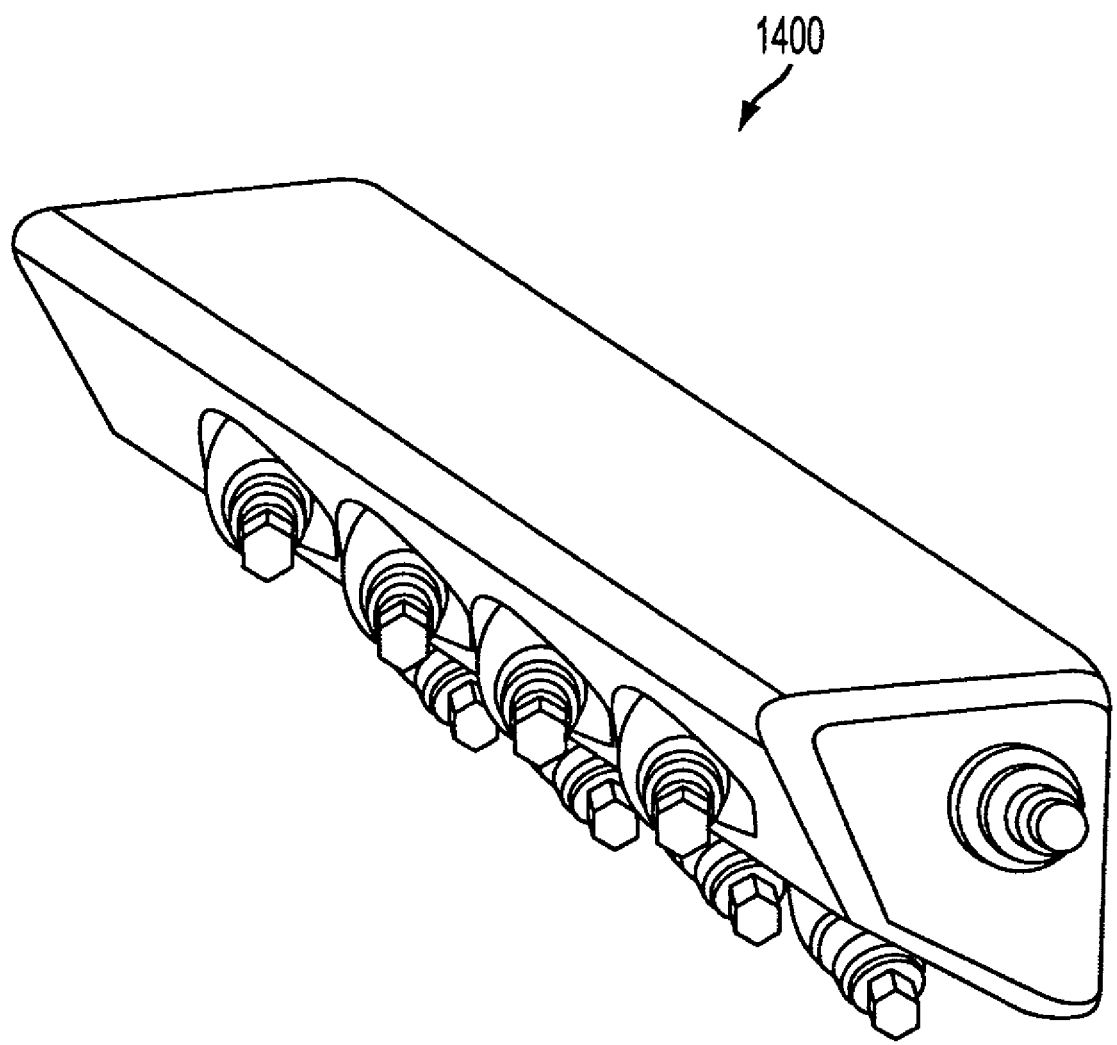

FIGS. 14A-C illustrate various aspects of an exemplary implementation of a fiber drop terminal 1400 having tiered receptacles mounted on faces having an angular association with each other, consistent with the principles of the invention. Referring to FIG. 14A, fiber drop terminal 1400 may include a first row of output receptacles 1402, a second row of output receptacles 1404, an input receptacle 1406, a dummy plug 1408, output receptacles 1410A-H, a first face 1412, a second face 1414, a first back surface 1416, a second back surface 1418, a first end surface 1420, a second end surface 1422, a common interface 1424, a receptacle pocket 1426, and a receptacle supporting surface 1428.

Terminal 1400 may include any device capable of receiving an incoming optical fiber and making a signal present thereon available to an output receptacle. Terminal 1400 may be fabricated in a manner consistent with terminals as described in conjunction with FIGS. 3A and 13. Terminal 1400 may include one or more output receptacles 1410A-H arranged in first row 1402 and/or second row 1404. First row 1402 may be associated with a first face 1412 and second row 1404 may be associated with a second face 1414. First face 1412 and second faces 1414 may meet along a common interface, or seam, 1424 at an angle referred to as a mating angle. The mating angle may be selected so as to present first face 1412 and/or second face 1414 to a linesman in a manner not requiring that the linesman maneuver in an awkward manner when accessing terminal 1400. For example, terminal 1400 may be mounted to a horizontal strand proximate to a utility pole. First face 1412 and/or second face 1414 may be configured so as to allow access to output receptacles 1410A-H without requiring that the linesman crane his/her neck and/or lean in an unsafe manner when inspecting, accessing, or handling terminal 1400.

Output receptacles 1410A-H may respectively be associated with a receptacle pocket 1426. Receptacle pocket 1426 may have a receptacle supporting surface 1428 for receiving output receptacles 1410A-H. Receptacle pocket 1426 and/or receptacle supporting surface 1428 may operate to make output receptacles 1410A-H available to a linesman at a determined angle. The determined angle may be a function of the location where terminal 1400 may be mounted and/or an assumed angle of approach used by a linesman when accessing terminal 1400. Output receptacles 1410A-H may be fitted with dummy plug 1408 to prevent dirt and moisture from contacting optical fibers within output receptacles 1410A-H. Dummy plug 1408 may be removed when an output connector is mated to output receptacles 1410A-H.

First end surface 1420, second end surface 1422, first back surface 1416, and second back surface 1418 may operate in conjunction with first face 1412 and second face 1414 to form a watertight enclosure. Terminal 1400 may include an input receptacle 1406 for receiving an input connector associated with an incoming fiber bundle.

FIGS. 14B and 14C illustrate additional views of terminal 1400, consistent with implementations and principles of the invention. Implementations of terminal 1400 may be attached to mounting brackets adapted for, and/or attached to, utility poles, suspended strands, walls, fiber distribution hubs, and the like. Implementations of terminal 1400 may further employ receptacle orientations, tier arrangements, mating angles, overall lengths, and/or overall widths that vary according to particular installation locations, installation orientations, and/or anticipated angles of approach.

Figure 15:
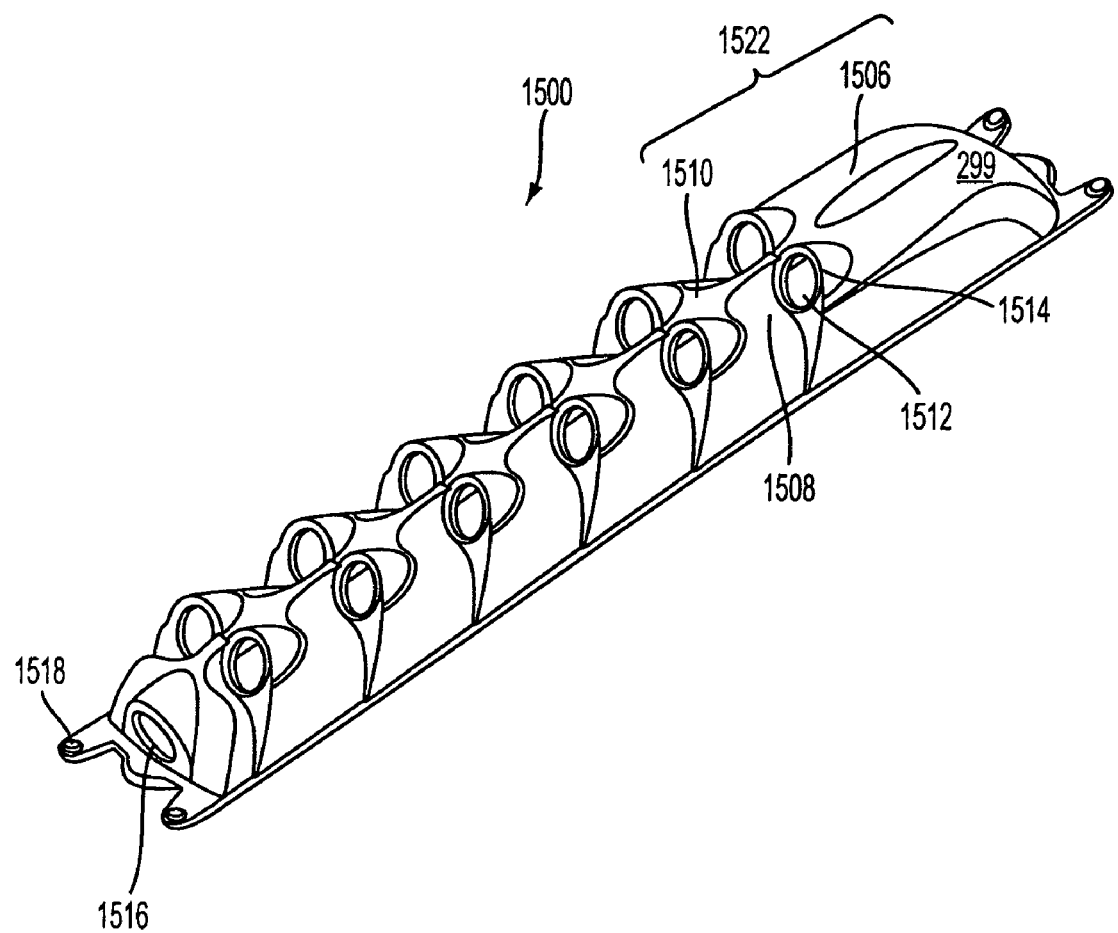
FIG. 15 illustrates an exemplary implementation of a fiber drop terminal having output receptacles and contoured surfaces associated with receptacle pocket areas, consistent with the principles of the invention.

FIG. 15 illustrates an exemplary implementation of a fiber drop terminal 1500 having output receptacles and contoured surfaces associated with receptacle pocket areas, consistent with the principles of the invention. Terminal 1500 may include a housing 1506, a contoured surface 1508, a ridge 1510, an output receptacle opening 1512, a receptacle mounting surface 1514, an input receptacle opening 1516, an integrated hole 1518, a housing pry tab 1520, and a fiber storage portion 1522.

Terminal 1500 may include any device capable of receiving an incoming optical fiber and making a signal present thereon available to an output receptacle. Terminal 1400 may be fabricated in a manner consistent with terminals as described in conjunction with FIGS. 3A, 13 and 14A-C. Terminal 1500 may include a housing 1506 and a base that can be manufactured using, for example, injection molding techniques known in the art. Housing 1506 may for an internal cavity that can include a fiber storage portion 1522. Fiber storage portion 1522 may accommodate excess fiber in coils retained in a substantially flat orientation and/or maintained in an angular orientation, such as the angular orientation described in conjunction with FIG. 5. Housing 1506 may include one or more output receptacles that may be associated with a contoured surface 1508 and/or a receptacle mounting surface 1514.

Contoured surface 1508 may be located proximate to output receptacle opening 1512. Contoured surface 1508 may be configured, dimensioned and arranged to facilitate shedding of water that contacts the outer surface of housing 1506. Contoured surface 1508 may operate to discourage ice build up around the interface of an output receptacle in receptacle opening 1512 and/or an output connector, such as output connector 312. Contoured surface 1508 may be designed to shed water for a particular mounting orientation, such as on a utility pole, or it may be designed to facilitate shedding of water for a plurality of mounting orientations, such as for both a horizontal mounting on a strand and a vertical mounting on a utility pole. When output receptacle pairs are used, such as shown in FIG. 15, a ridge 1510 may be utilized between two contoured surfaces 1508 to facilitate removal of water from around output receptacle opening 1512.

Implementations employing contoured surface 1508 may include features associated with other implementations of drop terminals. For example, terminal 1500 may include pry tab 1520, one or more integrated holes 1518 that may be used for securing housing 1506 to a base during servicing, an input receptacle opening 1516, a receptacle mounting surface 1514, angled coil storage inside housing 1506, etc. Implementations of terminal 1500 may employ input receptacle opening 1516 proximate to a lower portion of housing 1506 and/or proximate to an upper portion of housing 1506 for receiving an incoming fiber bundle.

Figure 16:
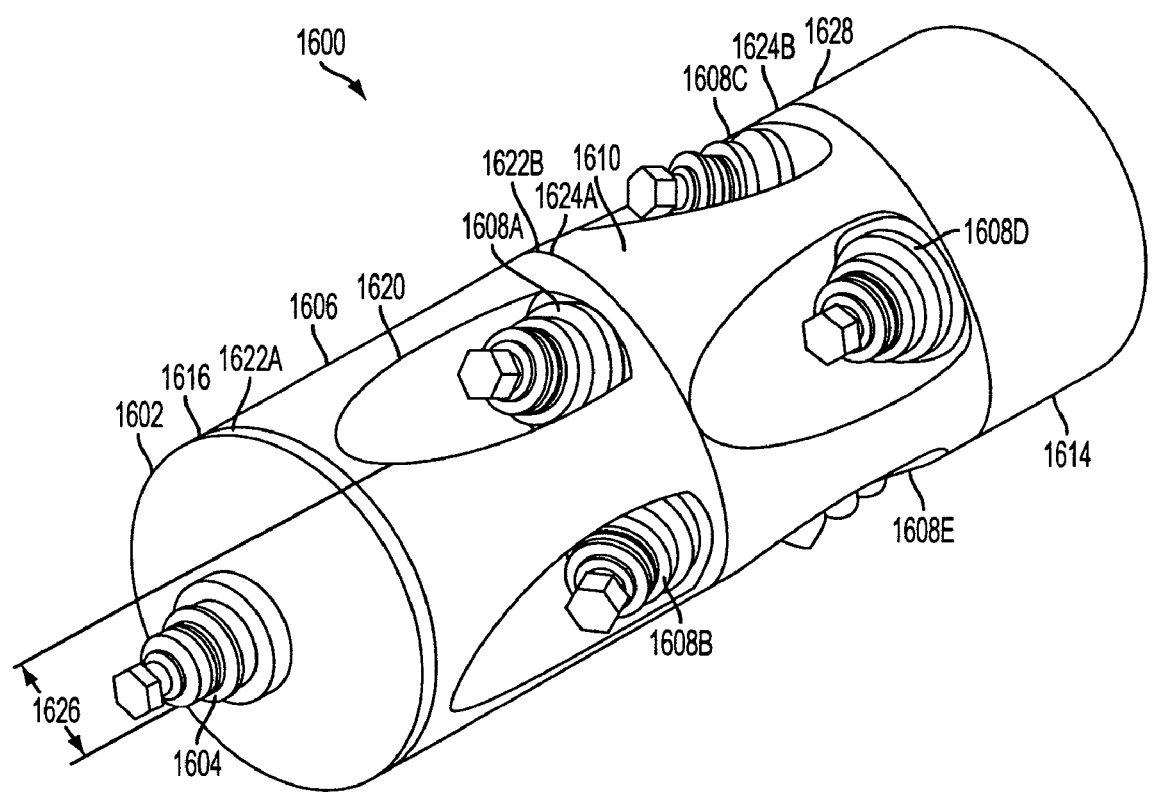
FIG. 16 illustrates an exemplary implementation of a fiber drop terminal employing a cylindrical enclosure, consistent with the principles of the invention.

FIG. 16 illustrates an exemplary implementation of a fiber drop terminal 1600 employing a cylindrical enclosure, consistent with the principles of the invention. Cylindrical terminal 1600 may include, among other things, an input end cap 1602 having an input receptacle 1604, a first output section 1606 having a first plurality of output receptacles 1608A, 1608B, a second output section 1610 having a second plurality of output receptacles 1608C, 1608D, 1608E and a storage end cap 1614. Cylindrical terminal 1600 may offer structural rigidity in a space efficient package due to the cylindrical shape of the terminal. The cylindrical shape of terminal 1600 may facilitate passage through pulleys used to deploy strands on utility poles and/or below grade. Cylindrical terminal 1600 may include sections that can be mated as needed to produce a terminal having a desired number of receptacles 1608.

Input end cap 1602 may be molded from plastic and may include an input receptacle 1604 for receiving an input connector containing multiple optical fibers. In one implementation, input receptacle 1604 may utilize a number of fibers matching the number of output receptacles. Input end cap 1602 may include an outer surface and inner surface with the inner surface forming an input cavity. Input end cap 1602 may include a input end cap mating surface 1616 for mating input end cap 1602 to first output section 1606. Fibers may run from input receptacle 1604 through the input cavity of input end cap 1602 en route to first output section 1606. Fibers associated with input receptacle 1604 may be protected from the elements when terminal 1600 is assembled. Input end cap 1602 may include an input channel in lieu of an input receptacle 1604.

First output section 1606 may be molded from plastic and may include one or more receptacle pockets 1620 disposed around an outer surface of output section 1606. Receptacle pockets 1620 may include a receptacle supporting surface having an opening for receiving output receptacle 1608A and/or 1608B. Receptacle pockets 1620 may be separated by a determined spacing that may be measured as a distance and/or as a number of degrees. For example, if two output receptacles are used on an output section the receptacles may be separated by 180° with respect to a centerline of terminal 1600. If four output receptacles are used, the output receptacles may be separated by 90°.

First output section 1606 may include a first mating surface 1622A and a second mating surface 1622B. First mating surface 1622A may be configured and dimensioned to mate with input end cap mating surface 1616. A weather tight seal may be produced when input end cap 1602 and first output section 1606 are mated together. First output section 1606 may be shaped so as to have an inner volume for housing optical fibers received from input end cap 1602 and for housing fibers passing through first output section 1606 en route to second output section 1610. First output section 1606 may include one or more output receptacles 1608A, 1608B arranged in receptacle pockets 1620. First and second mating surfaces 1622A, 1622B may be substantially symmetrical and may be configured and dimensioned to form weather tight seals with adjacent sections.

Second output section 1610 may include a third mating surface 1624A and a fourth mating surface 1624B. Second output section 1610 may be substantially similar to first output section 1606 in form and/or function. In one implementation, second output section 1610 may include the same number of output receptacles that are present in first output section 1606. When first and second output sections 1606, 1610 are mated together, output receptacles on one section may be offset from output receptacles on a neighboring section by an angular offset 1626. Angular offset 1626 may be selected to facilitate access to substantially all output receptacles associated with terminal 1600. Assume that each output section 1606, 1610 contains four output receptacles 1608 having relative spacings of approximately 90° with respect to each other. When terminal 1600 is assembled, first output section 1606 may be offset by approximately 45° with respect to second output section 1610 so that receptacle 1608D is aligned substantially between output receptacles 1608A and 1608B. Terminal 1600 may include substantially any number of output receptacles and can be realized by coupling additional output sections together.

Storage end cap 1614 may include an outer surface and an inner surface with the inner surface defining an inner cavity that can be used for storing excess optical fiber. Storage end cap 1614 may utilize fiber guides, retaining hooks, adhesive, etc. for retaining excess fiber in a desired orientation. In addition, storage end cap 1614 may retain coils at one or more angular orientations to facilitate achieving a determined bend radius. For example, excess fiber associated with output receptacles 1608A-D may be wound in coils and stored with an angular orientation to maintain at least manufacturer recommended minimum bend radii for the coiled fibers. Storage end cap 1614 may include a storage cap mating surface 1628 that may be configured and dimensioned so as to form a weather tight seal when coupled to fourth mating surface 1624B, of second output section 1610.

One or more sections of cylindrical terminal 1600 may utilize o-rings or other compliant sealing devices to facilitate formation of weather tight seals at the intersections of input end cap 1602, first output section 1606, second output section 1610 and/or storage end cap 1614. In one implementation, a cylindrical fiber drop terminal, such as terminal 1600, may have an outside diameter on the order of 3.5" (89 mm).

Figure 17A:
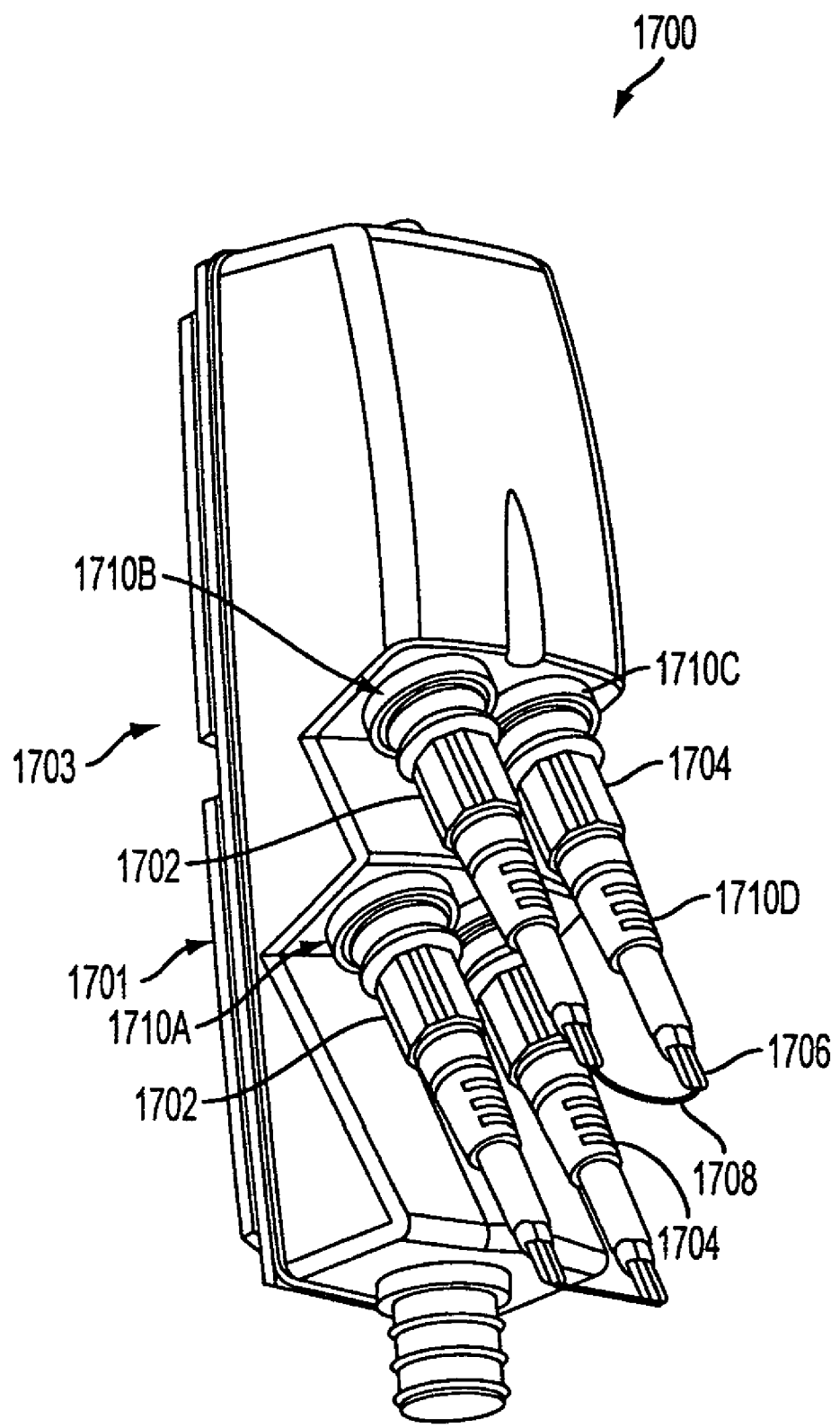
FIG. 17A illustrates an implementation of a fiber drop terminal 1700 employing loop back-plugs, consistent with the principles of the invention.

FIG. 17A illustrates an implementation of a fiber drop terminal 1700 employing loop back-plugs, consistent with the principles of the invention. Fiber drop terminal 1700 may be configured in a manner similar to fiber drop terminals described in conjunction with FIGS. 3A, 4, 5, 13, 14A, 15, and/or 16. Terminal 1700 may include output receptacles 1710A-D, a first loop-back assembly 1701, and a second loop-back assembly 1703. Each loop-back assembly 1701, 1703 may include a first output connector 1702 and a second output connector 1704 communicatively coupled via an output fiber 1706 having a loop-back portion 1708.

Output receptacles 1710A-D may be associated in pairs by way of first loop-back assembly 1701 and second loop-back assembly 1703 for testing. For example, output receptacles 1710A and 1710D may form a pair by way of first loop-back assembly 1701. Output connectors 1702 and 1704 may be configured to couple output receptacle 1710A to 1710D so that an optical signal present at receptacle 1710A may be conveyed to output receptacle 1710D.

Implementations employing loop-back plugs may facilitate the testing of two incoming optical fibers (e.g., 1710B and 1710C) without requiring that a linesman be present at the fiber drop terminal during testing. For example, a testing device and/or a technician at a central office and/or a fiber distribution hub may send a test signal along a first incoming optical fiber associated with output receptacle 1710B. The test signal may pass from output receptacle 1710B through first output connector 1702 and loop-back fiber 1706 to second output connector 1704 and into output receptacle 1710C. The test signal may travel through a second incoming optical fiber to the central office and/or fiber distribution hub where the technician is located. The technician may detect the presence and/or absence of the test signal on the second incoming optical fiber.

If a fiber drop terminal includes eight output receptacles, four loop-back plug assemblies may be used to allow testing of each output receptacle and/or fiber associated with the fiber drop terminal. When a customer is connected to the fiber drop terminal, the loop-back assembly may be removed from the output receptacle that will be connected to the customer and/or removed from the opposing output receptacle. A dummy plug may be inserted in the opposing output receptacle to prevent dirt and moisture from entering the opposing receptacle while not connected to a customer. An output connector associated with an output cable running to a customer premises may be connected to the output receptacle used to provide service to the customer.

Prior art testing techniques may require that a linesman inject a signal into an optical fiber at a central office and/or fiber distribution hub and then drive to a fiber drop terminal being tested. The linesman may leave a diesel truck idling while he climbs a pole and determines if the test signal is present at an output receptacle. After determining if the signal is present, the linesman may return to the central office and/or fiber distribution hub and connect the test signal to another fiber associated with, for example, an adjacent output receptacle on the fiber drop terminal. The linesman may drive back out to the fiber drop terminal and determine if the test signal is present on the adjacent output receptacle.

Implementations making use of loop-back plug assemblies 1701 and 1703 may produce substantial cost savings when used to test fiber drop terminals. Cost savings may result from the time saved by eliminating driving between a fiber drop terminal location and a central office and/or fiber distribution hub while testing a fiber drop terminal. Cost savings may also result from the fuel saved by eliminating trips to and from a fiber drop terminal when performing testing. Elimination of trips to and from a fiber drop terminal may also conserve natural resources by reducing the consumption of fossil fuel.

Figure 17B:
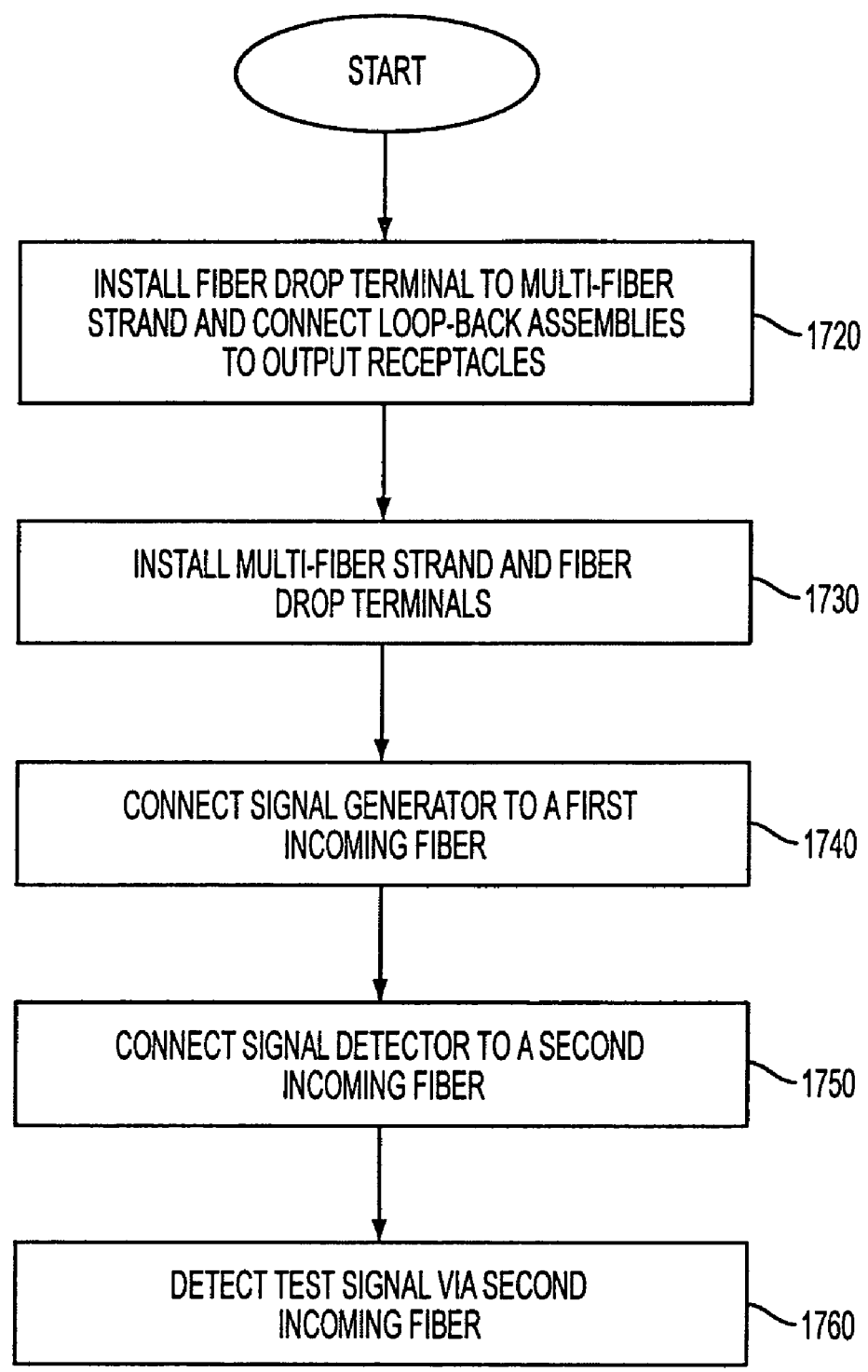
FIG. 17B illustrates an exemplary flow diagram illustrating a method for testing a fiber drop terminal used in a communication network consistent with the principles of the invention.

FIG. 17B illustrates an exemplary flow diagram illustrating a method for testing a fiber drop terminal used in a communication network consistent with the principles of the invention. A fiber drop terminal may be installed on a multi-fiber strand along with loop-back assemblies 1701 and/or 1703 (act 1720). For example, a fiber drop terminal may be installed on a multi-fiber strand in an assembly plant. For example, fiber drop terminals may be attached to breakouts, or tethers, associated with the multi-fiber strand. The terminated breakouts, or tethers, may be secured to the multi-fiber strand for transport to an installation location. An initial check of signal continuity in the optical fibers leading to the fiber drop terminal may be performed in the assembly plant prior to shipping the multi-fiber strand/fiber drop terminal system. A multi-fiber strand may have numerous fiber drop terminals attached to it.

The multi-fiber strand and fiber drop terminal are installed at a predetermined location (act 1730). For example, the multi-fiber strand may be suspended from two or more utility poles and fiber drop terminals may be attached to the utility poles. A proximate end of the multi-fiber strand may be associated with a central office and/or an FDH serving, for example, a residential development. A distal end of the multi-fiber strand may be located several kilometers away from the central office and/or FDH and may be associated with a fiber drop terminal. A deployed fiber drop terminal may have one optical fiber associated with each output receptacle. The fiber drop terminal may receive an incoming signal on an optical fiber and provide the signal to a customer when service is connected to the customer.

A signal generator may be connected to a fiber associated with a first output receptacle (act 1740). For example, a signal generator may be located at, for example, a central office. The signal generator may be connected to a first fiber servicing a first output receptacle on a fiber drop terminal. A first output connector, associated with a loop-back assembly, may be coupled to the first output receptacle. A corresponding output connector associated with the loop-back assembly may be plugged into a second output receptacle associated with a second fiber that runs back to, for example, the central office. A signal detector may be connected to a second fiber at the central office (act 1750).

Since first output connector 1702 is communicatively coupled to second output connector 1704 via loop-back portion 1708, a signal arriving at the first output receptacle may pass through first output connector 1702, loop-back portion 1708, and second output connector 1704 so as to be present at the second output receptacle. An optical signal present at the second output receptacle may traverse the second optical fiber back to the central office and/or FDH. The optical signal traversing the second optical fiber may be detected using the signal detector (act 1760). The presence of an optical signal on the second fiber may indicate that both the first fiber and second fiber are operating properly. In contrast, if no signal and/or a degraded signal is detected on the second fiber, the first fiber and/or the second fiber may not be operating properly. When testing is complete, loop-back assembly 1701 may remain in place until a customer is connected to the fiber drop terminal. At that time, loop-back assembly 1701 may be removed and reused on another fiber drop terminal. A dummy plug may be inserted into an unused output receptacle to prevent dirt and/or moisture contamination.

The method of FIG. 17B may allow a single technician to test some and/or all fiber drop terminals associated with one or more multi-fiber strands from a single location. Testing from a single location may provide significant time and fuel savings as compared to testing fiber drop terminals by having a technician travel from a central office and/or FDH to and from a fiber drop terminals installed in the field. The method of FIG. 17B may also allow testing during inclement weather since the technician may be located indoors, such as when testing from a central office.

Figure 18:
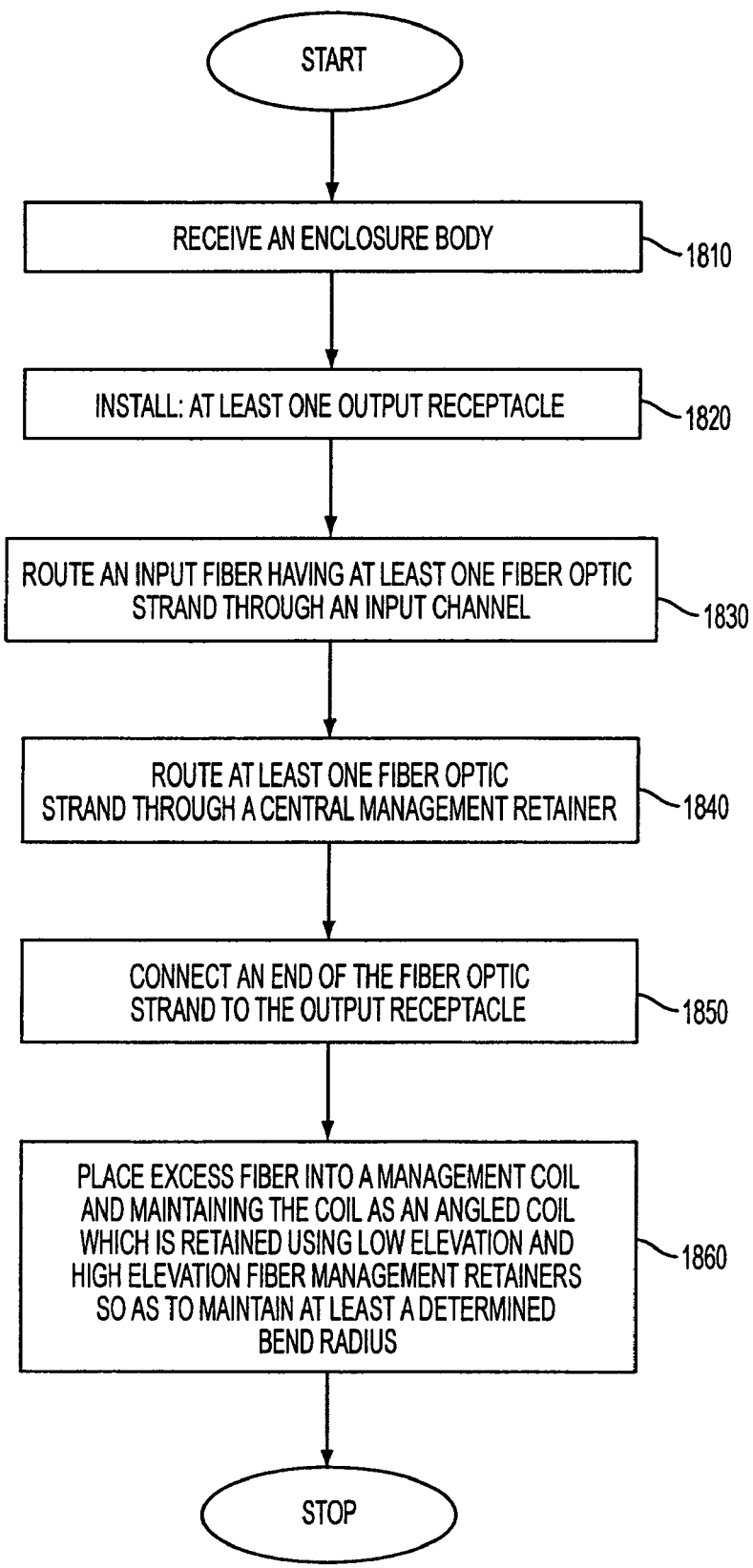
FIG. 18 illustrates a flow chart showing an exemplary method for routing fiber strands within a fiber drop terminal employing an angled fiber management system, consistent with the principles of the invention.

FIG. 18 illustrates a flow chart showing an exemplary method for routing fiber strands within a fiber drop terminal employing an angled fiber management system, consistent with the principles of the invention. The method begins with receipt of a housing (act 1810). For example, a housing, such as an implementation illustrated in conjunction with FIGS. 3A, 9A, 11B, 13, 14A, 15 and/or 16, may be used. An output receptacle may be installed in a housing using techniques known in the relevant arts (act 1820). An input cable having one or more optical fibers may be passed through an input channel, such as input channel 260, associated with a housing of the fiber drop terminal (act 1830). Alternatively, an input cable may be terminated with an input connector and coupled to an input receptacle on the housing in place of the input channel. Optical fibers associated with the input cable may be run inside the housing and secured using, for example, central management retainers (act 1840). In one implementation, a central management retainer may be located between two output receptacles substantially along the centerline of the housing. One or more ends, such as distal ends, of the optical fibers may be connected to one or more output receptacles (step 1850). Optical fibers may be fused to an output receptacle and/or may be terminated with a connector configured and arranged to mate with a connector/receptacle associated with an output receptacle mounted in the housing.

Excess optical fiber may be formed into one or more coils and maintained as an angled management coil within housing 1306 using a combination of low elevation retainers and/or high elevation retainers (step 1860). The angled management coil may be configured so as to maintain a manufacturer recommended bend radius of, for example, 1.2 inches and/or 1.5 inches.

Figure 19:
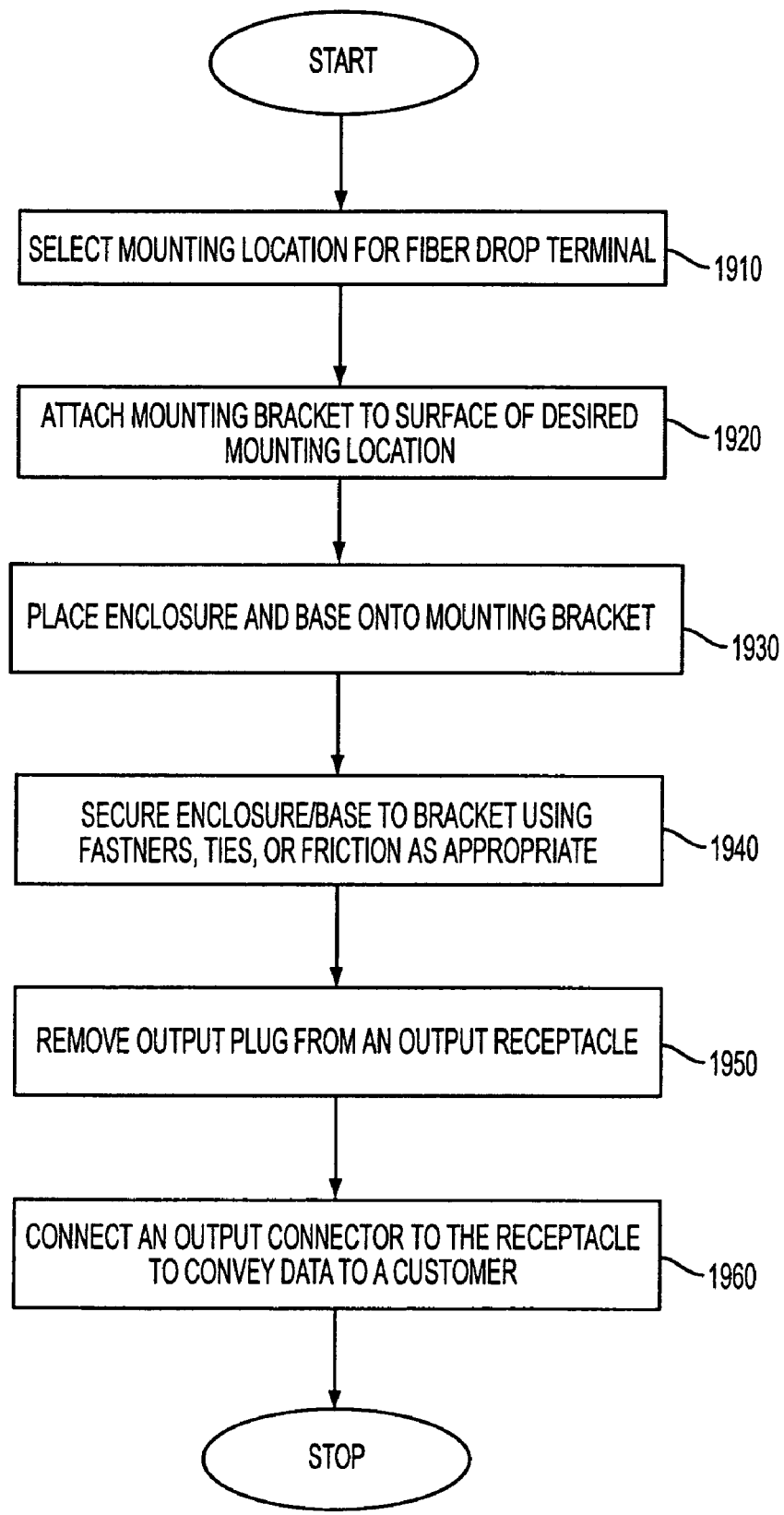
FIG. 19 illustrates a flow chart showing an exemplary method for installing a fiber drop terminal using a bracket, consistent with the principles of the invention.

FIG. 19 illustrates a flow chart showing an exemplary method for installing a fiber drop terminal using a bracket, consistent with the principles of the invention. A mounting location for the fiber drop terminal is selected (act 1910). Mounting locations may include utility poles, suspended strands, equipment racks, central offices, and/or building structures. A mounting bracket may be attached to the mounting surface at a desired mounting location (act 1920). The mounting bracket may be attached using nails, screws, rivets, adhesive, etc. A fiber drop terminal including a housing and/or a base may be placed on or against the mounting bracket (act 1930). The housing and/or base may be secured to the bracket using fasteners, ties, latches, keyed interlocking devices and/or a friction-based fit as appropriate (act 1940). For example, the housing and/or base may be attached using screws, wire ties, nylon ties, or using a keyed friction retaining mechanism such as a slot and post arrangement. An output dummy plug may be removed from an output receptacle (act 1950). An output connector having an output fiber associated therewith may be connected to the output receptacle to convey electromagnetic data, such as optical data, to a customer by way of an output fiber (act 1960).

Figure 20:
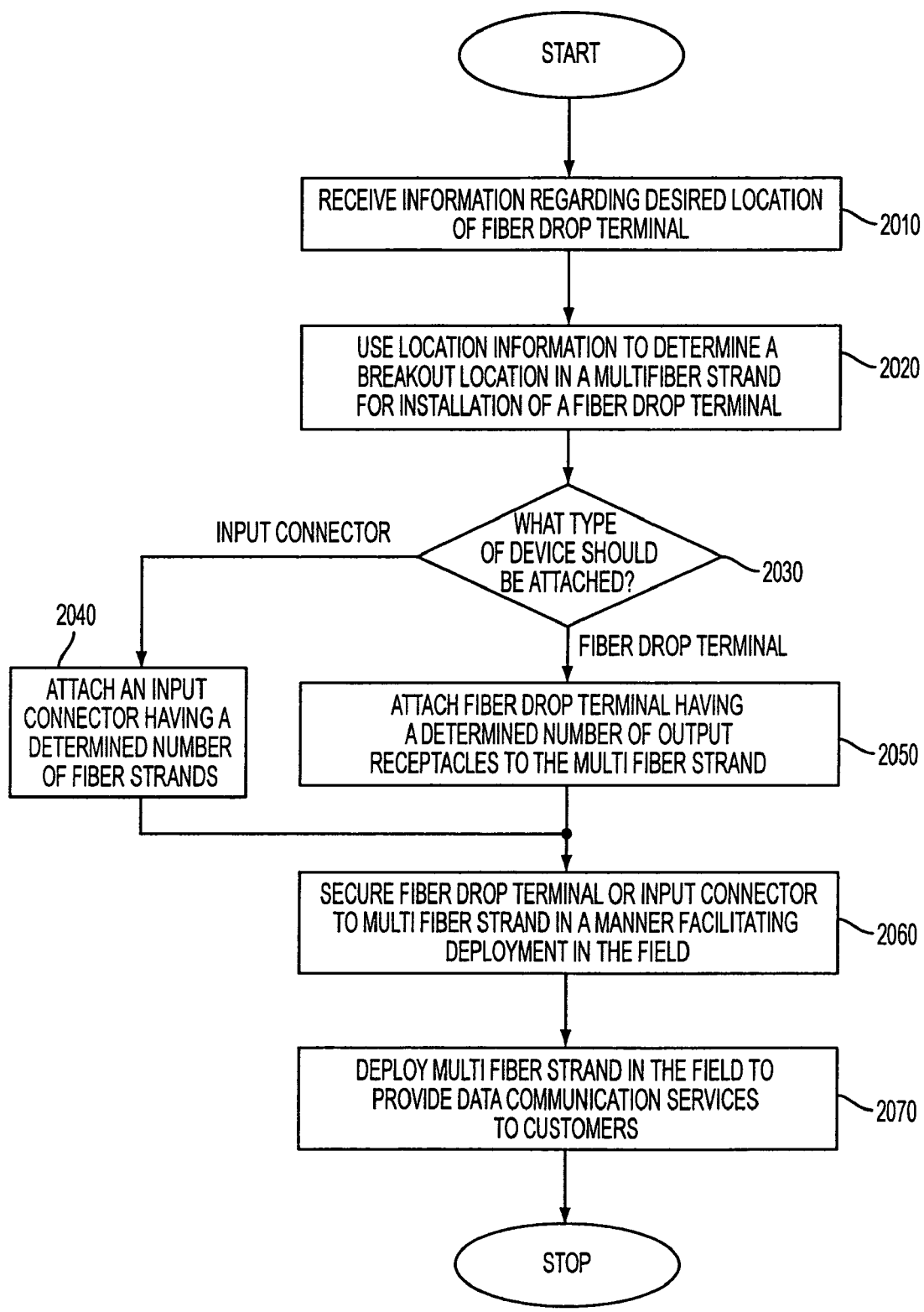
FIG. 20 illustrates a flow chart showing an exemplary method for installing fiber drop terminals and/or output connectors onto a multi-fiber strand prior to deployment in the field, consistent with the principles of the invention.

FIG. 20 illustrates a flow chart showing an exemplary method for installing fiber drop terminals and/or output connectors onto a multi-fiber strand prior to deployment in the field, consistent with the principles of the invention. For example, the method of FIG. 20 may be largely carried out in a manufacturing and/or assembly facility. The method may begin with receipt of information about a desired location of a fiber drop terminal (act 2010). This location information may be used to identify, or determine, a breakout location in the multi-fiber strand. A fiber drop terminal may be installed at the breakout location, such as by attaching the fiber drop terminal to a fiber bundle extracted from the multi-fiber strand (act 2020). For example, it may be determined that an eight-output fiber drop terminal is required on a utility pole having a specific set of geographic coordinates associated therewith. At the appropriate location within the multi-fiber strand, a breakout including eight fibers may be created. This breakout may provide eight input fibers to the fiber drop terminal.

Returning to FIG. 20, a determination may be made as to whether an input connector should be attached to the breakout fibers and/or whether a fiber drop terminal should be attached (act 2030). If an input connector should be attached, the input connector may be attached to an incoming fiber bundle (act 2040). In contrast, if a fiber drop terminal should be attached, the fiber drop terminal may be attached to the appropriate number of breakout strands (act 2050).

After act 2040 and/or act 2050, the fiber drop terminal and/or input connector may be secured to the incoming bundle in a manner that facilitates efficient deployment in the field (act 2060). For example, an input connector and the incoming bundle associated therewith may be attached to the multi-fiber strand using tie wraps. The incoming bundle and input connector may be wrapped to the multi-fiber strand in a manner facilitating passage of the assembly through standard pulleys that may be used for installing multi-fiber strands onto utility poles and/or below grade. The multi-fiber strand may be deployed in the field to provide data communication services to subscribers (act 2070).

While selected preferred implementations have been illustrated and discussed herein, alternative configurations of fiber drop terminals consistent with aspects of the invention are possible. For example, an alternative implementation may include a fiber drop terminal having threaded inserts and/or alignment grooves for matching particular sizes and designs of suspended strands. In particular, the inserts and grooves may be configured to mate with selected types of mounting brackets for use with different sizes and types of strands. In addition, the bracket/insert/enclosure assembly may be designed so as to provide receptacles in an orientation optimized for anticipated angles of approach that may be used by a linesman when accessing the installed enclosure. Furthermore, the bracket may be designed so as to eliminate shifting, rotation about the strand, and/or sagging while being accessed by a linesman.

Implementations may be mounted to metallic strand wires that are suspended between utility poles. In these applications, implementations of fiber drop terminals may be securely fastened to the strand to avoid longitudinal shifting of the fiber drop terminal along the strand. In addition the fiber drop terminal may be anchored to discourage rotational shifting around the strand. Finally the fiber drop terminal and/or mounting device may be configured so that the fiber drop terminal is suspended a fixed distance below the strand and/or so that the fiber drop terminal does not sag and/or droop.

Another implementation of a fiber drop terminal may include output connectors installed in a housing associated with a fiber drop terminal. Output connectors may be used in place of, or in addition to, output receptacles.

Still other implementations of a fiber drop terminal may include provisions, such as connectors, receptacles, pigtails, etc., for conveying communication signals over copper wires in addition to conveying optical signals over output fibers. For example, output receptacles may include both an optical fiber and one or more copper conductors. Output connectors mating with the receptacles may convey optical signals and/or electrical signals to a destination.

Still other implementations of fiber drop terminals may include electronic data storage and communication devices for facilitating network deployment and configuration. For example, an implementation of a fiber drop terminal may be equipped with a radio-frequency identification (RFID) tag. The RFID tag can store information related to subscribers associated with output receptacles on the enclosure, central offices (COs) supplying data to the enclosure, information associated with maintenance of the enclosure, and/or the geographic location of the enclosure. Information stored in the RFID tag can be queried by a linesman on the ground, or in a vehicle, before climbing a utility pole using a conventional RFID tag reader. In addition, new information can be stored in the RFID tag to accurately reflect the status and configuration of the enclosure. Fiber drop terminals equipped with RFID tags or other electronic processing communication, and/or storage devices may, for example, be referred to as intelligent fiber drop terminals. Fiber drop terminals may also be configured with radio-frequency and/or landline communication capabilities. For example, a fiber drop terminal may be equipped with a cellular transceiver that may be configured to facilitate testing of input receptacles and/or output receptacles associated with the fiber drop terminal and/or to facilitate error detection such as water penetration into an enclosure.

In still other alternative implementations, fiber drop terminals may be equipped to receive removable rain shields for preventing precipitation from coming into contact with connectors and receptacles when fiber drop terminals are serviced. When a service or upgrade operation is complete, a linesman can remove the rain shield. The rain shield may be configured to be re-useable so that it can be used when servicing other fiber drop terminals.

In still other alternative implementations, a base may have a receiving surface that is a channel having essentially any shape which can be used with or without a gasket to facilitate a watertight seal with a housing. Alternatively, the fiber drop terminal housing may include a mating channel configured and dimensioned to form a watertight seal with a channel in the base and/or the housing may contain a channel with, or without, a gasket while the base member includes a substantially flat mating surface. In addition, the base member can be configured to have an input connector or receptacle and/or an output connector or receptacle for facilitating the output and/or input of electromagnetic signals.

In yet another alternative implementation, a cylindrical fiber drop terminal may include an input end cap molded to a fist output section and/or a storage end cap molded to a second output section. The first output section may be configured and dimensioned to mate with a surface of the second output section to form a substantially watertight enclosure. Additional output sections may be added between first output section and second output section to achieve substantially any number and/or configuration of output receptacles.

The foregoing description of exemplary embodiments of the invention provides illustration and description, but is not intended to be exhaustive or to limit the invention to the precise form disclosed. Modifications and variations are possible in light of the above teachings or may be acquired from practice of the invention. For example, while series of acts have been described with respect to FIGS. 17B, 18, 19 and 20, the order of the acts may be varied in other implementations consistent with the invention. Moreover, non-dependent acts may be implemented in parallel.

No element, act and/or instruction used in the description of the application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The scope of the invention is defined by the claims and their equivalents.

What is claimed:

1. A fiber drop terminal comprising:
a housing having an outer surface including:
a first face having:

a first plurality of output receptacles disposed at a first mounting angle with respect to the first face, wherein the first plurality of output receptacles are adapted to receive a first plurality of connectors;

a second face having:

a second plurality of output receptacles disposed at a second mounting angle with respect to the second face, wherein the second plurality of output receptacles are adapted to receive a second plurality of connectors; and a mating angle formed by an intersection of the first face and the second face, the mating angle facilitating access to the first and second plurality of output receptacles;

a base adapted for engagement with the housing, wherein the base and the housing cooperatively define an inner cavity; and a storage cavity occupying a portion of the inner cavity, the storage cavity being adapted to store a plurality of fiber coils at an oblique angle with respect to the base and the outer surface.

2. The fiber drop terminal of claim 1, wherein the first mounting angle equals the second mounting angle.

3. The fiber drop terminal of claim 2, wherein ones of the first and second plurality of output receptacles are each mounted to a receptacle mounting surface associated with a receptacle pocket.

4. The fiber drop terminal of claim 1, further comprising:

a low elevation retainer being adapted to retain a first portion of the plurality of fiber coils in the storage cavity; and a high elevation retainer being adapted to retain a second portion of the plurality of fiber coils in the storage cavity.

* * * * *

UNITED STATES PATENT AND TRADEMARK OFFICE
CERTIFICATE OF CORRECTION

PATENT NO. : 7,489,849 B2
APPLICATION NO. : 11/198848
DATED : February 10, 2009
INVENTOR(S) : Reagan et al.

It is certified that error appears in the above-identified patent and that said Letters Patent is hereby corrected as shown below:

Title Page 3, Item (56) Other Publications: "Mount Box Dec. 24, 1936 Fiber" should read --Mount Box 12/24/36 Fiber--

Col. 19, line 55: "channel 11010. Gasket" should read --channel 1010. Gasket--

Signed and Sealed this
Nineteenth Day of February, 2013

Teresa Stanek Rea
*Acting Director of the United States Patent and Trademark Office*